US012641156B2

(12) United States Patent
Leannah et al.

(10) Patent No.: US 12,641,156 B2
(45) Date of Patent: *May 26, 2026

(54) WATER MANAGEMENT SYSTEM AND USER INTERFACE

(71) Applicant: Zurn Water, LLC, Milwaukee, WI (US)

(72) Inventors: William Leannah, Milwaukee, WI (US); Anthony Wilcox, Milwaukee, WI (US); Richard J. Miezin, Milwaukee, WI (US); Larry Le, Milwaukee, WI (US); Michael Job, Milwaukee, WI (US); Glen Trickle, Milwaukee, WI (US); Kurt Drier, Milwaukee, WI (US); Mike Troutman, Milwaukee, WI (US); Andrew Roy, Milwaukee, WI (US)

(73) Assignee: ZURN WATER, LLC, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,779

(22) Filed: May 15, 2024

(65) Prior Publication Data

US 2024/0297917 A1     Sep. 5, 2024

Related U.S. Application Data

(63) Continuation of application No. 17/114,441, filed on Dec. 7, 2020, now Pat. No. 12,301,661.

(Continued)

(51) Int. Cl.
　H04L 67/12　　　　(2022.01)
　H04W 4/38　　　　(2018.01)

(52) U.S. Cl.
　CPC ............... *H04L 67/12* (2013.01); *H04W 4/38* (2018.02)

(58) Field of Classification Search
　CPC ... H04L 67/12; H04L 12/2818; H04L 12/282; H04L 2012/285; H04W 4/38
　See application file for complete search history.

(56) References Cited

U.S. PATENT DOCUMENTS 2,127,806 A     8/1938　Burt
4,563,780 A     1/1986　Pollack
　　　　　　(Continued)

FOREIGN PATENT DOCUMENTS

CN　　　101702035 A　　5/2010
CN　　　208922102 U　　5/2019
　　　　　　(Continued)

OTHER PUBLICATIONS

Claude A. Wiatrowski "Microprocessor Restroom Robot," Computer Design the Magazine of Digital Electronics, Apr. 1977, pp. 98-100, (3 pages).

(Continued)

*Primary Examiner* — Rufus C Point
(74) *Attorney, Agent, or Firm* — Husch Blackwell LLP

(57) ABSTRACT

A water management system including a first end point device in communication with a first fixture, the first end point including a first end point electronic processor configured to receive data associated with the first fixture and a first fixture identifier. The water management system also includes a non-transitory computer-readable medium storing instructions executable by at least one electronic processor to perform a set of functions, such as receiving the data associated with the first fixture and the first fixture identifier, associating the first fixture identifier with a first location classification and a first type classification, processing the (Continued)

data associated with the first fixture to organize the data based at least in part on the first location classification associated with the first fixture identifier or the first type classification associated with the first fixture identifier, and transmitting the organized data of the first fixture to a user device for display.

18 Claims, 65 Drawing Sheets

Related U.S. Application Data

(60) Provisional application No. 63/059,757, filed on Jul. 31, 2020, provisional application No. 63/007,910, filed on Apr. 9, 2020, provisional application No. 62/962,024, filed on Jan. 16, 2020, provisional application No. 62/944,930, filed on Dec. 6, 2019.

(56)     References Cited

U.S. PATENT DOCUMENTS

| | | | |
|---|---|---|---|
| 4,805,247 | A | 2/1989 | Laverty, Jr. |
| 5,175,892 | A | 1/1993 | Shaw |
| 5,217,035 | A | 6/1993 | Van Marcke |
| 5,438,714 | A | 8/1995 | Shaw |
| 5,481,618 | A | 1/1996 | Ross et al. |
| 5,612,890 | A | 3/1997 | Strasser et al. |
| 5,655,961 | A | 8/1997 | Acres et al. |
| 5,838,258 | A | 11/1998 | Saar |
| 5,844,808 | A | 12/1998 | Konsmo et al. |
| 6,018,827 | A | 2/2000 | Shaw et al. |
| 6,038,519 | A | 3/2000 | Gauthier et al. |
| 6,189,163 | B1 | 2/2001 | Van Marcke |
| 6,236,953 | B1 | 5/2001 | Segal |
| 6,337,635 | B1 | 1/2002 | Ericksen et al. |
| 6,347,414 | B2 | 2/2002 | Contadini et al. |
| 6,411,920 | B1 | 6/2002 | Mcconnell et al. |
| 6,583,720 | B1 | 6/2003 | Quigley |
| 6,642,843 | B2 | 11/2003 | Satoh |
| 6,691,724 | B2 | 2/2004 | Ford |
| 6,694,177 | B2 | 2/2004 | Eggers et al. |
| 6,701,194 | B2 | 3/2004 | Gauthier et al. |
| 6,749,122 | B1 | 6/2004 | Koenck et al. |
| 6,766,221 | B1 | 7/2004 | Christiansen |
| 6,802,084 | B2 | 10/2004 | Ghertner et al. |
| 6,853,958 | B1 | 2/2005 | Turin et al. |
| 6,854,053 | B2 | 2/2005 | Burkhardt et al. |
| 6,892,746 | B2 | 5/2005 | Ford |
| 6,967,565 | B2 | 11/2005 | Lingemann |
| 7,023,341 | B2 | 4/2006 | Stilp |
| 7,058,457 | B2 | 6/2006 | Kuwahara et al. |
| 7,119,658 | B2 | 10/2006 | Stilp |
| 7,143,007 | B2 | 11/2006 | Long et al. |
| 7,177,725 | B2 | 2/2007 | Nortier et al. |
| 7,222,111 | B1 | 5/2007 | Budike, Jr. |
| 7,360,413 | B2 | 4/2008 | Jeffries et al. |
| 7,755,493 | B2 | 7/2010 | Berenguer et al. |
| 7,814,582 | B2 | 10/2010 | Reddy et al. |
| 8,028,355 | B2 | 10/2011 | Reeder et al. |
| 8,141,296 | B2 | 3/2012 | Bem |
| 8,364,546 | B2 | 1/2013 | Yenni et al. |
| 8,970,391 | B2 | 3/2015 | Hoekstra |
| 9,169,625 | B2 | 10/2015 | Chiu et al. |
| 9,266,136 | B2 | 2/2016 | Klicpera |
| 9,429,453 | B1 | 8/2016 | O'Keeffe et al. |
| 9,470,563 | B1 | 10/2016 | Deverse |
| 9,830,565 | B2 | 11/2017 | O'Toole |
| 9,939,299 | B2 | 4/2018 | Patel et al. |
| 9,956,306 | B2 | 5/2018 | Brais et al. |
| 9,963,863 | B2 | 5/2018 | Allard, III |
| 10,264,588 | B2 | 4/2019 | Wegelin et al. |
| 10,329,744 | B2 | 6/2019 | Abdel-Fattah et al. |
| 10,361,802 | B1 | 7/2019 | Hoffberg-Borghesani et al. |
| 10,430,737 | B2 | 10/2019 | Yenni et al. |
| 10,504,355 | B2 | 12/2019 | Wegelin et al. |
| 10,514,110 | B2 | 12/2019 | Allard, III |
| 10,527,191 | B2 | 1/2020 | Bush et al. |
| 10,529,219 | B2 | 1/2020 | Herdt et al. |
| 10,532,920 | B2 | 1/2020 | Slater et al. |
| 10,655,967 | B2 | 5/2020 | Wegelin et al. |
| 10,687,340 | B2 | 6/2020 | Wegelin et al. |
| 10,921,381 | B2 | 2/2021 | Karner et al. |
| 11,108,865 | B1 | 8/2021 | Chakraborty et al. |
| 12,301,661 | B2 * | 5/2025 | Leannah ................. H04L 67/12 |
| 2002/0007510 | A1 | 1/2002 | Mann |
| 2002/0053969 | A1 | 5/2002 | Wagner et al. |
| 2002/0099454 | A1 | 7/2002 | Gerrity |
| 2003/0106147 | A1 * | 6/2003 | Cohen ........................ E04H 4/12 |
| | | | 4/504 |
| 2006/0058898 | A1 | 3/2006 | Emigholz et al. |
| 2006/0208862 | A1 | 9/2006 | Lahr et al. |
| 2008/0177411 | A1 | 7/2008 | Marsh et al. |
| 2009/0248545 | A1 | 10/2009 | Robinson et al. |
| 2009/0300988 | A1 | 12/2009 | Bem |
| 2010/0114383 | A1 | 5/2010 | Rosca et al. |
| 2010/0121613 | A1 | 5/2010 | Rosca et al. |
| 2011/0113360 | A1 | 5/2011 | Johnson et al. |
| 2012/0044350 | A1 | 2/2012 | Verfuerth |
| 2013/0214166 | A1 | 8/2013 | Barlow et al. |
| 2014/0249854 | A1 | 9/2014 | Moore et al. |
| 2015/0019022 | A1 * | 1/2015 | Karamanos ........... G01F 15/003 |
| | | | 700/276 |
| 2015/0229488 | A1 | 8/2015 | Averitt |
| 2015/0233146 | A1 | 8/2015 | Klevens et al. |
| 2015/0308856 | A1 | 10/2015 | Srinivasan et al. |
| 2015/0373482 | A1 | 12/2015 | Barnard et al. |
| 2016/0258144 | A1 | 9/2016 | Tayenaka et al. |
| 2016/0261425 | A1 | 9/2016 | Horton et al. |
| 2017/0011318 | A1 | 1/2017 | Vigano et al. |
| 2017/0019970 | A1 | 1/2017 | Chemel et al. |
| 2017/0038224 | A1 | 2/2017 | O'Keeffe et al. |
| 2017/0122005 | A1 | 5/2017 | Klevens et al. |
| 2017/0129383 | A1 | 5/2017 | Bika et al. |
| 2017/0223807 | A1 | 8/2017 | Recker et al. |
| 2017/0264731 | A1 | 9/2017 | Breton et al. |
| 2017/0358186 | A1 | 12/2017 | Harpole |
| 2018/0052055 | A1 | 2/2018 | Ikeda et al. |
| 2018/0066422 | A1 | 3/2018 | Allard, III |
| 2018/0144418 | A1 * | 5/2018 | Ravid ................. G01M 3/2807 |
| 2018/0198639 | A1 | 7/2018 | Ishizaka |
| 2018/0240322 | A1 * | 8/2018 | Potucek .................... E04H 4/14 |
| 2018/0262573 | A1 | 9/2018 | Przybylski et al. |
| 2018/0293877 | A1 | 10/2018 | Barth |
| 2018/0354777 | A1 | 12/2018 | Slater et al. |
| 2019/0001863 | A1 | 1/2019 | Taylor |
| 2019/0051214 | A1 | 2/2019 | Roark |
| 2019/0351442 | A1 | 11/2019 | Mcnulty et al. |
| 2019/0353278 | A1 | 11/2019 | Bush et al. |
| 2019/0354535 | A1 | 11/2019 | Amin et al. |
| 2019/0359477 | A1 | 11/2019 | Wegelin et al. |
| 2019/0360184 | A1 | 11/2019 | Lawinger |
| 2019/0362617 | A1 | 11/2019 | Bonner et al. |
| 2019/0387058 | A1 | 12/2019 | Heller |
| 2019/0392377 | A1 | 12/2019 | Munir et al. |
| 2020/0011005 | A1 | 1/2020 | Okumura et al. |
| 2020/0032497 | A1 | 1/2020 | Wu |
| 2020/0097030 | A1 | 3/2020 | Carlson |
| 2020/0098199 | A1 | 3/2020 | Bullock |
| 2020/0099679 | A1 | 3/2020 | Carlson |
| 2020/0140254 | A1 | 5/2020 | Slater et al. |
| 2020/0141773 | A1 | 5/2020 | Burke et al. |
| 2020/0145257 | A1 | 5/2020 | Samudrala et al. |
| 2020/0217057 | A1 | 7/2020 | Spiro et al. |
| 2020/0232832 | A1 | 7/2020 | Burke et al. |
| 2020/0314866 | A1 | 10/2020 | Wegelin et al. |
| 2020/0358852 | A1 | 11/2020 | Burke et al. |
| 2020/0404357 | A1 | 12/2020 | Kulkarni et al. |
| 2021/0027402 | A1 | 1/2021 | Davis et al. |
| 2021/0144210 | A1 | 5/2021 | Kolhapure et al. |
| 2021/0301985 | A1 | 9/2021 | Brown et al. |
| 2021/0358293 | A1 | 11/2021 | Tournier et al. |

(56)  References Cited

U.S. PATENT DOCUMENTS

| | | |
|---|---|---|
| 2022/0020249 A1 | 1/2022 | Castellano |
| 2022/0107632 A1 | 4/2022 | Sinha et al. |

FOREIGN PATENT DOCUMENTS

| | | |
|---|---|---|
| CN | 112258542 A | 1/2021 |
| JP | 07311280 A | 11/1995 |
| JP | 2002021149 A | 1/2002 |
| JP | 2002148354 A | 5/2002 |
| JP | 2004117250 A | 4/2004 |
| JP | 2004213358 A | 7/2004 |
| JP | 2004258927 A | 9/2004 |
| JP | 2010216821 A | 9/2010 |
| JP | 2019083360 A | 5/2019 |
| JP | 2020051757 A | 4/2020 |
| KR | 101137918 B1 | 4/2012 |
| WO | 9641058 A1 | 12/1996 |

OTHER PUBLICATIONS

3 Energy Conservation,"U.S. Department of Commerce and National Bureau of Standards, Jul. 1980, <hllps://www.Jovinfo .gov/content/pkg/GOVPUB-C 13-e5481618eda4a4 71a0aab647d520b129/pdf/GOVPUB-C 3-~5481618eda4a471a0aab647d520b129.pdf>, (54 pages)."

Lighting Answers, "Controlling Lighting with Building Automation Systems," vol. 4, No. 1, May 1997, <https://www.lightingassociales.org/i/u/2127806/f/lech sheets/Lighting_ Control .pdf>, (8 pages).

Johnson Controls, "Melasys forValidaled Environments (MVE)," Product Bulletin, Dec. 15, 2001, (13 pages).

Shankar et al., "Human-tracking systems using pyroelectric infrared detectors", Optical Engineering 45(10), Oct. 2006, (10 Pages).

Trane, "Tracer SC System Controller for Tracer Building Automated Systems," Product Catalog, P/N BAS-PRC031-EH, Jun. 10, 2013, (27 Pages.

Acuitycontrols, "nLight Network Lighting Control," Copyright 2014, (78 pages).

Yang et al. "A novel low-cost and small-size human tracking system with pyroelectric infrared sensor mesh network," Infr. Phys. Technol., vol. 63, Mar. 2014, pp. 147-156.

3E, "Lightsweep Lighing Control System," Product Literature, Dec. 8, 2015, (12 Pages).

Acuitycontrols, "SensorView Manual," Nov. 3, 2015, (123 pages).

Gallli, "Movement Direction and Distance Classification Using a Single PIR Sensor," in IEEE Sensors Letters, vol. 2, No. 1, Mar. 2018, pp. 1-4.

Utron, "Quantum Unlimited Capability for High-Performance Buildings," Product Literature, P/N 367-1321, Apr. 9, 2018, (20 pages).

Density, "Introducing Density Open Area" website: https://www.density.io/, dated Oct. 8, 2020 (7 Pages.

Haltian, "Thingsee Presence" webpage: https://haltian.com/product/thingsee-presence/, publicly available at least as early as Nov. 10, 2020 (2 Pages.

Occupancy Lights, Social Distancing Technology, Powerpoint Page, publicly available at least as early as Nov. 10, 2020.

Utron, "Whal is Lighting Control System," Product Literature 366-396h, publicly available prior to Nov. 19, 2020, (19 pages).

Perra et al., "Monitoring Indoor People Presence in Buildings Using Low-Cost Infrared Sensor Array in Doorways", Sensors 2021,21,4062., Published Jun. 12, 2021 (19 Pages).

Tooshlights, "Small upgrade. Big improvement, How it works", Copyright 2021 product brochure, (6 Pages.

Tooshlights, Product website: https://tooshlights.com/products/, Copyright 2021, (11 Pages).

Wang et al., "A Lightweight People Counting Approach for Smart Buildings," 2021 13th International Conference on Wireless Communications and Signal Processing (WCSP), pp. 1-5.

Jiang et al., "Residential House Occupancy Detection: Trust-Based Scheme Using Economic and Privacy-Aware Sensors," in IEEE Internet of Things Journal, vol. 9, No. 3, Feb. 1, 2022, pp. 1938-1950.

* cited by examiner

98

|   | A | B | C | D | E |
|---|---|---|---|---|---|
| 1 | DATE | STATUS | NAME | LOCATION | MAINTENANCE |
| 2 | 11/29/2019 | SCHEDULED | FAUCET MONITOR | REXNORD BUILDING > FLOOR2 > GENDER NEUTRAL BATHROOM > TEST | REPLACE |
| 3 | 12/1/2019 | SCHEDULED | BETA FV 36 | CARY > FLOOR 1 > WEST ROOM > CARY | PREVENTATIVE MAINTENANCE |
| 4 | 12/6/2019 | PENDING | FLUSH VALVE MONITOR-RT3LE3YMJ | ZURN HQ > 2ND FLOOR > WOMEN'S RESTROOM | PREVENTATIVE MAINTENANCE |
| 5 | 12/10/2019 | SCHEDULED | BETA FV 39 / CARY LABS | CARY>FLOOR1>WEST ROOM>PAULS ROOM | REPAIR |
| 6 | 12/20/2019 | SCHEDULED | FLUSH VALVE MONITOR-RKBRDUG54 | PAUL'S COOL BUILDING > PAUL'S COOL ROOM > TESTING | REPAIR |
| 7 | 12/22/2019 | SCHEDULED | FLUSH VALVE MONITOR-C88NAUJGL | REXNORD BUILDING > FLOOR2 > GENDER NEUTRAL BATHROOM > TEST | REPLACE |
| 8 | 1/21/2020 | SCHEDULED | FLUSH VALVE MONITOR-RT3LE3YMJ | ZURN HQ > 2ND FLOOR > WOMEN'S RESTROOM | PREVENTATIVE MAINTENANCE |
| 9 | 2/7/2020 | PENDING | BETA BF 7 TESTS | CARY > FLOOR 1 > EAST ROOM > CARY, NC, ENVIRONMENTAL TEST LAB? | REPAIR |
| 10 | 2/27/2020 | PENDING | FAUCET MONITOR - N8TKQCMY4 | GLOBAL WATER CENTER > 6TH FLOOR > ADV ELECTRONICS ENGR LABS > ANNE'S DESK | PREVENTATIVE MAINTENANCE |
| 11 | 3/28/2020 | SCHEDULED | MODEL 375AST W/ WIRELESS MONITOR TEST | BACKFLOW TOWER > FLOOR5 > NORTH CLOSET > NEW TEST | REPLACEMENT |

*FIG. 6*

|   | A | B | C | D | E | F |
|---|---|---|---|---|---|---|
| 1 | PRODUCT | BUILDING | FLOOR | ROOM | LOCATION | PRODUCT TYPE |
| 2 | REPLACEMENT FOR FAUCET #63 - URTNQ445Q | ZURN HQ | 2ND FLOOR | MEN'S RESTROOM | 1ST SINK FROM DOOR | Z6950-XL-S-ACA-W1-E |
| 3 | FAUCET MONITOR #33 - EQ8BZ53PF | ZURN HQ | 2ND FLOOR | WOMEN'S RESTROOM | 3RD SINK FROM DOOR | Z6950-XL-S-ACA-W1-E |
| 4 | FLUSH VALVE MONITOR - RT3LE3YMJ | ZURN HQ | 2ND FLOOR | WOMEN'S RESTROOM |  | ZEMS6000AV-HET0012 |
| 5 | REPLACEMENT FOR FAUCET #57 - 2U88GBUBP | ZURN HQ | 2ND FLOOR | MEN'S RESTROOM | 2ND SINK FROM DOOR | Z6955-XL-S-ACA-W1-E |
| 6 | FAUCET MONITOR #43 - 9FFMW5M72 | ZURN HQ | 2ND FLOOR | WOMEN'S RESTROOM | 2ND SINK FROM DOOR | Z6955-XL-S-CWB-W1-E |
| 7 | REPLACEMENT FOR FAUCET #44 - BFCF66K5E | ZURN HQ | 2ND FLOOR | MEN'S RESTROOM | 3RD SINK FROM DOOR | Z6955-XL-S-CWB-W1-E |
| 8 | FAUCET MONITOR #63 - N8X6EMRUT | ZURN HQ | 2ND FLOOR | MEN'S RESTROOM | 1ST SINK FROM DOOR | Z6955-XL-S-CWB-W1-E |
| 9 | FAUCET MONITOR #34 - BCB45BNBB | ZURN HQ | 2ND FLOOR | WOMEN'S RESTROOM | 1ST SINK FROM DOOR | Z6955-XL-S-CWB-W1-E |

*FIG. 7*

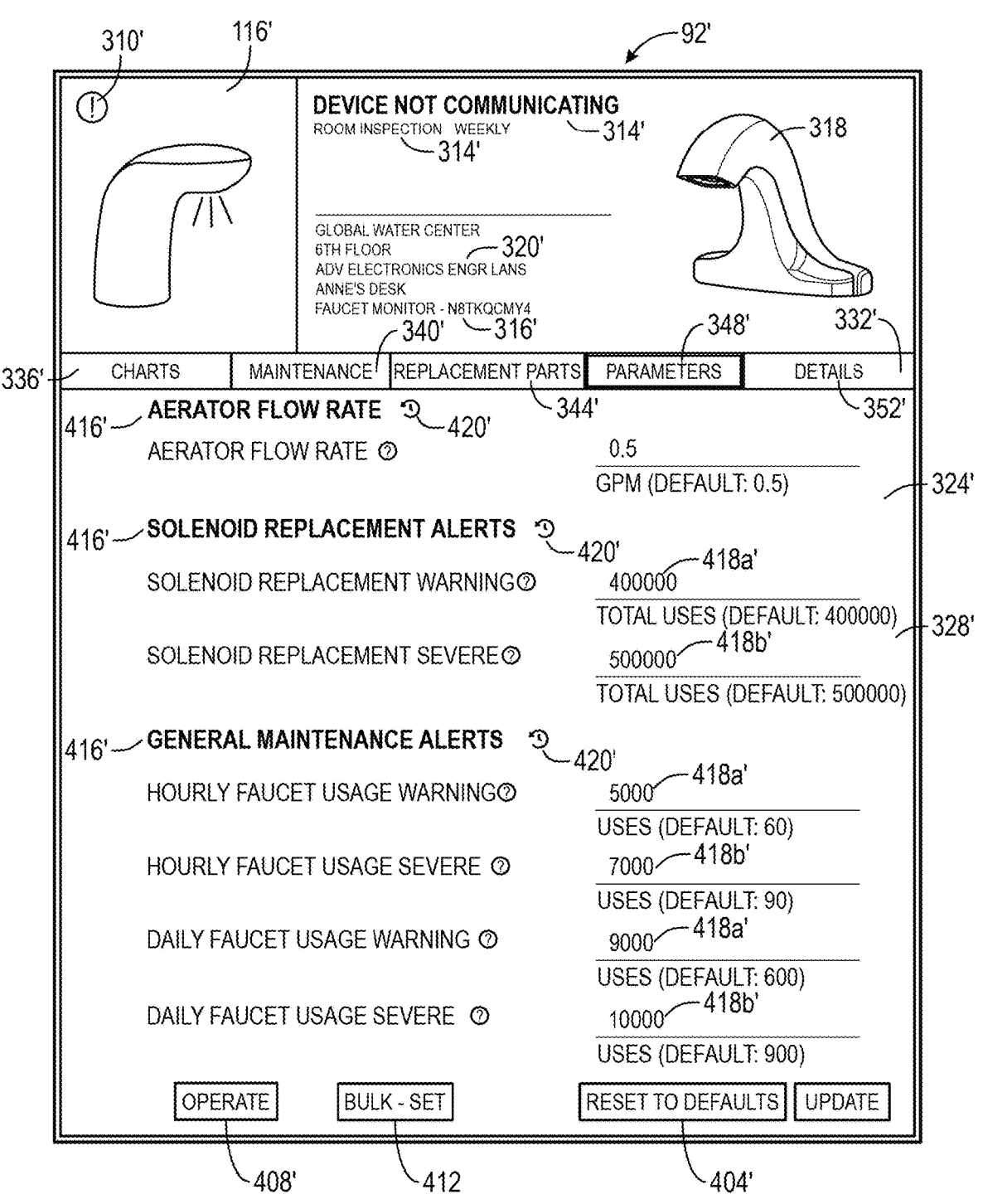

DEVICE NOT COMMUNICATING
ROOM INSPECTION   WEEKLY

GLOBAL WATER CENTER
6TH FLOOR
ADV ELECTRONICS ENGR LANS
ANNE'S DESK
FAUCET MONITOR - N8TKQCMY4

| CHARTS | MAINTENANCE | REPLACEMENT PARTS | PARAMETERS | DETAILS |
|---|---|---|---|---|

AERATOR FLOW RATE

AERATOR FLOW RATE    0.5
                     GPM (DEFAULT: 0.5)

SOLENOID REPLACEMENT ALERTS

SOLENOID REPLACEMENT WARNING    400000
                                TOTAL USES (DEFAULT: 400000)

SOLENOID REPLACEMENT SEVERE    500000
                               TOTAL USES (DEFAULT: 500000)

GENERAL MAINTENANCE ALERTS

HOURLY FAUCET USAGE WARNING    5000
                               USES (DEFAULT: 60)

HOURLY FAUCET USAGE SEVERE    7000
                              USES (DEFAULT: 90)

DAILY FAUCET USAGE WARNING    9000
                              USES (DEFAULT: 600)

DAILY FAUCET USAGE SEVERE    10000
                             USES (DEFAULT: 900)

| OPERATE | BULK - SET | | RESET TO DEFAULTS | UPDATE |
|---|---|---|---|---|

FIG. 10D

PRODUCT REGISTRATION

YOU MAY NOW BEGIN REGISTERING YOUR CONNECTED PRODUCTS

AT ANY POINT YOU MAY ACCESS YOUR ENTERPRISE SETUP THROUGH THE SETTINGS TAB TO MAKE CHANGES OR ADJUSTMENTS.

SERIAL #

480

ADD +

NEXT

FIG. 14A

PRODUCT REGISTRATION

YOU MAY NOW BEGIN REGISTERING YOUR CONNECTED PRODUCTS

AT ANY POINT YOU MAY ACCESS YOUR ENTERPRISE SETUP THROUGH THE SETTINGS TAB TO MAKE CHANGES OR ADJUSTMENTS.

480

480 SERIAL #    6NHHQAVBL

480 SERIAL #

SERIAL NUMBER IS REQUIRED!

480 SERIAL #

ADD +

NEXT

FIG. 14B

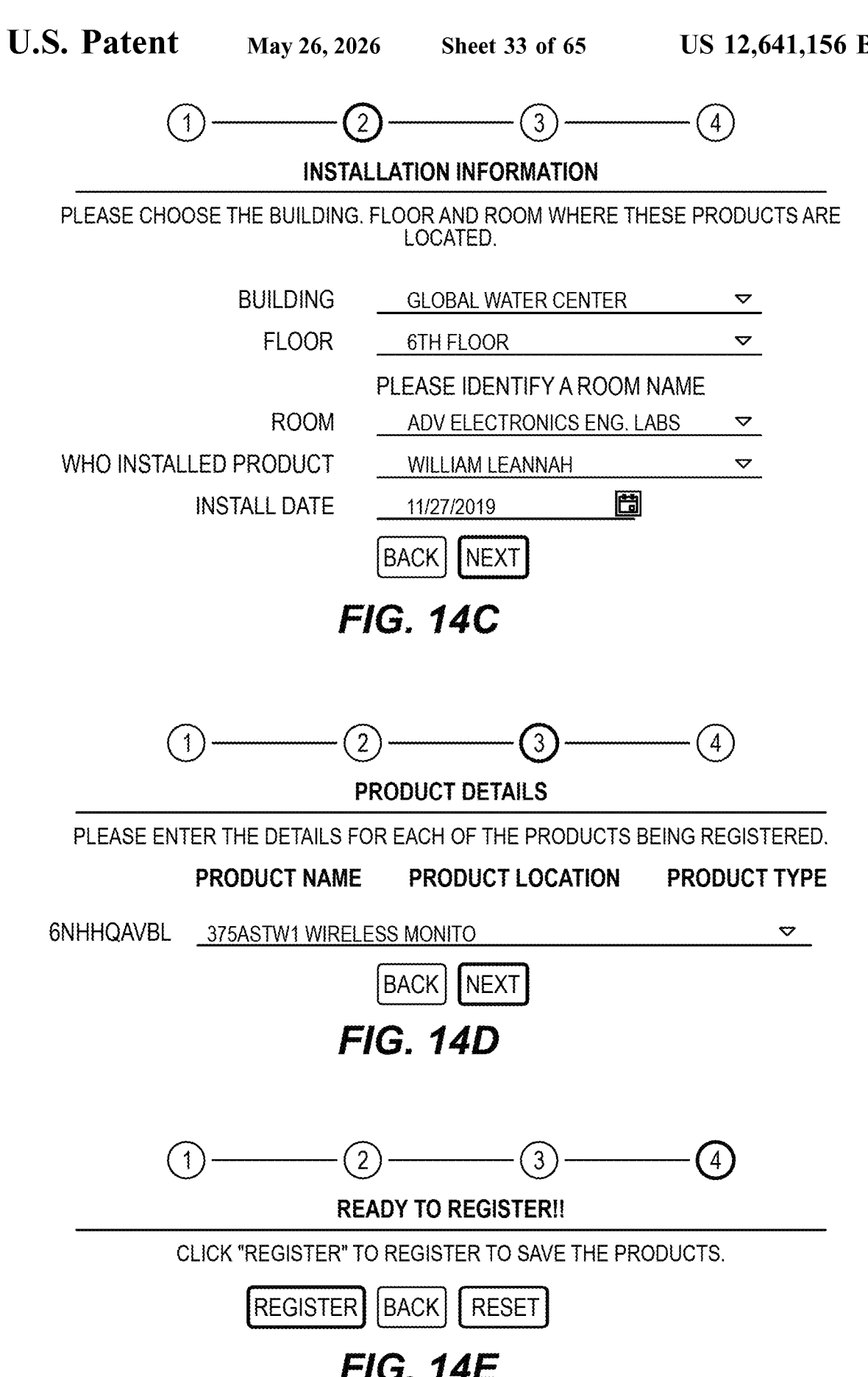

INSTALLATION INFORMATION

PLEASE CHOOSE THE BUILDING. FLOOR AND ROOM WHERE THESE PRODUCTS ARE LOCATED.

BUILDING     GLOBAL WATER CENTER ▽

FLOOR     6TH FLOOR ▽

PLEASE IDENTIFY A ROOM NAME

ROOM     ADV ELECTRONICS ENG. LABS ▽

WHO INSTALLED PRODUCT     WILLIAM LEANNAH ▽

INSTALL DATE     11/27/2019

BACK   NEXT

FIG. 14C

PRODUCT DETAILS

PLEASE ENTER THE DETAILS FOR EACH OF THE PRODUCTS BEING REGISTERED.

PRODUCT NAME     PRODUCT LOCATION     PRODUCT TYPE

6NHHQAVBL     375ASTW1 WIRELESS MONITO ▽

BACK   NEXT

FIG. 14D

READY TO REGISTER!!

CLICK "REGISTER" TO REGISTER TO SAVE THE PRODUCTS.

REGISTER   BACK   RESET

FIG. 14E

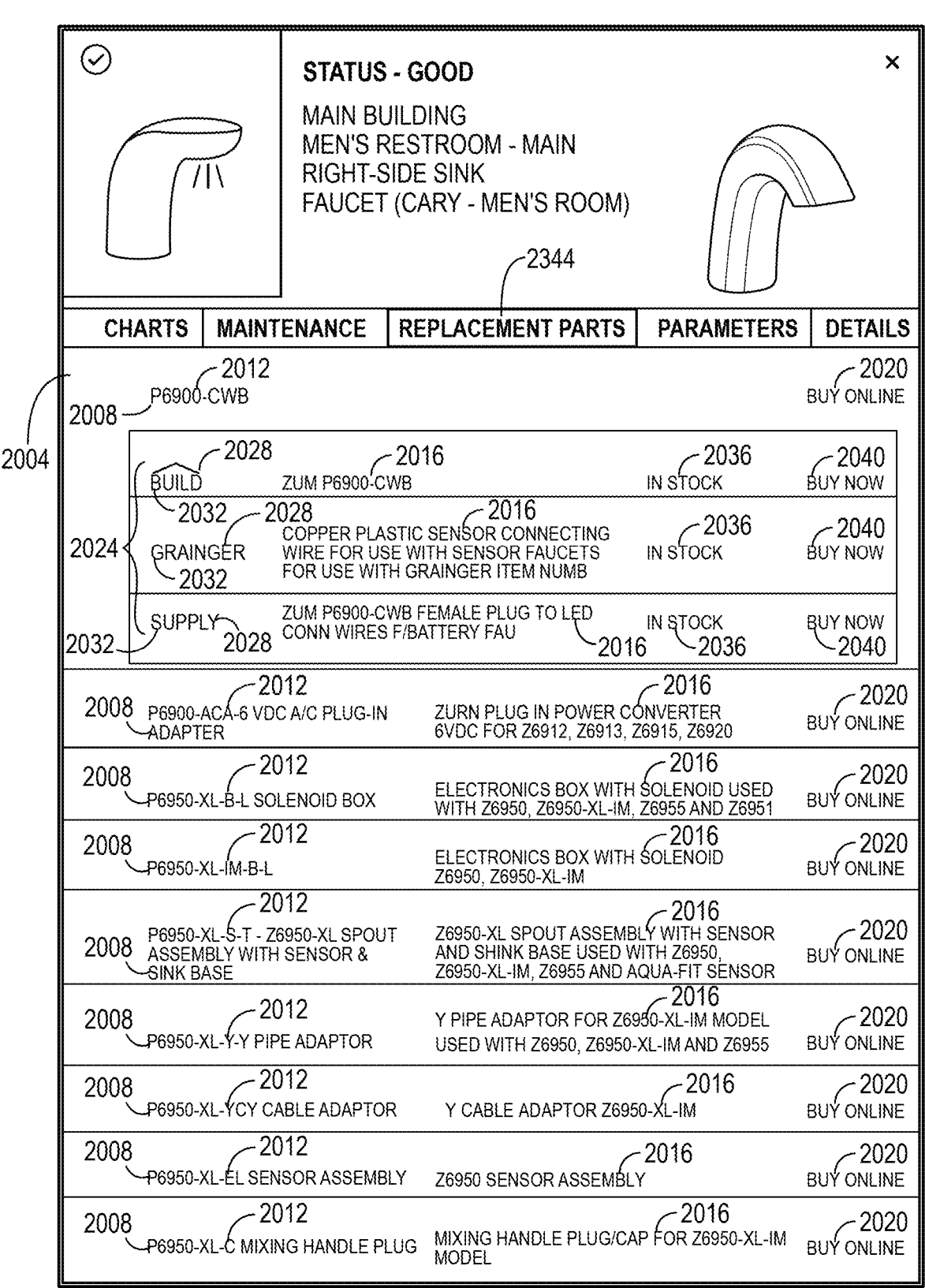

STATUS - GOOD

MAIN BUILDING
MEN'S RESTROOM - MAIN
RIGHT-SIDE SINK
FAUCET (CARY - MEN'S ROOM)

—2344

| CHARTS | MAINTENANCE | REPLACEMENT PARTS | PARAMETERS | DETAILS |

2012
P6900-CWB

2008 —

2020
BUY ONLINE

2004

2028
BUILD

2016
ZUM P6900-CWB

2036
IN STOCK

2040
BUY NOW

2024 {

2032  2028
GRAINGER
2032

2016
COPPER PLASTIC SENSOR CONNECTING
WIRE FOR USE WITH SENSOR FAUCETS
FOR USE WITH GRAINGER ITEM NUMB

2036
IN STOCK

2040
BUY NOW

2032

SUPPLY
2028

ZUM P6900-CWB FEMALE PLUG TO LED
CONN WIRES F/BATTERY FAU

2016

2036
IN STOCK
2016

2040
BUY NOW
2040

2008

2012
P6900-ACA-6 VDC A/C PLUG-IN
ADAPTER

2016
ZURN PLUG IN POWER CONVERTER
6VDC FOR Z6912, Z6913, Z6915, Z6920

2020
BUY ONLINE

2008

2012
P6950-XL-B-L SOLENOID BOX

2016
ELECTRONICS BOX WITH SOLENOID USED
WITH Z6950, Z6950-XL-IM, Z6955 AND Z6951

2020
BUY ONLINE

2008

2012
P6950-XL-IM-B-L

2016
ELECTRONICS BOX WITH SOLENOID
Z6950, Z6950-XL-IM

2020
BUY ONLINE

2008

2012
P6950-XL-S-T - Z6950-XL SPOUT
ASSEMBLY WITH SENSOR &
SINK BASE

2016
Z6950-XL SPOUT ASSEMBLY WITH SENSOR
AND SHINK BASE USED WITH Z6950,
Z6950-XL-IM, Z6955 AND AQUA-FIT SENSOR

2020
BUY ONLINE

2008

2012
P6950-XL-Y-Y PIPE ADAPTOR

2016
Y PIPE ADAPTOR FOR Z6950-XL-IM MODEL
USED WITH Z6950, Z6950-XL-IM AND Z6955

2020
BUY ONLINE

2008

2012
P6950-XL-YCY CABLE ADAPTOR

2016
Y CABLE ADAPTOR Z6950-XL-IM

2020
BUY ONLINE

2008

2012
P6950-XL-EL SENSOR ASSEMBLY

2016
Z6950 SENSOR ASSEMBLY

2020
BUY ONLINE

2008

2012
P6950-XL-C MIXING HANDLE PLUG

2016
MIXING HANDLE PLUG/CAP FOR Z6950-XL-IM
MODEL

2020
BUY ONLINE

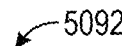

DEVICE NOT COMMUNICATING
WATER PRESSURE EXCEEDS THRESHOLD
ACV SHUTOFF

WILKINS ENGINEERING
1
LAB OFFICE
BACKFLOW (375ASTW1)-3EBPUG3J8

×

PSI 5012
5008 — 171 — 5004

| CHARTS | MAINTENANCE | REPLACEMENT PARTS | PARAMETERS | DETAILS |

NAME: BACKFLOW (375ASTW1)-3EBPUG3J8
DESCRIPTION:
LOCATION DESCRIPTION:

TYPE: BACKFLOW (FCIS)          SERIAL #: 3EBPUG3J8
MODEL:4-FCIS                  DEVICE ID: 7835A010F1C13B51

SUBSCRIPTION STATUS: DEACTIVATED
LAST HEARD FROM: 10/25/2019, 04:26 PM UTC

RECENT ALERTS

| 10/27/2019, 12:00 AM UTC | ⊘ | DAILY WATER DISCHARGE EXCEEDS THRESHOLD (ALERT CLEARED) |
| 10/27/2019, 09:29 PM UTC | ⊙ | DEVICE NOT COMMUNICATING |
| 10/25/2019, 07:44 PM UTC | ⚠ | DEVICE NOT COMMUNICATING |
| 10/25/2019, 04:26 PM UTC | ⊘ | EVENT WATER DISCHARGE EXCEEDS THRESHOLD (ALERT CLEARED) |
| 10/25/2019, 04:26 PM UTC | ⊙ | EVENT WATER DISCHARGE EXCEEDS THRESHOLD |

WATER PRESSURE EXCEEDS THRESHOLD

ST. FRANCIS BUILDING
LOWER FLOOR
LOWER ROOM
114 WOODLAND ST. HARTFORD, CT,
45678IKJIF,ADLKSJF:IDKSJFA

BETA 13, ST FRANCIS BF LOWER...

PSI 77 — 5012

5008 — 5004

✕

| CHARTS | MAINTENANCE | REPLACEMENT PARTS | PARAMETERS | DETAILS |

NAME: BETA13, ST FRANCIS BF LOWER... ✎
DESCRIPTION: BETA 13KJD;AFLKDSJF;FLK;JSD;KLF;
LOCATION DESCRIPTION: 114 WOODLAND ST. HARTFORD, CT, 45678IKJF;ADLKSJF,DKSJFA

TYPE: BACKFLOW (375ASTWI)      SERIAL #: L9K2UE295
MODEL: 3-375ASTWI               DEVICE ID: 7835A04 183FF9208

SUBSCRIPTION STATUS: ACTIVATED
LAST HEARD FROM: 01/14/2020, 05:34 PM UTC

RECENT ALERTS

| 12/10/2019, 10:07 PM UTC | ⚠ | WATER PRESSURE EXCEEDS THRESHOLD |
| 12/10/2019, 08:07 PM UTC | ⊘ | WATER PRESSURE EXCEEDS THRESHOLD (ALERT CLEARED) |
| 11/01/2019, 07:21 PM UTC | ⚠ | WATER PRESSURE EXCEEDS THRESHOLD |
| 11/01/2019, 06:21 PM UTC | ⊘ | WATER PRESSURE EXCEEDS THRESHOLD (ALERT CLEARED) |
| 10/30/2019, 08:45 PM UTC | ⚠ | WATER PRESSURE EXCEEDS THRESHOLD |

DEVICE NOT COMMUNICATING
ROOM INSPECTION - WEEKLY

GLOBAL WATER CENTER
6TH FLOOR
ADV ELECTRONICS ENGR LABS
ANNE'S DESK
FAUCET MONITOR - NBTKQCMY4

SOL-ENOID LIFE 79% —5004
5012 —5008

| CHARTS | MAINTENANCE | REPLACEMENT PARTS | PARAMETERS | DETAILS |
|---|---|---|---|---|

NAME: FAUCET MONITOR - N8TKQCMY4
DESCRIPTION: POST-1MAY2019 VINTAGE DEVICE
LOCATION DESCRIPTION: ANNE'S DESK

TYPE: FAUCET      SERIAL #: N8TKQCMY4
MODEL: Z6950-XL-S-ACA-WI-F      DEVICE ID: 7835A051C842BFF5

SUBSCRIPTION STATUS: ACTIVATED
LAST HEARD FROM: 10/17/2019, 02:33 PM UTC

RECENT ALERTS

| 10/29/2019, 05:01 PM UTC | ⓘ | ROOM INSPECTION - WEEKLY |
| 10/17/2019, 07:38 PM UTC | ⓘ | DEVICE NOT COMMUNICATING |
| 10/17/2019, 05:54 PM UTC | ⚠ | DEVICE NOT COMMUNICATING |
| 10/16/2019, 01:34 PM UTC | ⊘ | DEVICE NOT COMMUNICATING (ALERT CLEARED) |
| 10/16/2019, 01:33 PM UTC | ⚠ | DEVICE NOT COMMUNICATING |

WATER PRESSURE EXCEEDS THRESHOLD
HIGH_DAILY_FLUSH_RATE

CARY
FLOOR 1
WEST ROOM
PAULS ROOM
BETA FV 39 / CARY LABS

✕

DIA-PHRAGM LIFE 99% — 5004

5012 — 5008

| CHARTS | MAINTENANCE | REPLACEMENT PARTS | PARAMETERS | DETAILS |
|--------|-------------|-------------------|------------|---------|

NAME: BETA FV 39 / CARY LABS4
DESCRIPTION: PRE-1MAY2019 VINTAGE DEVICE
LOCATION DESCRIPTION: PAULS ROOM

TYPE: FLUSH VALVE           SERIAL #: LQEVTAMR3
MODEL: ZEMS6000AV-HET.0012   DEVICE ID: 7835A038D55B9BFD

SUBSCRIPTION STATUS: ACTIVATED
LAST HEARD FROM: 01/14/2020, 05:57 PM UTC

RECENT ALERTS

| | | |
|---|---|---|
| 08/27/2019, 07:13 AM UTC | ⊘ | DEVICE NOT COMMUNICATING (ALERT CLEARED) |
| 08/27/2019, 06:35 AM UTC | ⚠ | DEVICE NOT COMMUNICATING |
| 08/25/2019, 08:36 AM UTC | ⊘ | DEVICE NOT COMMUNICATING (ALERT CLEARED) |
| 08/24/2019, 11:50 PM UTC | ⚠ | DEVICE NOT COMMUNICATING |
| 08/24/2019, 03:36 AM UTC | ⊘ | DEVICE NOT COMMUNICATING (ALERT CLEARED) |

PRODUCT DETAILS

PRODUCT INFORMATION    7032

NAME     BACKFLOW (375ASTW1)-WKFMA8SJ9    7094

SERIAL     WKFMA8SJ9

PRODUCT ID

PRODUCT TYPE     BACKFLOW (FCIS)

MODEL     3-FCIS

LOCATION     ZURN WILKINS    7036

SUBSCRIPTION DETAILS

SUBSCRIPTION STATE     ACTIVATED

ACTIVATION DATE     2019-12-26T23:08:19Z

LAST HEARD FROM     2019-12-26T23:11:24Z    7040

LOCATION DETAILS

PRODUCT DETAILS

7094

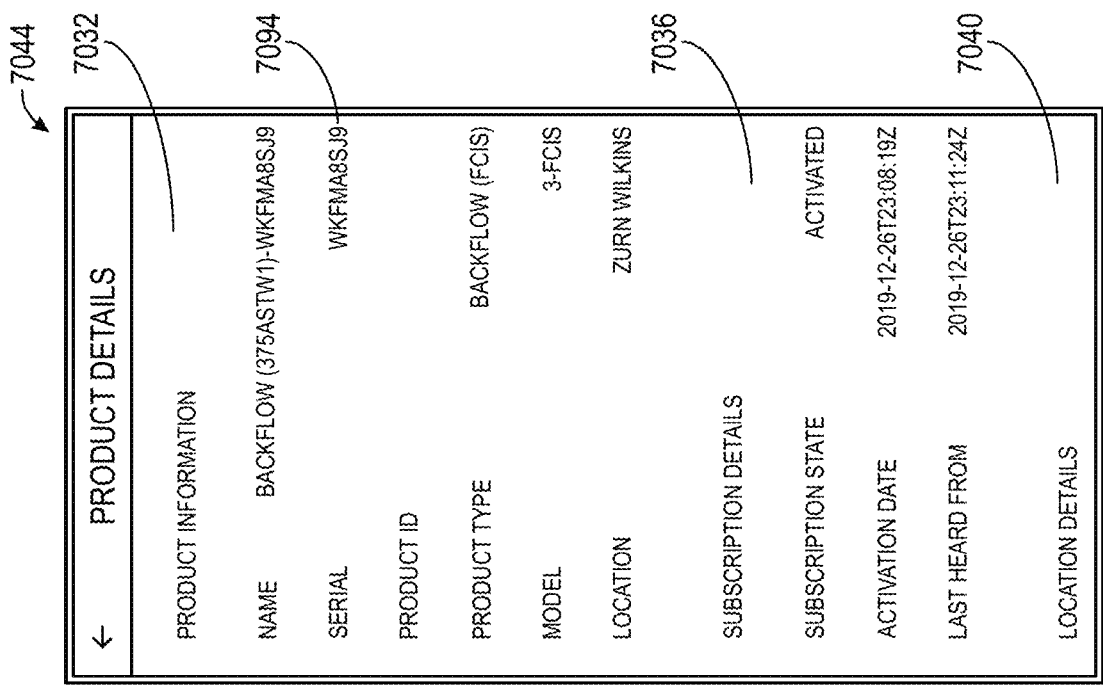

7026

ALERTS ⓘ

DEVICE NOT COMMUNICATING

THE LAST MESSAGE FROM THE DEVICE WAS AT 2019-12-26T23:11:24.710Z

7032

7116

PRODUCT INFORMATION

NAME     BACKFLOW (375ASTW1)-WKFMA8SJ9

COMPANY

REGISTER PRODUCT

FIND THE QR CODE THAT CAME WITH YOUR PRODUCT PACKAGING AND SCAN IT

IF REGISTERING AN FCIS, THE QR CODE IS ON THE PRODUCT ITSELF.

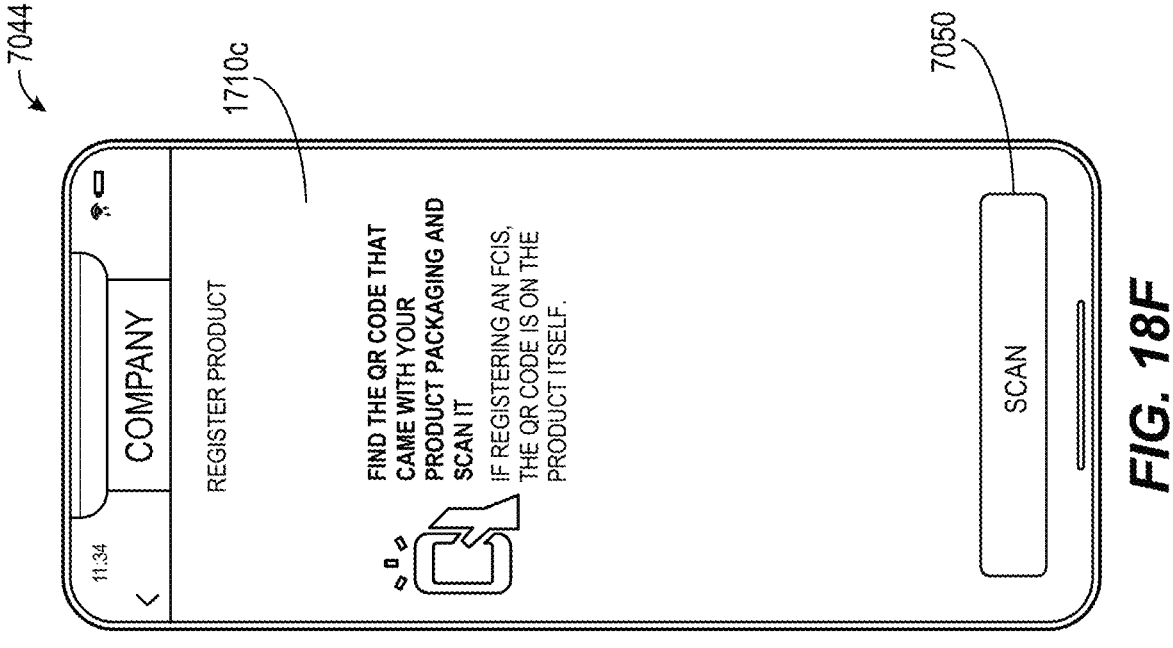

SCAN

PRODUCT DETAILS

7032

PRODUCT ID

PRODUCT TYPE     BACKFLOW (FCIS)

7094

MODEL     3-FCIS

LOCATION     ZURN WILKINS

7036

SUBSCRIPTION DETAILS

SUBSCRIPTION STATE     ACTIVATED

ACTIVATION DATE     2019-12-26T23:08:19Z

LAST HEARD FROM     2019-12-26T23:11:24Z

LOCATION DETAILS

7040

BUILDING     BUILDING 1

FLOOR     FLOOR 1

ROOM     ROOM 1

COMPANY

REGISTER PRODUCT

CONGRATS! YOUR PRODUCT IS NOW REGISTERED TO YOUR ENTERPRISE IN THE PLUMBSMART PORTAL.

IN ORDER TO MAKE PRODUCTS LIVE, YOUR ENTERPRISE ADMINISTRATOR WILL BE NEED SUBSCRIBE THE PRODUCT.

PRESS THE 'GO' BUTTON BELOW TO REGISTER MORE PRODUCTS. PRESS 'DONE' BUTTON IF YOU ARE COMPLETE.

DONE          GO

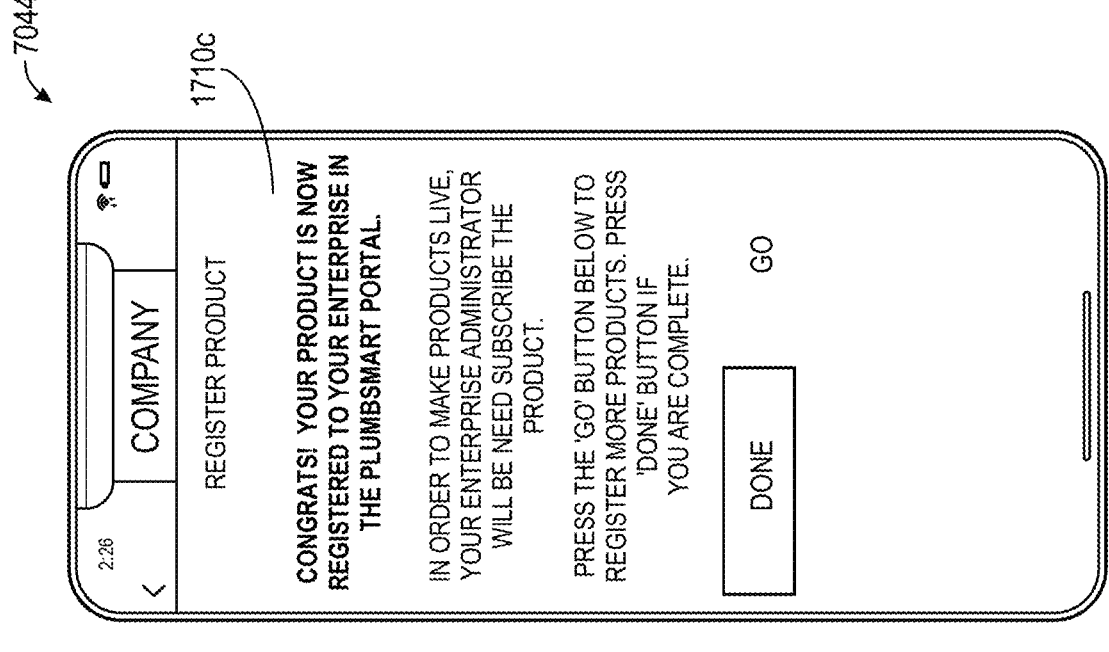

COMPANY

ROOM     ADV ELECTRONICS ENGR...

PRODUCT INFORMATION

IT'S HELPFUL TO GIVE THE SPECIFIER LOCATION OF THE PRODUCT BEING INSTALLED EXAMPLE SECOND FROM DOOR

INSTALLED LOCATION          FIRST

PRODUCT TYPE          10-375ASTW1

PRODUCT NAME          SIDE11

INSTALLER

INFORMATION

INSTALLER NAME          A. CHOURASIA

INSTALL DATE          01/14/2020

NEXT

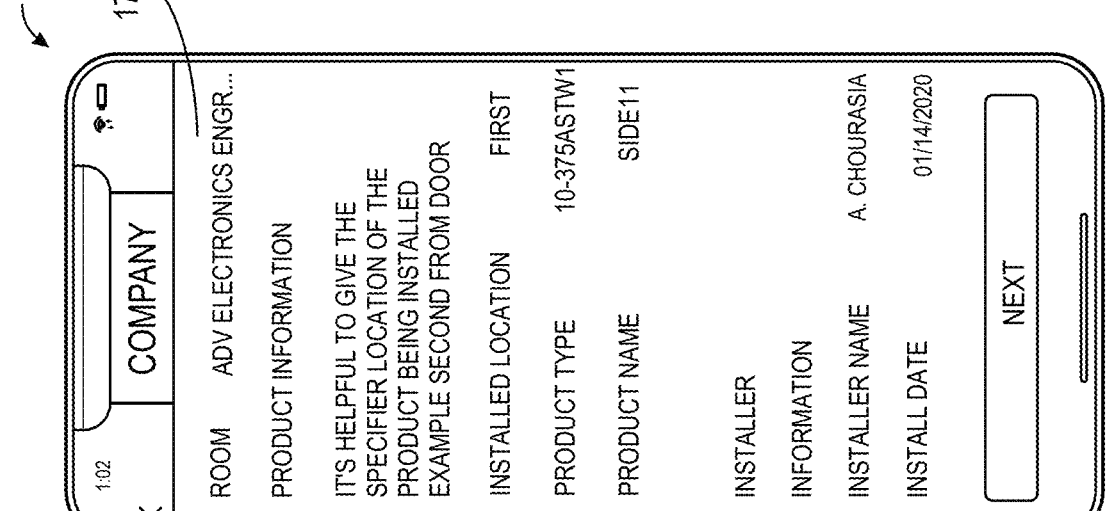

← MAINTENANCE

STATUS SCHEDULED

DATE 2/7/2020

SERVICE TYPE PREVENTATIVE MAINTENANCE

MAINTENANCE TYPE SOLENOID

COMMENTS

SAVE

1:32

← MAINTENANCE +

JAN FEB MAR APR MAY JUN

CANCEL

STATUS SELECT STATUS

DATE 2/10/2020

SERVICE TYPE SELECT SERVICE TYPE

MAINTENANCE TYPE MAINTENANCE TYPE

COMMENTS COMMENTS

SAVE

Figure 23:
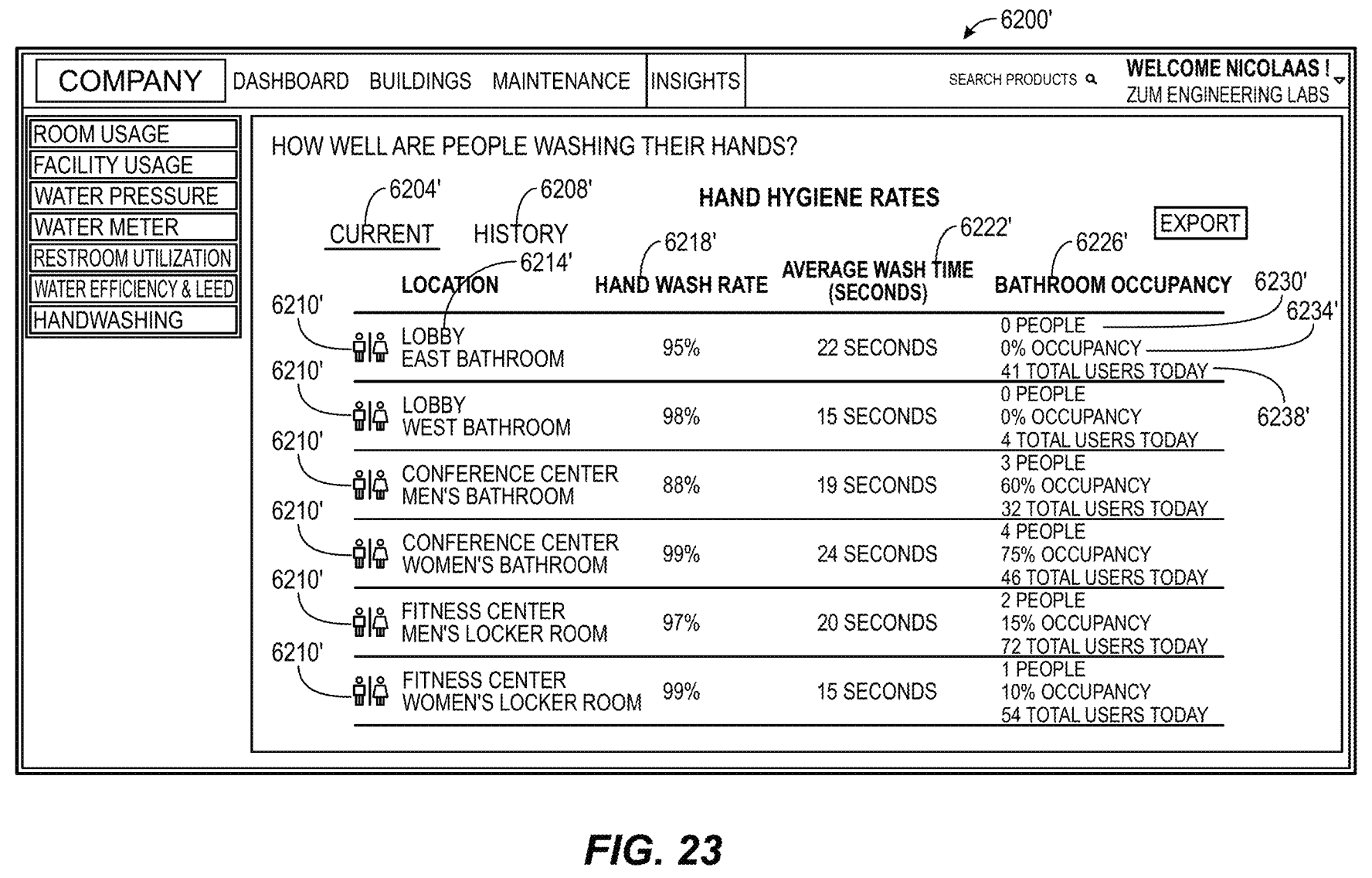

6200'

COMPANY | DASHBOARD  BUILDINGS  MAINTENANCE | INSIGHTS

SEARCH PRODUCTS ⌕

WELCOME NICOLAAS !
ZUM ENGINEERING LABS

ROOM USAGE
FACILITY USAGE
WATER PRESSURE
WATER METER
RESTROOM UTILIZATION
WATER EFFICIENCY & LEED
HANDWASHING

HOW WELL ARE PEOPLE WASHING THEIR HANDS?

HAND HYGIENE RATES

6204'   6208'
CURRENT   HISTORY   6214'

6218'                 6222'   6226'
LOCATION    HAND WASH RATE    AVERAGE WASH TIME    BATHROOM OCCUPANCY    6230'
                             (SECONDS)                                   6234'

EXPORT

| LOCATION | HAND WASH RATE | AVERAGE WASH TIME (SECONDS) | BATHROOM OCCUPANCY |
|---|---|---|---|
| LOBBY EAST BATHROOM | 95% | 22 SECONDS | 0 PEOPLE / 0% OCCUPANCY / 41 TOTAL USERS TODAY |
| LOBBY WEST BATHROOM | 98% | 15 SECONDS | 0 PEOPLE / 0% OCCUPANCY / 4 TOTAL USERS TODAY  6238' |
| CONFERENCE CENTER MEN'S BATHROOM | 88% | 19 SECONDS | 3 PEOPLE / 60% OCCUPANCY / 32 TOTAL USERS TODAY |
| CONFERENCE CENTER WOMEN'S BATHROOM | 99% | 24 SECONDS | 4 PEOPLE / 75% OCCUPANCY / 46 TOTAL USERS TODAY |
| FITNESS CENTER MEN'S LOCKER ROOM | 97% | 20 SECONDS | 2 PEOPLE / 15% OCCUPANCY / 72 TOTAL USERS TODAY |
| FITNESS CENTER WOMEN'S LOCKER ROOM | 99% | 15 SECONDS | 1 PEOPLE / 10% OCCUPANCY / 54 TOTAL USERS TODAY |

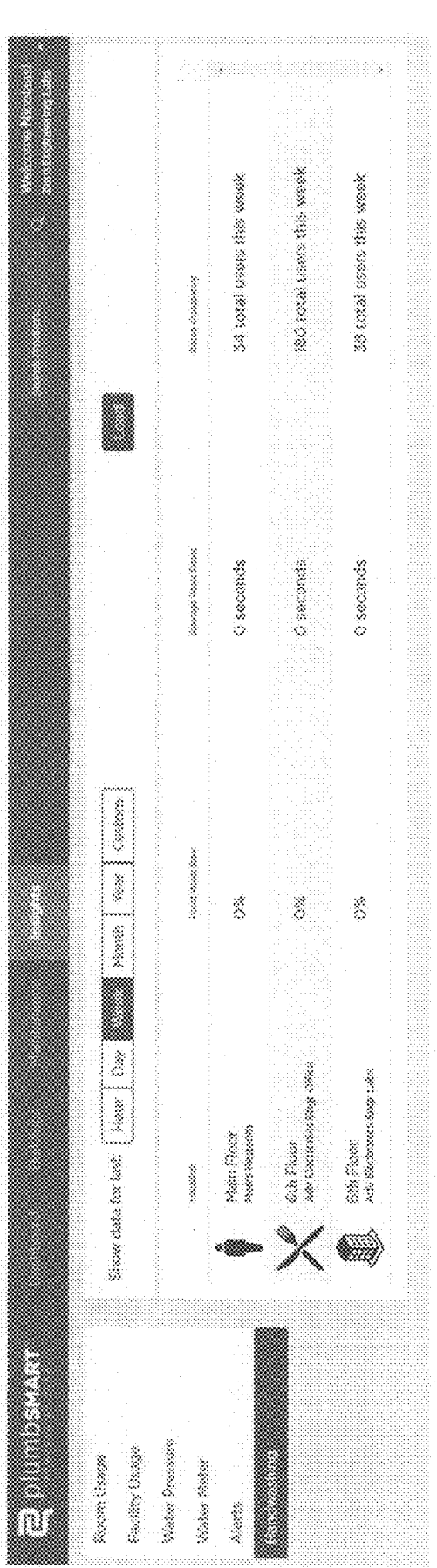
Fig. 30

WATER MANAGEMENT SYSTEM AND USER INTERFACE

RELATED APPLICATIONS

This application is a continuation of U.S. patent application Ser. No. 17/114,441, filed Dec. 7, 2020, which claims priority to U.S. Provisional patent application Ser. No. 62/944,930, filed Dec. 6, 2019; U.S. Provisional Patent application Ser. No. 62/962,024, filed Jan. 16, 2020; U.S. Provisional Patent Application No. 63/007,910, filed Apr. 9, 2020; and U.S. Provisional patent application Ser. No. 63/059,757, filed Jul. 31, 2020. The contents of each reference is hereby incorporated by reference.

FIELD

Embodiments described herein relate to a water management system and user interface for controlling and receiving information related to various water management fixtures, such as, flush valves, faucets, backflow preventers, drains (e.g., roof and floor), hand dryers, soap dispensers, grease interceptors, and flow meters. The water management system and user interface may be implemented by commercial, municipal, industrial, and residential users of water management fixtures.

BRIEF DESCRIPTION OF THE DRAWINGS

FIG. 6 illustrates spreadsheet exported from data included in the upcoming maintenance widget.

FIG. 7 illustrates spreadsheet exported from data included in the products list.

FIGS. 10A-10E illustrate another embodiment of a fixture profile page.

FIGS. 14A-14E illustrate the registration screens of an interface for use with the system of FIG. 1.

FIG. 16 illustrate another embodiment of a fixture profile.

FIGS. 17A-D illustrate another embodiment of a fixture profile.

FIG. 23 illustrates a room profile displaying the number of uses and a handwashing score.

FIG. 28 illustrates a facility usage display.

FIG. 30 illustrates an embodiment of a handwashing display.

BRIEF DESCRIPTION

Figure 1:
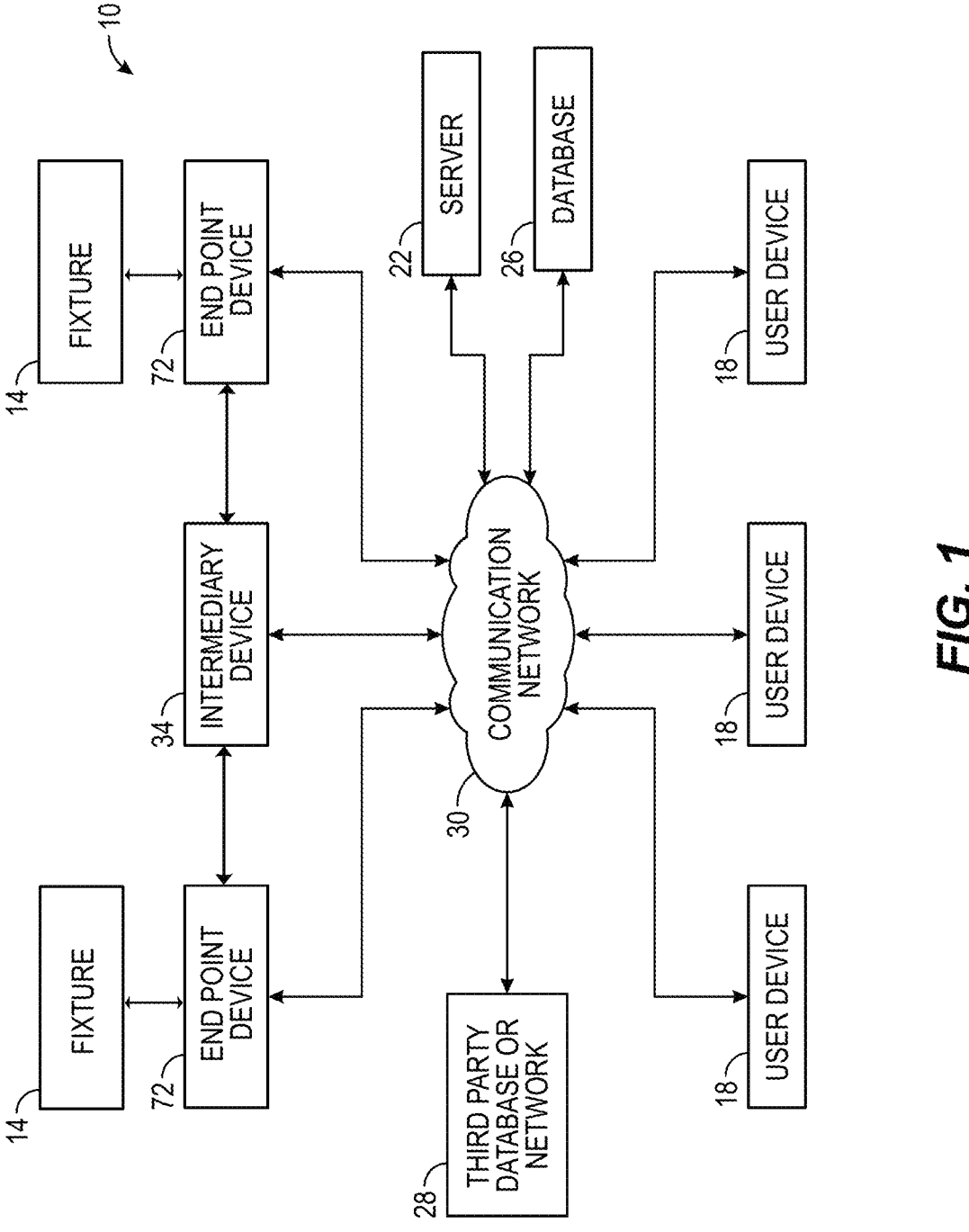
FIG. 1 is a schematic view of a system for monitoring and managing water management fixtures.

In some embodiments, a water management system including a first end point device in communication with a first fixture, the first end point including a first end point electronic processor configured to receive data associated with the first fixture and a first fixture identifier. The water management system also including a non-transitory computer-readable medium storing instructions executable by at least one electronic processor to perform a set of functions. The set of functions including receiving the data associated with the first fixture and the first fixture identifier, associating the first fixture identifier with a first location classification and a first type classification, processing the data associated with the first fixture to organize the data based at least in part on the first location classification associated with the first fixture identifier or the first type classification associated with the first fixture identifier, and transmitting the organized data of the first fixture to a user device for display.

In other embodiments, a water management system including an end point device in communication with a fixture in fluid communication with a water source and having a valve, the end point device including an end point device electronic processor configured to receive data associated with the fixture and a fixture identifier, and a non-transitory computer-readable medium storing instructions executable by at least one electronic processor to perform a set of functions, the set of functions including receiving the data associated with the fixture and the fixture identifier, processing the data associated with the fixture to organize the data, analyzing the processed data to generate instructions to open or close the valve, and transmitting the instructions to the end point device, and where the end point device communicates with the fixture to open or close the valve in accordance with the instructions, and wherein the fixture is configured to open or close the valve in accordance with the instructions.

In another embodiment, a water management system including an end point device in communication with a first fixture having a first fixture identifier, a non-transitory computer-readable medium storing instructions executable by at least one electronic processor to perform a set of functions. The set of function including receiving data from a user device, analyzing the data to generate a target flow rate and a fixture identifier, transmitting instructions to the end point device associated with the first fixture identifier, wherein the instructions include the target flow rate, where the first fixture includes a valve configured to maintain a flow of water through the fixture at the target flow rate, the end point device including an end point device electronic processor configured to receive data associated with the first fixture, the first fixture identifier, and instructions from the non-transitory computer-readable medium, and memory, accessible by the end point device electronic processor, the memory configured to store the first fixture identifier and the target flow rate, where the end point electronic processor is configured to receive the instructions received from the non-transitory computer-readable medium and adjust the target flow rate stored in memory based on the received instructions.

In another embodiment, a water management system including an end point device in communication with a fixture having a valve configured to maintain a flow of water through the fixture at a target flow rate, the end point device including an end point device electronic processor configured to receive data associated with the fixture and a fixture identifier, a non-transitory computer-readable medium storing instructions executable by at least one electronic processor to perform a set of functions, the set of functions including receiving the data associated with the fixture and the fixture identifier, associating the fixture identifier with a location classification, a type classification, and a target flow rate to produce a fixture profile, and transmitting the fixture profile to a user device for display.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a fixture or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

This disclosure describes an enterprise-wide water management system for various end point devices and their associated fixtures connected to one or more networks. The end point devices and their associated fixtures may utilize water, but are not required to utilize water to be a component of the system. The end point devices include sensors or other electro-mechanical devices that operatively interact with or are built into the fixtures allowing the end point device to collect data and provide that data to the system. The data can be manipulated, analyzed, and displayed to a user of the system to provide intelligent information on usage, repair needs, preventative maintenance needs, and replenishment needs. As a result, the enterprise can develop efficiencies and receive data on how their facilities are being used to better service and up-time for the end point devices.

The system provides an interface that the user can interact with to develop a customized dashboard with windows/widgets pertinent to the enterprise, specific building, or even a specific location within a building. The user can select from different widgets that are available. Widgets collect and display different information, which is customizable by the user. Relevant operational parameters of end point devices and thresholds can be customized by the user through the interface. In other words, a user has the ability to change, via an end point device, how a fixture operates or make adjustments to default settings, e.g., how long a faucet runs after activation. The system interface also provides alerts when operational thresholds are exceeded and allows a user to send commands to an end point device, e.g., shut down or shut off, through the interface.

The system provides a maintenance log for displaying a historical log of maintenance performed on the end point devices. The system also provides a calendar to organize scheduled maintenance and/or required repairs based on historical usage and/or forecasted information. The calendar functionality provides the user the ability to change and "lock in" the maintenance date for an end point device that may or may not specifically coincide with the system-generated scheduled maintenance date. The calendar can be populated with all fixtures in the enterprise, including fixtures from different manufacturers and provide maintenance and/or repair data for each device. The calendar can show the date due for maintenance or repair and the maintenance needs can be sorted based on different criteria, such as, by season, month, or week for maximum efficiency and reduced building downtime in view of building usage (e.g., timing maintenance of school around summer or other school vacations). The calendar data can be sorted by product type, location, overdue maintenance, and the like. The calendar also provides the ability to access and display a fixture's maintenance log (historical and/or future, other maintenance details, alert parameters, etc.) by selecting a maintenance event for that fixture on the calendar. This view through the calendar is in addition to a separate access screen through a product screen (described below). The system can be used to collect data showing whether recommended maintenance was ignored or there was a change of recommended default settings for warranty verification. The system can log alert deactivations and rescheduling of maintenance or repair activities.

The system provides the ability to remotely activate a fixture via the end point devices from the cloud and to document activation and flow criteria (e.g., cycle hospital showers to prevent *Legionella*, cycle every toilet at end of the day). Additionally, the system provides the ability to lockout remote activation based on recent usage data of one or more fixtures, adjacent fixtures or data indicating entry or exit of a person from the room in which the fixture is located.

During set-up or installation of an end point device and its associated fixture, the system provides the ability to scan or otherwise enter a device ID to retrieve an information packet regarding the fixture, including a combination of device factory info (e.g., specs, model no., etc.) and user-specific info regarding the unit, its installation, and operation. This information is then automatically populated into the system. During set-up, the user can add "contextual" pictures of a fixture for display in the system.

The system can display trends. For example, the "top" water usage devices (e.g., top 5) in a particular location, building, or enterprise can be presented. This includes the ability to display at least two trends (e.g., high/low end point device measurement) over time in a view, such as displaying a daily view of pressure over time, and then switching to month or week view showing two or more subsets of the same data simultaneously). The trends may include displaying high, low, and average usage for end point devices. The user can control how often data points are taken/acquired or control how many data points make up a trend in the parameter settings.

The trends can be used to anticipate/predict/detect failure or need for maintenance in order to provide one or more alerts to the user. This is in contrast to existing practice of using digital (e.g., binary) thresholds to trigger alerts. For example, measuring pressure over time in a backflow unit, and identifying anomalies that alone do not pass a failure threshold, but that still are indicative of a change in the unit or unit's performance can provide the basis for determining maintenance (preventative or repair). The user can manage alert times, such as to set times or time ranges at which inspection alerts are sent out to personnel. The system, based at least in part upon sensor data received regarding operation of a specific fixture, a prediction can be made and displayed regarding the date at which the fixture requires maintenance (e.g., prior to the failure date of the unit). This is in contrast to a lookup table, product specification, or other such information used to set such a date. The system provides the ability to change scheduled maintenance of a fixture based upon a factor other than the fixture itself, such as when another unrelated fixture needs maintenance, time of year, anticipated environmental/user activity, etc. This ability allows personnel to prioritize alerts within a room or particular location. For example, if a room has multiple toilets with automated flush valves, and if one flush valve requires new batteries due to an alert, the user can prioritize and change all of the batteries in the flush valves in that room. In other examples, the user can prioritize and change all of the batteries in the flush valves whose maintenance window is within a pre-determined range.

Trends collected by the system, can also allow the user to adjust operational parameters based on off-hour, off-week, off-month, or off-year activity via the interface. If there is unusual activity during these off times, the system will provide alerts (e.g., for building security). Trends can identify fixtures needing maintenance based upon significantly less usage over a period of time vs. adjacent fixtures (i.e., identify unused or "neglected devices"). The system enables the ability to verify usage of adjacent fixtures before scheduling device maintenance. For example, is a toilet being skipped because no toilet paper available rather than a plumber is needed. Still further, the system may review past usage information and trends to determine when a failure has already occurred. Such trends may be based solely on the individual fixture being reviewed or as a comparison to nearby or related fixtures (e.g., the rest of the bathroom was being used all day but a particular fixture was not). In such instances, the system may also be configured to remotely shut down the fixture until maintenance can arrive and review the system (e.g., by shutting down water to the fixture, shutting down power to the fixture, triggering indicia to display, and the like).

Turning to the figures, exemplary embodiments of the water management system are shown and further described. FIG. 1 schematically illustrates a system 10 for monitoring and managing fixtures 14, such as, but not limited to, faucets, flush valves, soap dispensers, water service line monitors, backflow preventers, grease interceptors, roof drains, floor drains, acid neutralization systems, fire distribution systems, irrigation systems, thermostatic mixing valves, hand dryers, pressure sensors, flow sensors, leak detector, occupancy light sensors, air quality sensors, a door latches, valve sensors, and the like. The system 10 includes a plurality of client or user devices 18 (also referred to individually as a user device 18), a server 22, a database 26, and a communication network 30. It should be understood that the system 10 is provided as an example and, in some embodiments, the system 10 includes additional components. For example, the system 10 may include fewer or additional user devices 18, more than one communication network 30, and the like.

In still other embodiments, the system 10 may be in communication with external or third-party databases 28 to retrieve or input data such as, but not limited to, weather data, travel or navigation data, product information, water quality or other water related parameters based on locale, engineering data, and the like. Additionally, the system 10 may communicate with other programs or services to analyze data in the system 10 and apply machine learning to improve usage and data statistics for the user of the system 10. In such embodiments, the system 10 may communicate with such databases 28 to supplement calculations, readings, alerts, and the like. For example, the system 10 may rely on a third-party or external navigation database to create and navigate geo-data related to the installation location of one or more fixtures 14 (described below). In still another example, the system 10 may send data to a machine-learning database whereby improved analytics regarding the use and maintenance schedules for the fixtures 14 may be produced.

The plurality of user devices 18 and the plurality of fixtures 14 (e.g., via their corresponding end points 72, described below) communicate over the communication network 30. Portions of the communication network 30 may be implemented using a wireless network, such as a wide area network (for example, the Internet), a local area network (for example, a Bluetooth™ network, Wi-Fi, or BACNet Systems), or combinations or derivatives thereof. Alternatively or in addition, portions of the communication network 30 may be implemented using dedicated connections (such as wired or wireless connections). It should also be understood that, in some embodiments, the fixtures 14 (e.g., via their corresponding end points 72) and the plurality of user devices 18 may communicate through one or more intermediary devices 34. The user device 18 can access a secure portal, (e.g., plumbSMART™), to view the data associated with particular fixtures 14 and view operating data on multiple levels, such as data associated with a particular room, a floor in a building, or an entire building.

Figure 2:
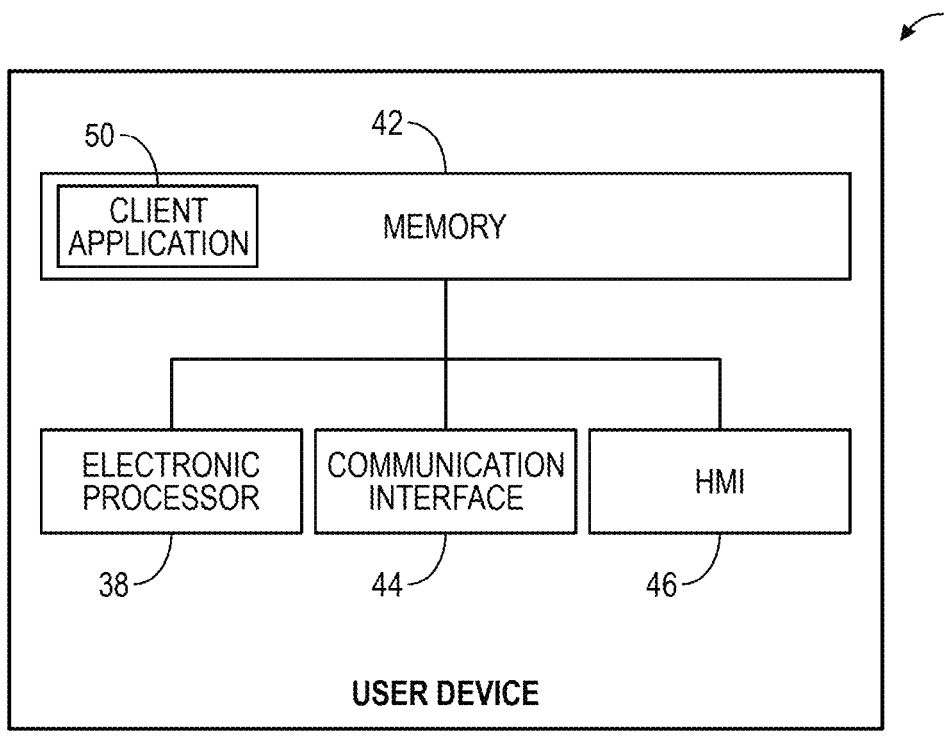
FIG. 2 is a schematic view of a user device for use with the system illustrated in FIG. 1.

In some embodiments, the user device 18 is a personal computing device, for example a desktop computer, a laptop computer, a terminal, a smart television, an electronic whiteboard, a tablet computer, a smart telephone, a wearable device, or the like. As illustrated in FIG. 2, the user device 18 includes an electronic processor 38, a computer-readable memory 42, and a human-machine interface (HMI) 46. The electronic processor 38, the memory 42, and the HMI 46 communicate over one or more communication lines or buses, wirelessly, or a combination thereof. In some embodiments, the user device 18 includes additional components than those illustrated in FIG. 2 and the components included in the user device 18 may be arranged in various configurations. For example, in some embodiments, the user device 18 also includes a communication interface 44, for example a transceiver, that allows the user device 18 to communicate with external devices, for example one or more servers over a communication network as noted above or directly with a fixture 14 and its associated end point 72. The user device 18 may also perform additional functionality than the functionality described in the present application.

The electronic processor 38 may include a microprocessor, application-specific integrated circuit (ASIC), or another suitable electronic device. The electronic processor 38 is configured to retrieve data from the memory 42 and execute, among other things, software related to the processes and methods described herein. The memory 42 includes a non-transitory, computer-readable storage medium. The memory 42 can include a client application 50, executed by the electronic processor 38, to access various services and data provided by the server 22. The client application 50 includes a web browser 54 (e.g., Internet Explorer®, Google Chrome®, or the like) that allows the user device 18 to access the services provided by the server 22.

The HMI 46 includes an input device, an output device, or a combination thereof. For example, the HMI 46 may include a display device, a touchscreen, a keyboard, a keypad, a button, a cursor-control device, a printer, a speaker, a virtual reality headset, a microphone, and the like. In some embodiments, the user device 18 includes multiple HMIs. For example, the user device 18 may include a touchscreen and a keypad. In some embodiments, an HMI 46 is included in the same housing as the user device 18. However, in other embodiments, an HMI 46 may be external to the user device 18 but may communicate with the user device 18 over a wired or wireless connection. For example, in some embodiments, the user device 18 includes a display device connected to the user device 18 via a cable. As described below in more detail, one or more HMIs 46 included in the user device 18 receive input (selections) from a user, to manipulate a program to obtain data related to any one or more of the fixtures 14 or to control one or more of the fixtures 14.

Figure 3:
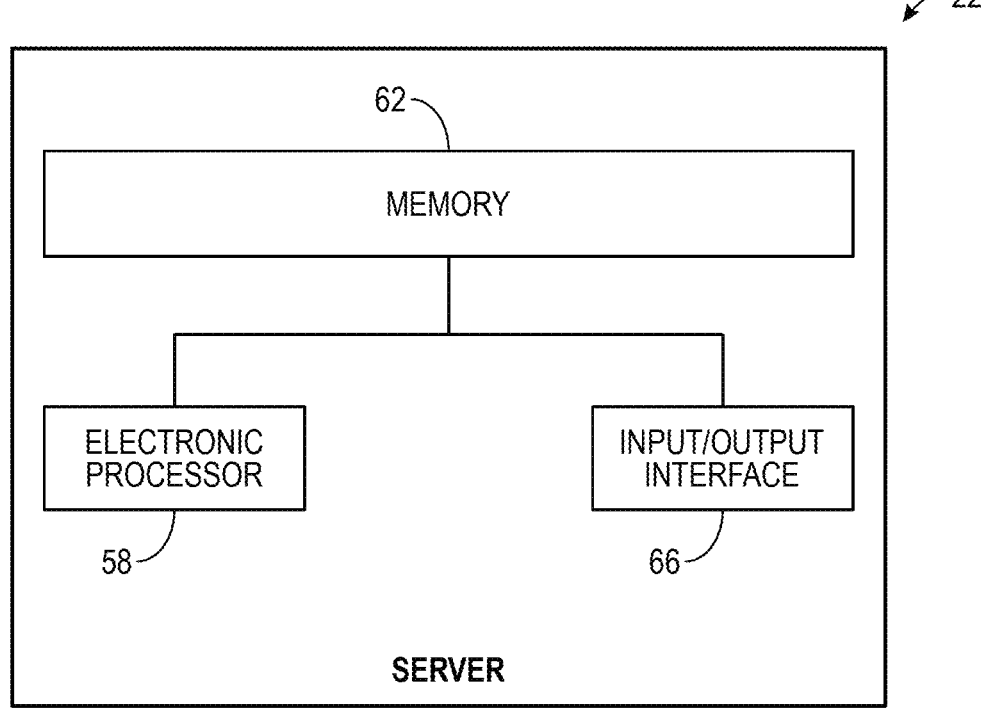
FIG. 3 is a schematic view of a server for use with the system illustrated in FIG. 1.

With reference to FIG. 3, the server 22 may be a web server where web pages can be accessed over the communication network 30 through a client like a web browser on a user device 18. The server 22 includes a server electronic processor 58 and a server memory 62. The server 22 also includes an input/output interface 66 that allows the server 22 to communicate with external devices, for example the user device 18. It is to be understood that the server 22 may include more than one processor or may be implemented as one of multiple servers configured to perform the methods described herein in a cloud computing environment, a data center, or the like.

Figure 4:
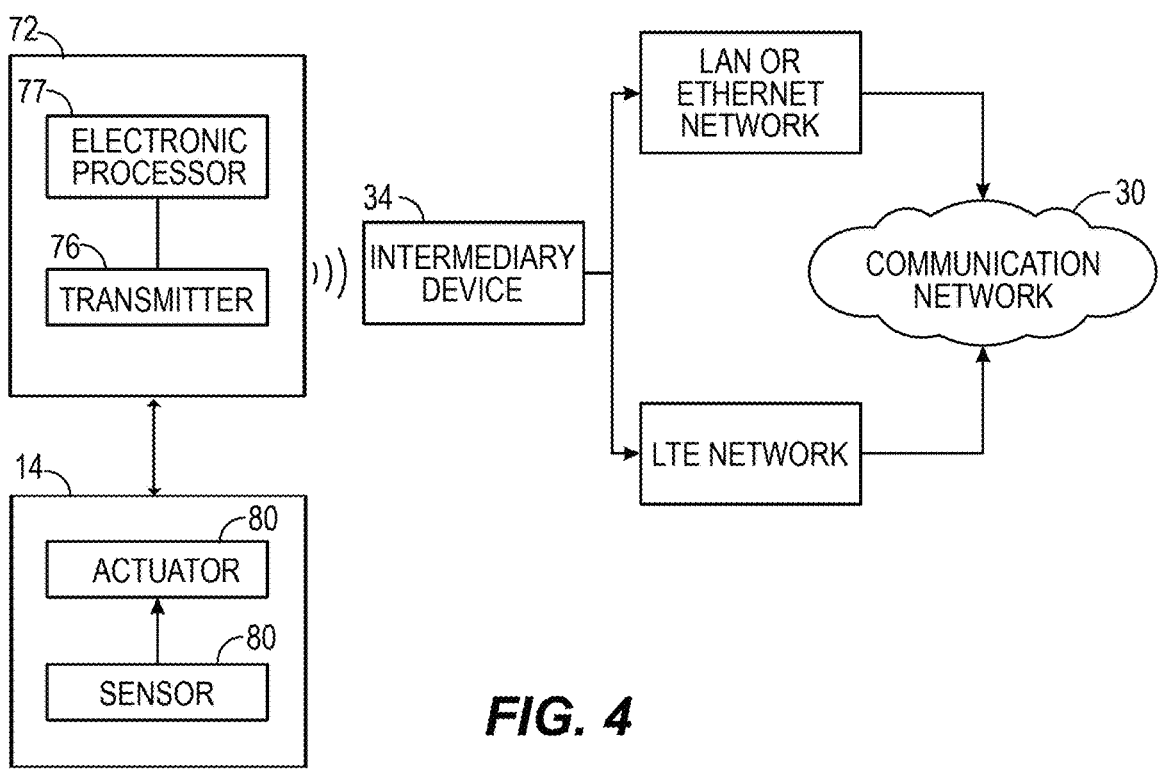
FIG. 4 is a schematic view of an fixture and associated end point device in wireless communication with a communication network.

As illustrated in FIG. 4, the water management fixtures of the system 10 generally include some form of water management solution such as, but not limited to, faucets, flush valves, soap dispensers, water service line monitors, backflow preventers, grease interceptors, roof drains, floor drains, acid neutralization systems, fire distribution systems, irrigation systems, thermostatic mixing valves, hand dryers, pressure sensors, flow sensors, leak detectors, occupancy light sensors, air quality sensors, door latches, valve sensors, and the like. For a particular system 10, the fixtures 14 may include all fixtures 14 that are registered and entered therein for a particular account (described below) and may span multiple facilities, locations, rooms, and the like. In some embodiments, each fixture 14 may include a unique fixture identifier associated therewith to allow the system 10 to identify and distinguish each fixture within the enterprise.

As shown in FIG. 4, each fixture 14 of the system is in communication with an end point device 72 and includes one or more electro-mechanical (EM) elements 80. The end point device 72, in turn, includes a processor 77, memory, and is configured to generally manage and/or monitor the operation of the corresponding fixture 14 either directly or indirectly (e.g., via the EM element(s) 80). The end point 72 is also configured to transmit and receive data (e.g., wirelessly) from the system 10 via a transmitter 76 (i.e., a LoRa radio system, see FIG. 4). Although not shown, a single end point 72 may be associated with and monitor and/or control multiple fixtures 14 simultaneously. While the illustrated end point 72 communicates with the system 10 using a LoRa radio system, in alternative embodiments Bluetooth or other wired and wireless communication systems could be used.

As shown in FIG. 4, the fixtures 14 generally include one or more EM elements 80 to monitor and/or influence the operation thereof. The EM elements 80 may include but are not limited to, actuators, valves, flow sensors, position sensors, proximity sensors, thermocouples, and the like. In such embodiments, the end point 72 is typically configured to interact with and collect data regarding the operation of the fixture 14 via the EM elements 80 either directly or indirectly. For example, the end point 72 may be configured to monitor changes in current to an EM element 80, monitor changes in voltage to an EM element 80, monitor the physical movement of an EM element 80, and/or independently monitor the flow of water through the fixture 14. In other embodiments, the end point 72, transmitter 76, and one or more EM elements 80 may be integrated together within the fixture 14.

In some embodiments, a series of EM elements 80 are already present in a completed fixture 14 (e.g., a proximity sensor, actuator, and valve in an automated faucet). In such embodiments, the end point 72, associated transmitter 76, and any applicable connection points or sensors may be retro-fit onto the existing fixture 14 to collect and transmit data necessary for the system 10. For example, end point 72, associated transmitter 76, and flow sensor may be mounted in the plumbing immediately upstream of a particular fixture 14. In other examples, the retro-fit may include updating firmware in the already existing fixture. In still other examples, the retro-fit may include integrating elements into a previously existing EM element 80.

In some embodiments, the end point 72 wirelessly transmits data via the transmitter 76 to a local gateway or intermediary device 34 positioned near the fixture(s) 14. The intermediary device 34 can collect data from the end points 72 of one or more of the fixtures 14. The intermediary device 34 then transmits the data on to the communication network 30 via Ethernet connection to the local area network (LAN) or via LTE cellular for storage and access by a user device 18.

In one embodiment, the fixture 14 may include a faucet having a sensor configured to detect the presence of a person. When the sensor is triggered (e.g., by detecting the presence of a person), the sensor sends an "ON" signal to an actuator (e.g., a valve actuating solenoid) thereby allowing water to selectively flow through the faucet. When the sensor is no longer triggered (e.g., by detecting the absence of a person), the sensor sends an "OFF" signal to the actuator to stop water flow through the faucet. The end point 72 monitors the communications between the sensor and the actuator to track, among other things, the number of "ON" and "OFF" signals or activations. In some embodiments, the actuator is configured to maintain the faucet in an open position for a predetermined period of time in response to the sensor sending an "ON" signal. In such embodiments, the length of the period of time is set by the user via the interface 84 (discussed below).

In some embodiments, the end point 72 associated with a particular faucet may monitor the electromechanical valve elements 80 either directly (e.g., via a sensor monitoring the movement of the physical valve itself) or indirectly (e.g., via monitoring the voltage or current being sent to the actuator). In still other embodiments, the end point 72 may be configured to detect the flow of water through the faucet using a temperature sensor either positioned within the drain or the faucet itself. Furthermore, the end point 72 may be configured to output signals indicating that a run-on condition has occurred if a pre-determined period of time set by the user is exceeded and the faucet does not return to an "OFF" condition or water flow is still detected. The end point 72 may also be configured to calculate water usage indirectly based at least in part on the duration of time that the valve of the faucet remains open and an estimated water flow rate.

In another embodiment, the fixture 14 may include a flush valve having a sensor configured to detect the presence of a person. When the sensor is triggered (e.g., by detecting the presence of a person), the sensor sends an "ON" signal to an actuator (e.g., a valve actuating solenoid) to actuate a valve and initiate a flow of water for a flushing event. The flush valve will then remain open for a predetermined period of time (e.g., 5 seconds, 10 seconds, etc.) at least partially dependent upon the operating parameters set by the user in the interface 84 (discussed below).

In some embodiments, the end point 72 associated with the flush valve monitors the magnitude of the voltage and/or current supplied to the actuator to track when a flushing event has been initiated. In other embodiments, the end point 72 may monitor the movement of the valve itself either directly or indirectly using a sensor (e.g., an optical sensor, hall effect sensor, and the like). Furthermore, the end point 72 may be configured to determine when the ON signal is provided (e.g., a person is detected) but no corresponding movement of the valve occurs. In such instances, the end point 72 may then send an error signal to the system 10 such that an alert (discussed below) may be generated by the interface 84. Such faults may be detected by the end point 72 detecting an elevated voltage or current rate (e.g., motor is bound). The end point 72 may also output data to the system regarding the length of time a person is detected using the fixture 14 on any given instance.

In another embodiment, the fixture 14 may include a soap dispenser having a sensor configured to detect the presence of a person. When the sensor is triggered (e.g., by the hands of a person), the sensor sends an "ON" signal to an actuator to actuate a valve and initiate a flow of soap from a nozzle. The end point 72 associated with the soap dispenser monitors the magnitude of the voltage and/or current supplied to the actuator to track when a soap dispensing event has occurred. The soap dispenser is configured to allow a pre-determined volume of soap to be dispensed for each activation. In the present embodiment, the volume of soap to be dispensed may be set and adjusted by the user via the interface 84.

The soap dispenser may also include a second sensor to monitor the level of soap remaining in the reservoir. In some embodiments, the second sensor may provide a series of signals to the end point 72 to indicate the current level of soap in the reservoir at a given moment in time. In other embodiments, the second sensor may send a signal to the end point 72 when the soap falls below a pre-determined amount. In still other embodiments, the end point 72 may calculate the amount of soap remaining in the reservoir by subtracting the pre-determined volume of soap discharged during a soap dispensing event for each detected activation.

In another embodiment, the fixture 14 may include a water service line monitor. The monitor includes a sensor configured to be retrofit onto an existing water service line and is configured to monitor the flow-rate of water therethrough and/or the presence of a backflow event. More specifically, the end point 72 associated with the water service line monitor receives signals from the sensor and outputs data to the system 10 indicative of the flow rate and/or the presence of a backflow event.

In another embodiment, the fixture 14 may include a grease interceptor having sensors configured to detect, among other things, the volume of grease contained within the interceptor and/or the rate of fluid flow through the interceptor. During use, the end point 72 associated with the grease interceptor collects the data received by the sensors and outputs one or more signals to the system 10 indicating the level of grease and/or flow rate detected.

In another embodiment, the fixture 14 may include a roof or floor drain having sensors configured to detect, among other things, the presence of fluid within the drain and/or the flow rate of the fluid within the drain. During use, the end point 72 associated with the drain collects data from the sensors and outputs one or more signals to the system 10 indicating the presence and/or flow rate of fluid within the drain.

In another embodiment, the fixture 14 may include a smart valve positioned within the plumbing system of a particular building, campus, floor, room, and the like. The end point 72 associated with the smart valve may be configured to both output signals to the system 10 indicating the position of the valve (e.g., open or closed) in addition to allowing the user to remotely control the position of the valve (e.g., open, closed, or a designated open position). Together, a collection of smart valves may be used by the system 10 to selectively control the supply of water to different areas of a user's plumbing ecosystem. For example, the user may select a floor, room, or building that they wish to have isolated or supplied with water, whereby the system 10 will automatically open or close the necessary smart valves to make the command occur. In other embodiments, the smart valve may be configured so that the system 10 transmit a target flow rate to the end point 72 and the end point 72 may be configured to communicate with the fixture 14 to produce the target flow rate.

In another embodiment, the fixture 14 may include a backflow preventer. The backflow preventer generally includes one or more sensors configured to detect, among other things, the rate and direction at which water is flowing therethrough. For example, the backflow preventer may include a first pressure sensor positioned upstream of both check valves, a second pressure sensor positioned between the two check valves, and a third pressure sensor positioned downstream of both check valves. In other embodiments, the backflow preventer may include a water meter incorporated therein to measure, among other things, the direction and rate of flow through the backflow preventer. In still other embodiments, the backflow preventer may include temperature sensors to detect the temperature of the water flowing therethrough. In still other embodiments, the system 10 may include sensors (e.g., flow, pressure, temperature and the like) positioned in the water system adjacent the backflow preventer (e.g., immediately upstream or downstream thereof) to determine the flow characteristics therethrough. The backflow preventer may also include sensors capable of monitoring the positions of the two check valves. In some embodiments, the sensors may be mechanically based or electrically based. An end point 72 associated with the backflow preventer may be configured to convey the outputs of the above described sensors to the system 10 in addition to conveying testing or other operational instructions to the backflow preventer from the system 10.

In still other embodiments, the fixture 14 may include a point pressure sensor. The point pressure sensor includes a sensor attachable to a pipe, fitting, valve, and the like. The end point 72 associated with the point pressure sensor may be configured to output signals representative of the water pressure at that particular location.

In still other embodiments, the fixture 14 may include a leak detector configured to output signals (via and end point 72) representative of the presence of a leak. In still other embodiments, the fixture 14 may include an occupancy light sensor configured to output signals (via and end point 72) representative of the presence of one or more persons in a particular area (e.g., in a room, stall, and the like). In still other embodiments, the fixture 14 may include an air quality sensor configured to output signals (via and end point 72) representative of the quality of air in a particular area or room (e.g., smell, particulates, pollen, etc.). In still other embodiments, the end point device 14 may include a door latch or handle configured to output signals (via and end point 72) representative of whether the door latch has been used. Still further, the door latch may output signals representative when a user enters or exits a room.

Figure 4A:
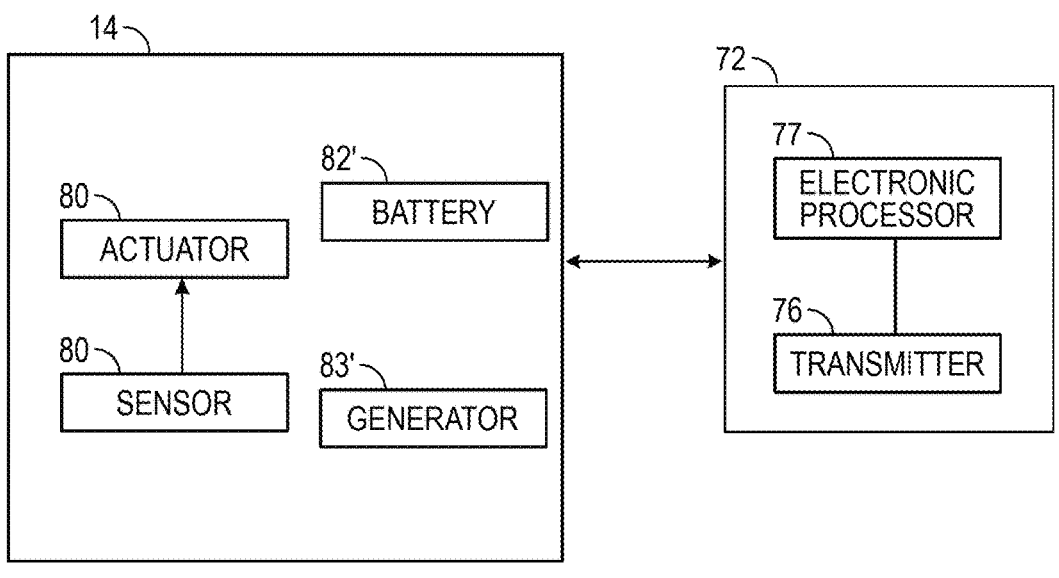
FIG. 4A illustrates an embodiment of a water management fixture.

As shown in FIG. 4A, in still other embodiments the fixture 14' may be battery powered, such that the EM elements 80 may be powered by an internally positioned battery 82'. In such embodiments, the end point 72 associated with the fixture 14' may output additional signals to the system 10 including, but not limited to, the battery charge level, battery condition, whether or not the fixture 14' is in a sleep mode or deep sleep mode, the rate of re-charge, and the like.

The end fixtures 14' may include a generator 83' configured to power the EM elements 80 independent of the local power grid. Such generators are generally combined with the battery 82' to allow the fixture 14' to maintain a charge of electricity when the generator 83' is not in use. The generator 83' (e.g., a turbine) may be electrically coupled to the battery 82' to deliver energy to the battery for storage therein when the generator is activated. In such embodiments, the fixture 14' may output signals to the system 10 via the end point 72 including the rate at which electricity is being or has been generated, how much electricity has been generated over a predetermined period of time, the current status of the generator 83', and the like. Still further, the generator may be operated by the flow of water through the fixture 14'. As such, allowing the flow of water through a fixture 14' (e.g., actuating a valve) may be used to drive the generator 83' and charge the battery 82'.

While the illustrated battery 82' and generator 83' are located in the fixture 14', it is understood that in alternative embodiments a separate battery and generator may also be present in the end point 72. In still other embodiments, the end point 72 and fixture 14 may share a battery and/or generator.

During use, the end point 72 may be configured to collect the data output by each of the above described sensors and output the data to the system 10 for additional analysis and interpretation. In some embodiments, the end point 72 and/or system 10 may compare the relative pressure outputs to determine when and where a leak may exist within the fixture or the plumbing ecosystem as a whole. Furthermore, in some embodiments the backflow preventer may be configured so that the user can run a test remotely on the fixture. To do so, the end point 72 is configured to actively control the operating conditions of the backflow preventer. In other embodiments, the backflow preventer may be paired with an external camera also in communication with the end point 72. In such embodiments, the camera may be used to detect if the room in which the backflow preventer is located is flooding.

In some embodiments, the backflow preventer or its associated end point 72 may include data storage capabilities so that certain datapoints (e.g., flow, pressure, temperature, and the like) can be stored in place if an electrical or network malfunction occurs. In such instances, the backflow preventer and/or the end point 72 will store the data while continuing to monitor the operations of the fixture, such that the backlogged data can be uploaded to the system 10 once the connection or electricity is restored.

When a fixture 14 is registered with the system 10 (described below), each fixture 14 of the system 10 is assigned a fixture identifier and automatically and/or manually placed into multiple classifications (e.g., the fixture identifier is associated with one or more classification). The fixture identifier includes a unique title or alpha-numeric tag allowing the system 10 to identify the associated fixture 14 within the system. Each classification is generally configured to represent one or more attributes of the fixture 14. For example, each fixture 14 may be classified as a specific "fixture or device type" (e.g., a faucet, a flush valve, a soap dispenser, a backflow preventer, a grease interceptor, a drain, an acid neutralization device, a fire system, an irrigation system, a thermostatic mixing valve, a leak detector, an occupancy light sensor, an air quality sensor, a door latch, and the like). Furthermore, each fixture 14 may be classified based on its "fixture or device location" (e.g., a building classification, floor classification, room classification, regional classification, water type classification, age classification, and the like). These classifications are utilized and processed by the system 10 to help the system 10 and interface 84 (described below) analyze, organize, and display the data being provided by each fixture 14. Additional classifications, not shown, may be utilized to characterize the fixture 14 or one or more of its components.

The system 10 may also incorporate some form of encryption to assure the individual fixtures 14 are secure. In some systems, the encryption may occur at multiple levels, such as within the fixtures 14 and within the system. Such encryption may include access keys and the like. Still further, in some embodiments, the encryption processes may be automatically verified when a QR code, bar code, RFID tag and the like is scanned by the system 10.

The system 10 also includes an interface 84 (see FIGS. 5A-14E) for use with the user devices 18 to allow a user to access, analyze, and react to data collected by the system 10. In the interface 84, the data is presented in many different ways and can be customized according to user-defined preferences. The data is also analyzed by various algorithms to provide meaning behind the numbers, generally in the form of alerts and maintenance schedules (described below). In other words, in some embodiments the interface 84 is a single source for managing, monitoring, and reacting to all of the fixture 14 that are installed across an enterprise's plumbing ecosystem. The interface 84 provides an instant snapshot of each fixture's 14 health and allows the user to drill deeper to analyze and download reports for individual fixtures, based on fixture type, and/or based on other classifications. The interface 84 also provides customization opportunities for system alerts, displays, and charts to align with each user's unique operational parameters and communication preferences. The interface 84 additionally allows each user to stay connected no matter where they are, what they are doing, or the time of day. The interface 84 is also sharable to third parties, allowing the user to invite staff and external service contracting partners to the portal and authorize them to manage the fixtures 14 applicable to their role. When doing so, the user is able to dictate different security levels to each individual depending on the level of access needed (discussed below).

As shown in FIGS. 5A-14E, the illustrated interface 84 includes a series of primary screens 88a, 88b, 88c, 88d each of which is generally configured to organize and present the data collected from the fixtures 14 and to allow the user to review and manage different aspects of the data being collected. For example, the illustrated interface 84 includes a dashboard 88a generally configured to provide a real-time overview of the current condition of the fixtures 14, a building display 88b generally configured to organize the fixtures 14 according to their physical location within the client's facilities, a maintenance display 88c generally configured to organize and display scheduled maintenance tasks according to their scheduled completion date, and an insight display 88d generally configured to allow the user to organize and display historical data based on date. The interface 84 also permits the user to organize and display fixture 14 information based on the type classification.

The interface 84 also permits the system 10 to generate and display metrics or other information generated from the compilation of data received from two or more fixtures 14 and organize the generated metrics by one or more classifications and/or other attributes. In some embodiments, the metrics are based at least in part on the classification of the fixtures 14 included in the analysis.

As shown in FIGS. 5A-14E, each of the primary screens 88a, 88b, 88c, 88d can be selected and entered into via a header 90 located along the top of the interface 84. In some embodiments, the header 90 is always visible while the user is signed into the interface 84 to allow for easier and more rapid navigation between the primary screens 88a, 88b, 88c, 88d.

Figure 5A:
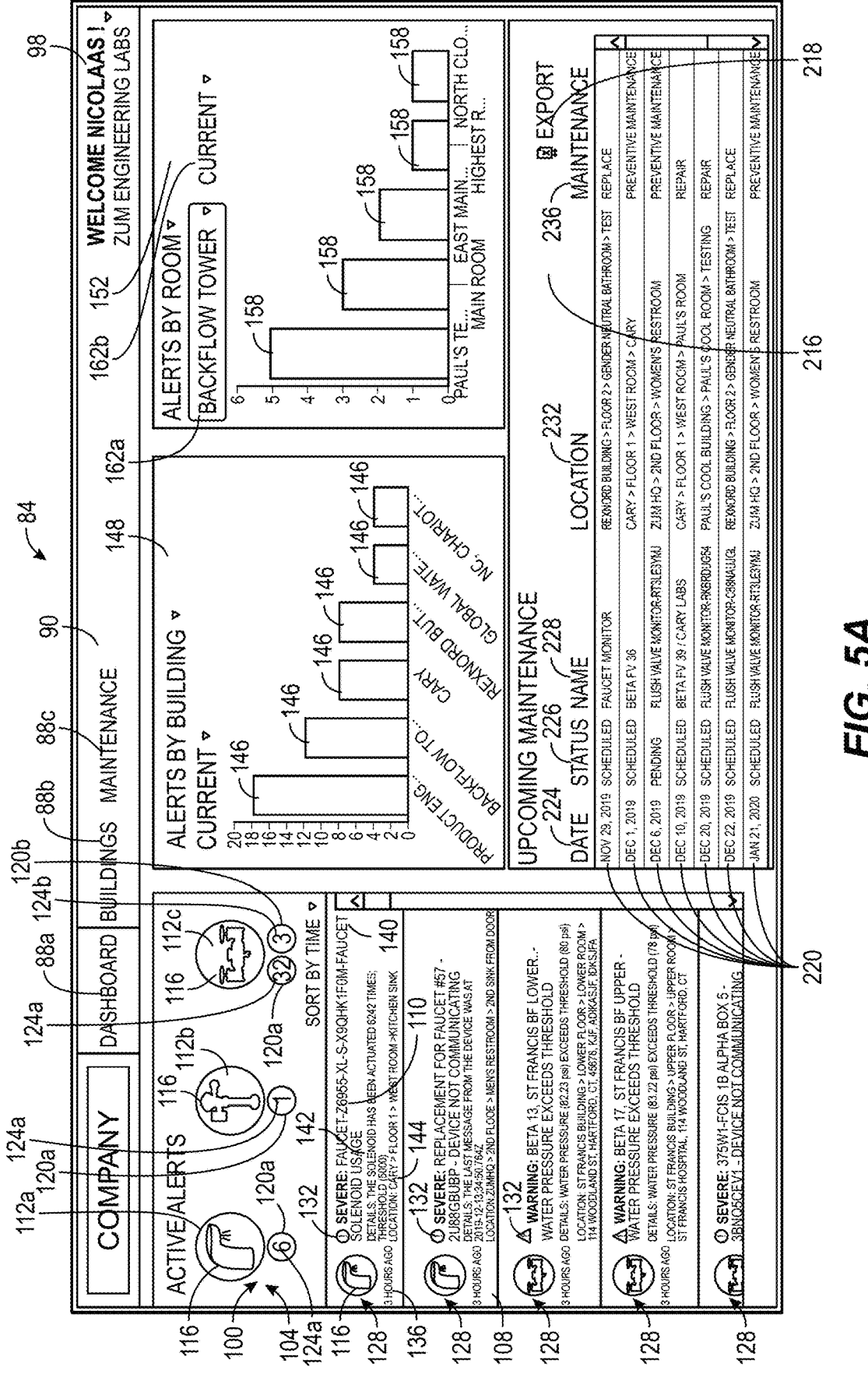
FIGS. 5A-5G illustrate a dashboard display page of an interface for use with the system of FIG. 1.
Figure 5B:
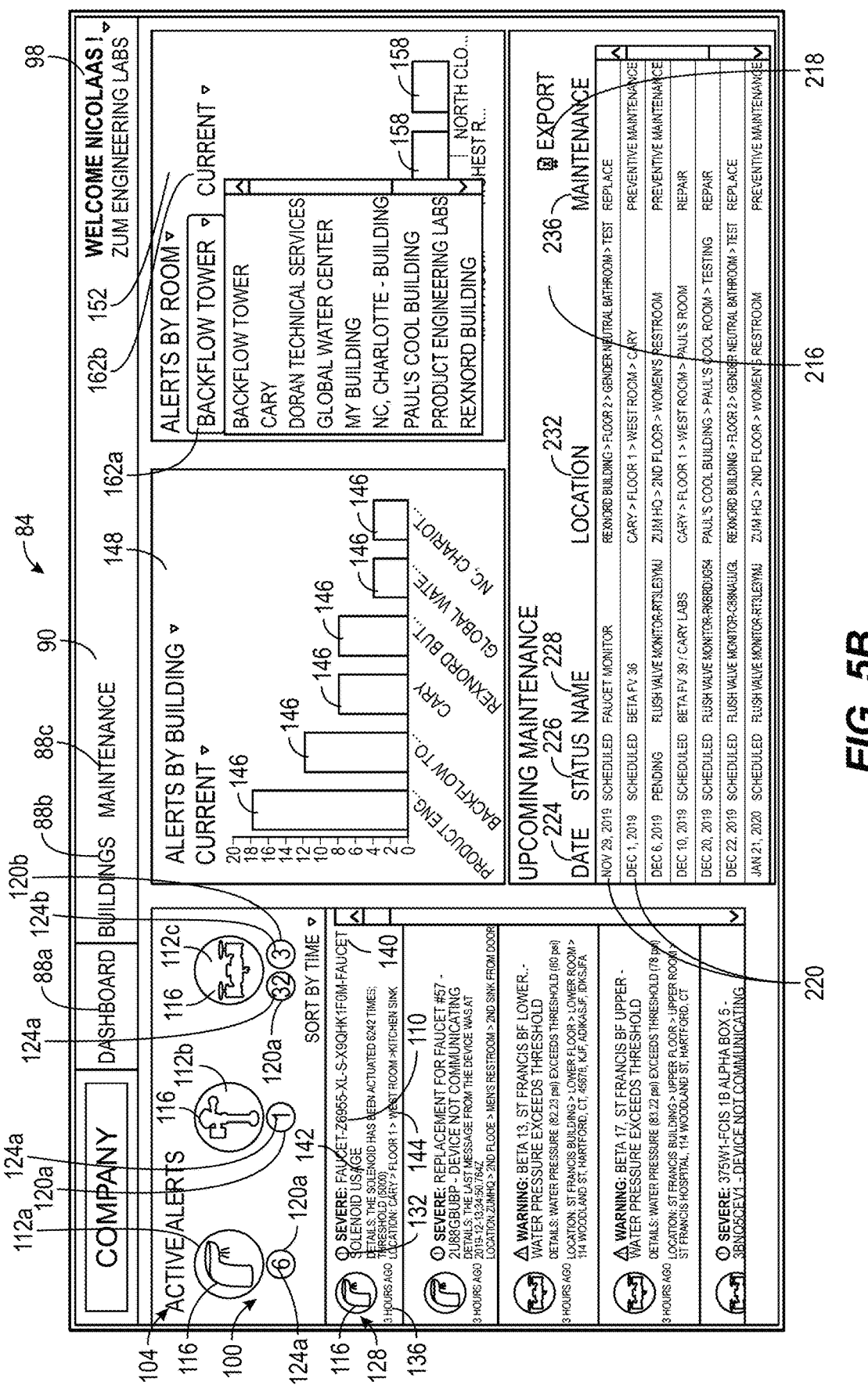
Figure 5C:
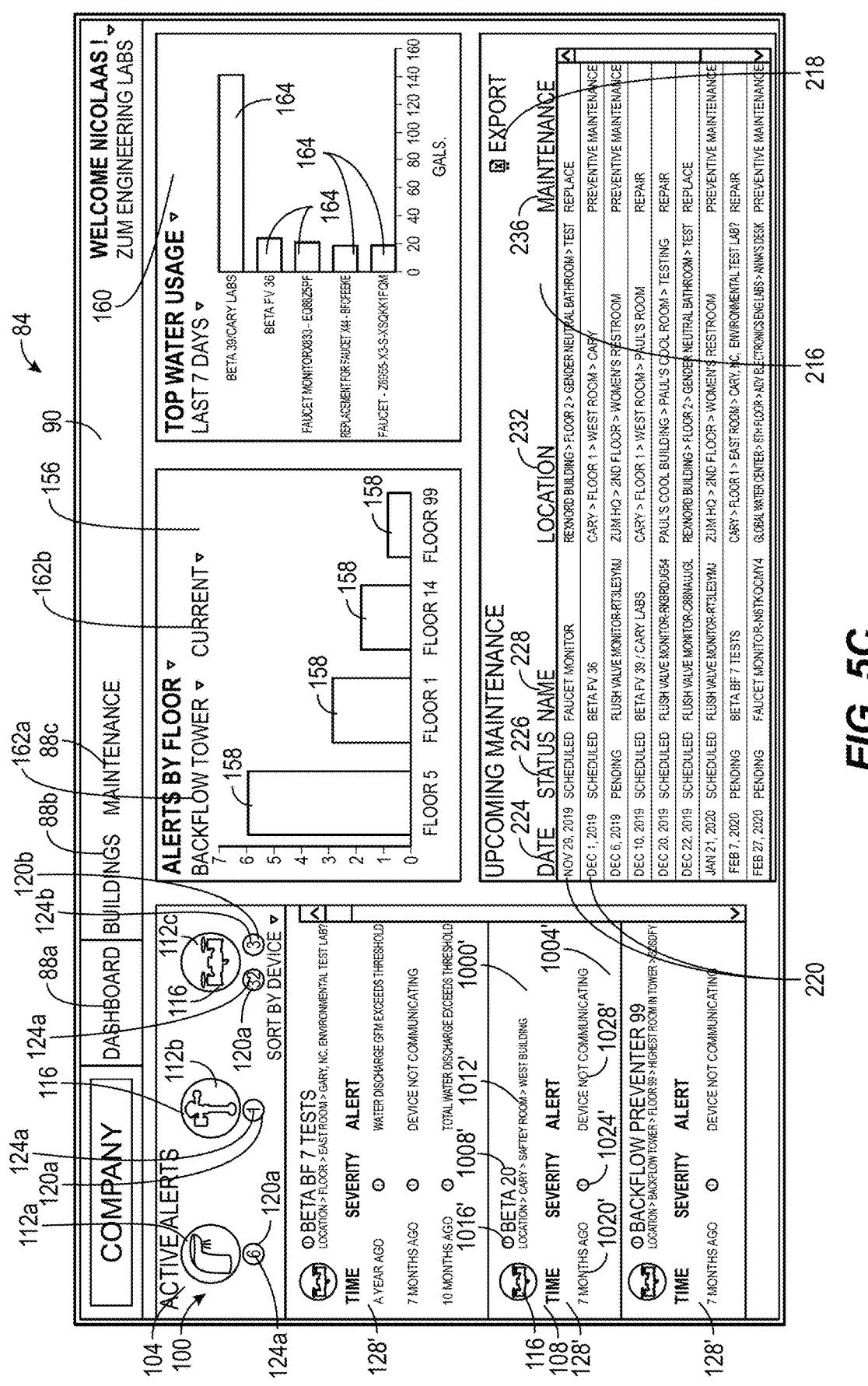
Figure 5D:
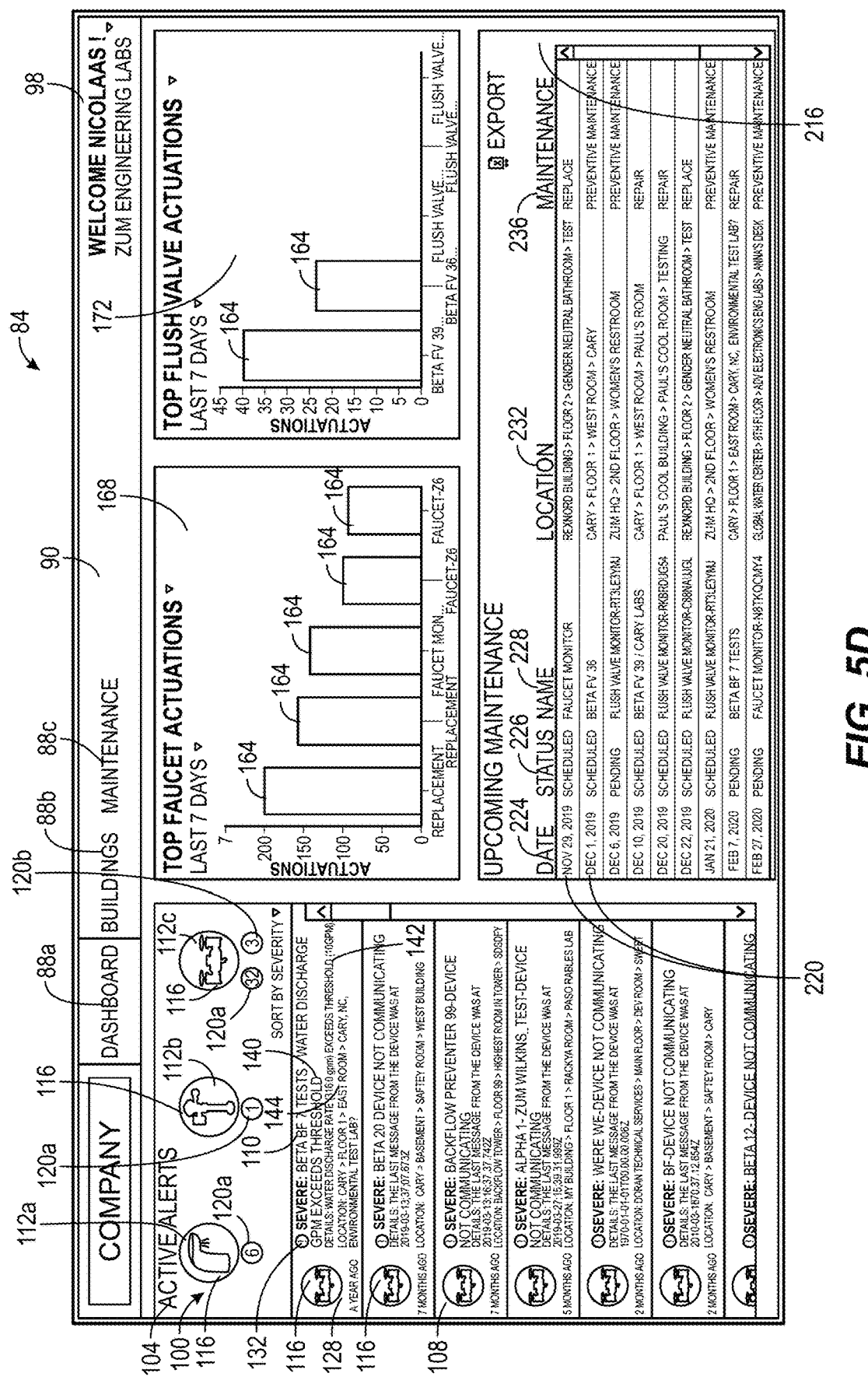
Figure 5E:
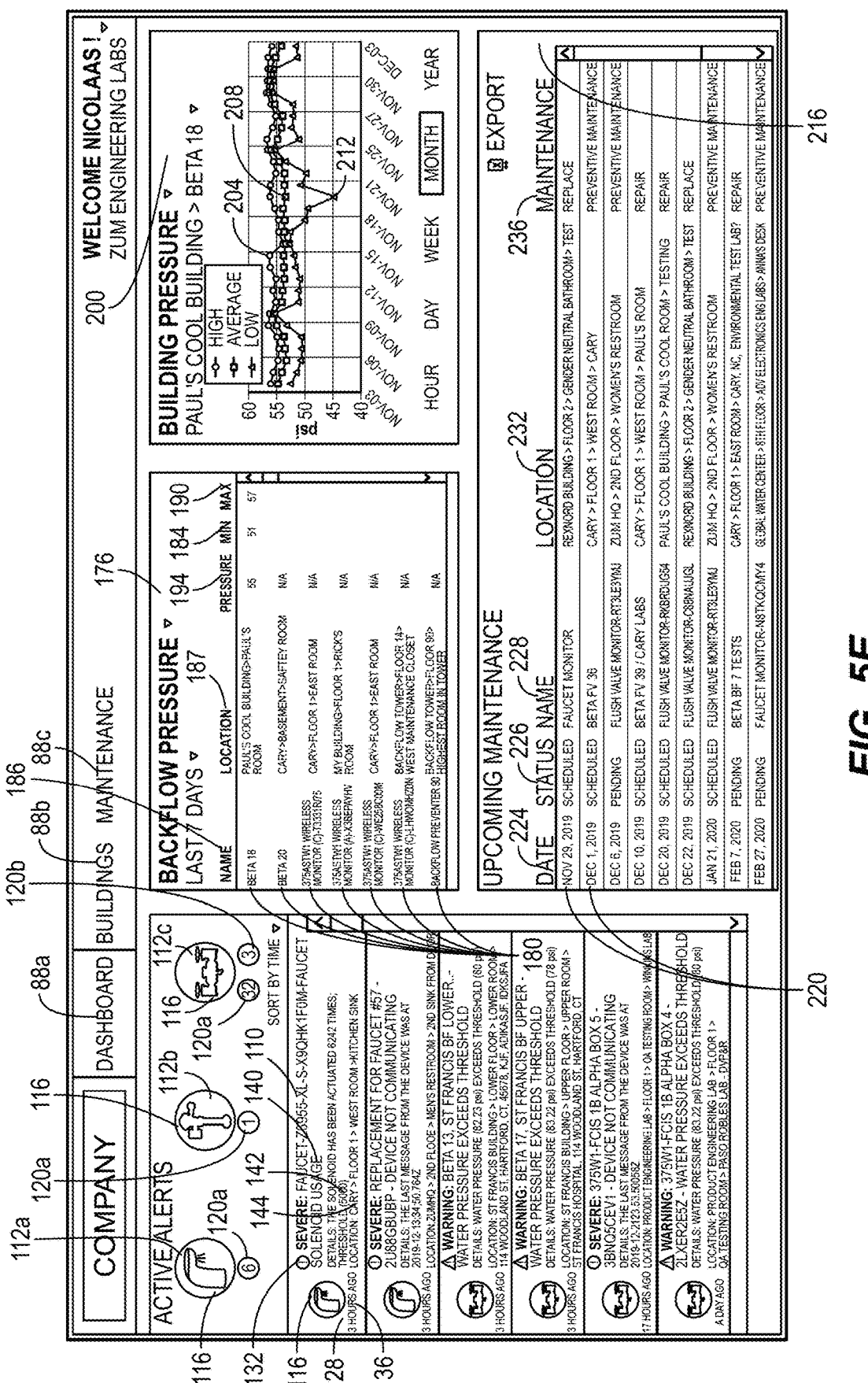
Figure 5F:
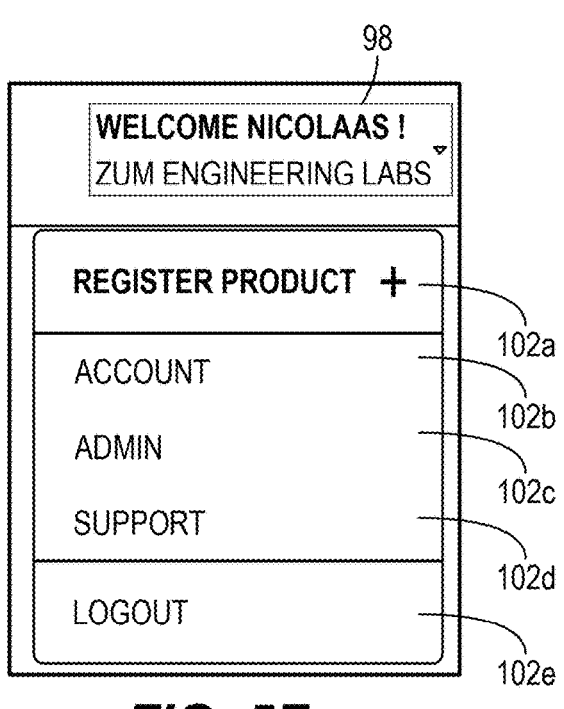

In the illustrated embodiment, the header 90 also includes a secondary menu 98 (see FIG. 5F). During use, selecting the secondary menu 98 will reveal a series of menu items 102a, 102b, 102c, 102d, 102e that may include, but are not limited to, product registration 102a, account setup 102b, administrative settings 102c, product support 102d, and logout 102e.

With respect to the administrative settings 102c, selecting this option from the secondary menu 98 allows the user to establish and modify the security and access available to individual users. For example, each individual user can be assigned a combination of access and security clearances. Such clearances would then determine what aspects and features of the interface 84 are available to that particular user. For example, user profiles having high access and security clearances may have total access to all aspects of the system 10 including the ability to modify data and settings contained therein. In contrast, a user having relatively low access and security clearances may only be allowed to view select data sets and be unable to alter the information in the system 10. In the illustrated embodiment, alteration, security, and access clearances may be adjusted for each user independently.

Figure 15A:
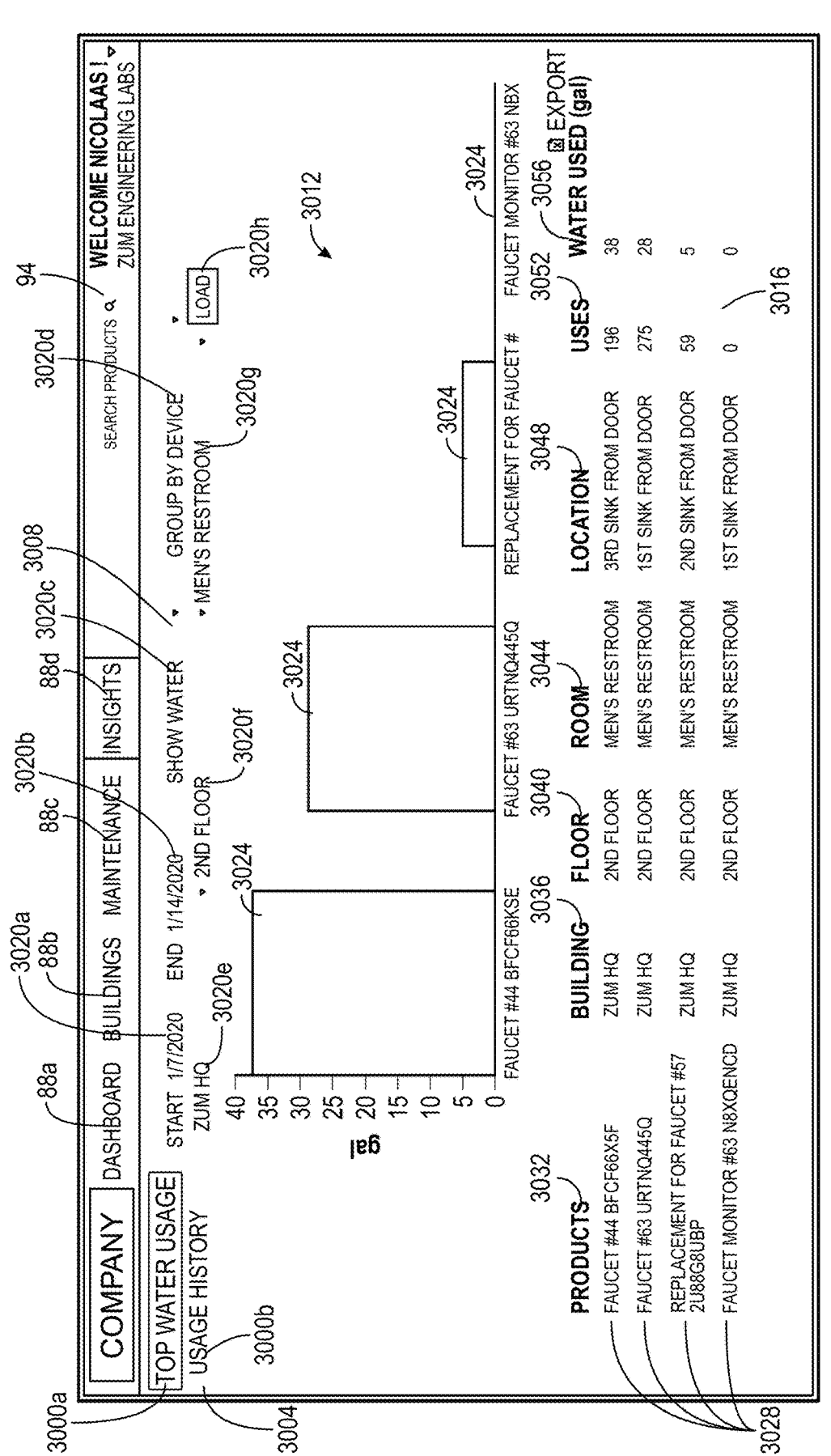
FIGS. 15A-15B illustrate an insight display of an interface for use with the system of FIG. 1.
Figure 15B:
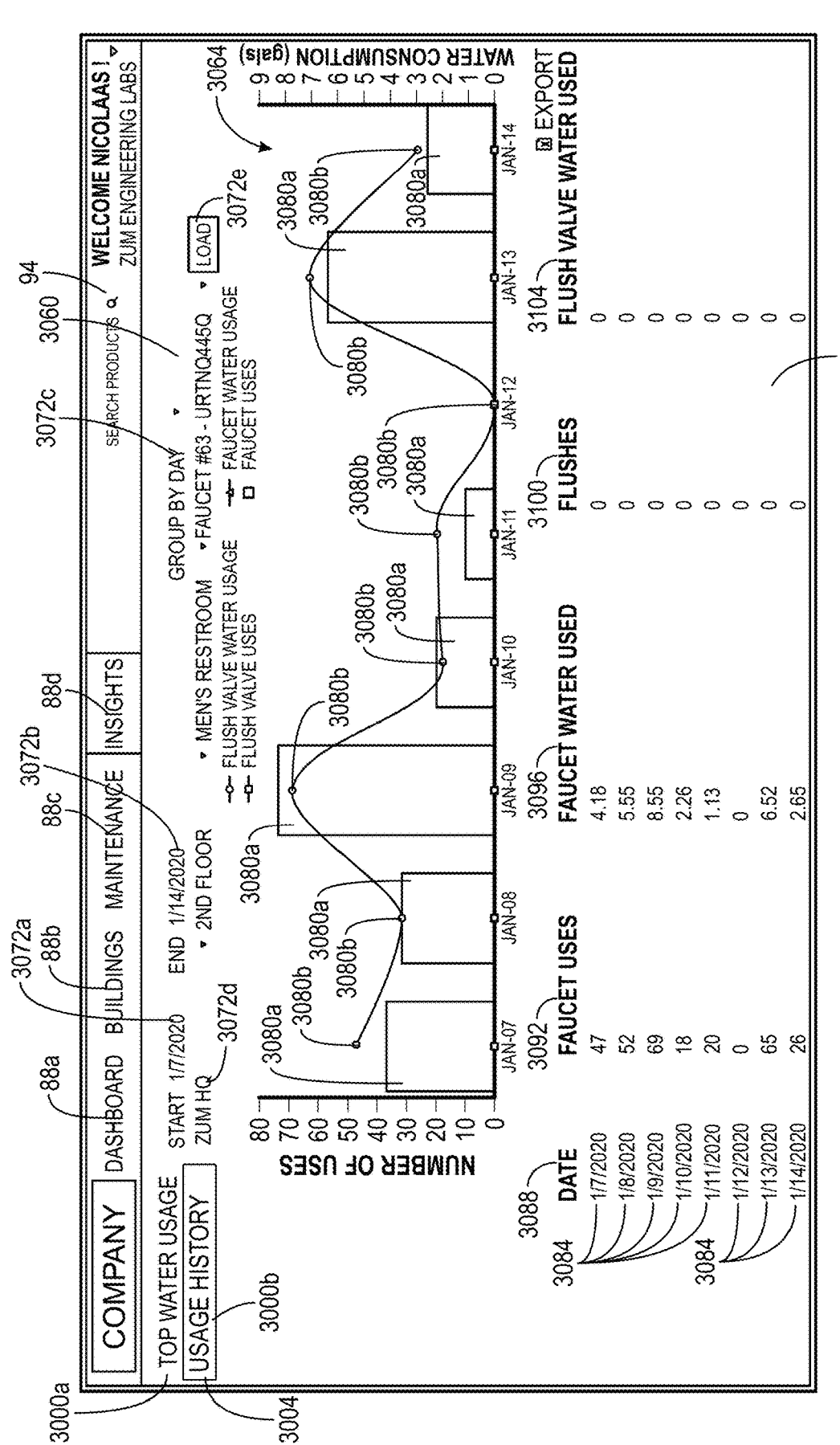

The header 90 may also include a search box 94 contained therein (see FIGS. 15A-15B). The search box 94 is configured to allow the user to quickly and easily locate individual fixtures 14 by entering in identifying information. For example, the illustrated search box 94 is able to locate a fixture 14 using any one of: the fixture name, the fixture serial number, the fixture ID, and the like.

With reference again to FIGS. 5A-5E, the dashboard 88a of the interface 84 is configured to provide a broad, real-time overview of the user's specific plumbing ecosystem. The dashboard 88a provides this overview via a series of alerts, real-time graphical data, and scheduled maintenance information. To do so, the dashboard 88a includes one or more widgets or sub-displays 100, 148, 152, 156, 160, 176, 200, 216, each of which is individually customizable and selectively visible on the dashboard 88a simultaneously.

As shown in FIGS. 5A-5E, the illustrated dashboard 88a includes an active alerts widget 100 configured to provide the user with quick and easily identifiable real-time information regarding the importance, type, and number of alerts that currently exist in the user's plumbing ecosystem. The dashboard 88a can be updated in real-time from information provided by the various fixtures 14 and processed by the system 10. In alternative embodiments, the user may be able to set specific times during the day (e.g., during business hours, on off-times, over the weekend, etc.) when alerts can be generated.

Generally speaking, an "alert" is an operating condition detected by the system 10 and displayed by the interface 84 to indicate to the user that an action has occurred, needs to occur, is at risk of occurring, or is scheduled to occur. For example, an alert may signal, among other things, that a part or fixture needs to be replaced, that a part or fixture is broken, that a part or fixture is due for maintenance, that a part or device is scheduled for a test, that a part or fixture has or is operating outside one or more design parameters, that something in the system 10 is not working as intended or has stopped working, that the system 10 has lost communication with one or more fixtures 14, that the software or firmware of a fixture 14 needs to be updated, that a specific fixture 14 has been actuated, and the like.

In some embodiments, the system 10 may also be configured to generate an alert when activation or sensor detections are generated but no corresponding actuation of the fixture is detected. For example, for flush valves or faucets, the system 10 may generate an alert when the presence of a user is detected but no corresponding actuation of the valve is detected.

In still other embodiments, the system 10 may be configured to generate an alert if normally acceptable activity is occurring at unusual times or locations. For example, a high number of faucet actuations over the weekend or at night when no weekend or night shifts exist or the facility is closed. In such embodiments, the corresponding alert may not only be sent to the interface 84 but also to a third-party security team or company.

In still other embodiments, the system 10 may generate an alert based on a "virtual room inspection" (VRI) program whereby the VRI program monitors the activity of one or more fixtures 14 within a particular space (e.g., a room, a floor, and the like) and predicts or detects when failures or problems associated with the fixture or space have occurred based on comparisons with historical data models. When such a failure or problem is predicted or detected, the VRI program causes the system 10 to generate an appropriate alert.

In some embodiments, the VRI program is configured such that it can be turned on and off for sub-divisions of the system 10 itself. For example the user may turn on the VRI program for particular rooms, encompassing any fixtures 14 positioned therein. Furthermore, the user may select that one or more fixtures 14 within a particular room not be monitored. Such decisions can also be made for entire buildings or other subdivisions within the system 10. In still other embodiments, the system 10 may be configured such that the VRI program continues to monitor the fixtures 14 even when disabled such that while no alerts will be sent (discussed below) the VRI program continues to update and improve the predictive model in the background.

More specifically, the VRI program is able to detect both "room failures" (e.g., instances where something is causing guests to avoid a particular room, floor, or area or where something causes guests to be unable to use a particular room, floor, or area), and "fixture failures" (e.g., instances where something is causing guests to avoid a particular fixture or where something is causing guests to be unable to use a particular fixture). These determinations are generally calculated by comparing a baseline set of usage data (e.g., a predictive data set based on historical data and modeling) to a current data set based on real-time usage data. More specifically, the VRI program is configured to generate an alert whenever the real-time data set varies from the predicted data set beyond a predetermined amount. In the instance of room failures, when the VRI program concludes that a room-wide failure is present, the VRI program is configured to send alerts to each individual fixture 14 located in the relevant room.

The VRI program establishes a predictive set of baseline usage data for both individual fixtures 14 and entire rooms/areas by compiling historical data related to each. Such data includes, but is not limited to, the volume of water used, the time distribution of when that water usage is occurring, the number of actuations of a fixture, the time distribution of when those actuations occur, and the like. In still other embodiments, the data collected from the fixture/room may be comparative in nature. For example, the data may establish that a certain percentage of actuations or water usage for a particular room or area occurs at a particular faucet or toilet, and the like. In another example, the data may establish that a certain percentage of actuations or water usage occurs within a particular time frame or on a particular day relative to a pre-determined period of time (e.g., a particular day of the week or week of the month). In still other embodiments, all of the above may be taken into account. It is understood that the desired data may be pre-compiled and entered into the VRI program (e.g., generated based on comparable data collected at different locations or based on educated assumption), collected in real-time, and/or a combination thereof whereby some pre-determined data and usage parameters are initially entered and updated as real-time data is collected.

After entering the usage data into the VRI program, the VRI program is able to develop a predictive model setting forth 1) the anticipated usage parameters of a particular room or fixture 14, 2) the time and date at which such usage is anticipated to occur, and 3) the statistical parameters of the usage (e.g., the standard deviation). These predictions, in turn, act as a baseline for the VRI program against which real-time data can be compared. The datapoints for these predictions are generally calculated for a pre-determined cyclical unit of time such as, for example, every hour or every day, and the like.

In addition to a historical baseline taken over the history of the room or fixture 14, the VRI program also calculates "real-time" usage data for each fixture 14 and/or room. Such a model may be limited to the current operating parameters or data averaged over a pre-determined period of time such as, for example, the past 8 hours, the past hour, and the like.

Figure 20:
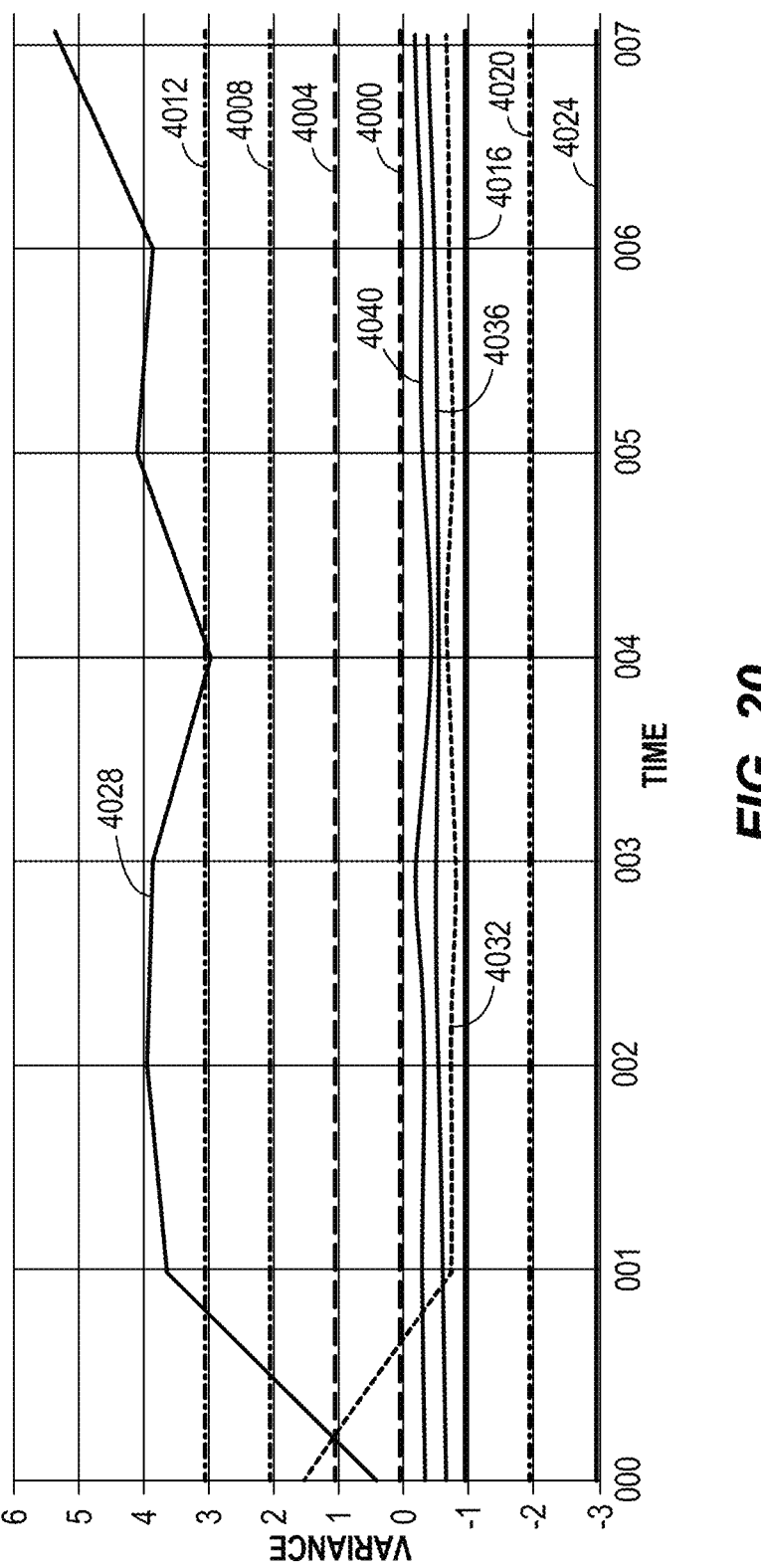
FIG. 20 is a chart depicting data inputs and calculations using the virtual room inspection program.

As data is collected in real-time for the desired fixtures 14, rooms, and/or areas, the VRI programs compares individual datapoints from each data set against each other (see FIG. 20). In instances where the real-time datapoint varies from the anticipated datapoint by a pre-determined amount, the VRI program will determine a failure must have or will occur and instructs the system 10 to generate an alert. The operational envelopes, in turn, are generally determined based at least in part on 1) the standard deviation of the historical data, 2) the magnitude of the variations between the historical and real-time data, 3) the status of consecutive or recent datapoints, and the like. While the illustrated operational envelopes are generally based on statistical analysis of the predictive data (e.g., the standard deviation), operational envelopes may also or alternatively include hard values and ranges set by the user independent from the standard deviation of the collected data (e.g., hard values or percentages).

Some examples of instances where the VRI program may determine a failure has occurred includes: if one or more datapoints fall 3 sigma (e.g., three standard deviations) above the anticipated value a "High Usage" alert will be generated; and if one or more datapoints fall 3 sigma below the anticipated value a "Very Low Usage" alert will be generated. Other examples include, if two out of three consecutive datapoints are two sigma above or below the anticipated value, an alert may be generated; and if seven or more consecutive datapoints fall above or below the anticipated value an alert may be generated. Other combinations of magnitude, persistence, and the like may also be used by the VRI program.

FIG. 20 illustrates one example of the VRI program in action. The chart displays the difference between the received data and the anticipated data. More specifically, the chart displays the anticipated data value as the baseline or zero-point 4000. The chart further graphs variances of 1 sigma 4004, 2 sigma 4008, and 3 sigma 4012 above the zero-point 4000, and 1 sigma 4016, 2 sigma 4020, and 3 sigma 4024 below the zero-point 4000. The chart also displays the real-time values relative to these values from the fixtures themselves, namely fixture A 4028, fixture B 4032, fixture C 4036, and fixture D 4040.

Analysis of FIG. 20 shows that Fixtures B, C, and D 4032, 4036, 4040 all remain relatively unchanged over the illustrated time period being slightly below the anticipated data value but within 1 standard deviation of the projected value. With that said, the chart also illustrates that Fixture A 4028 saw a steep incline where the received data exceeded the projected value by more than 3 standard deviations. Such a change could likely be attributed to a run-on situation (e.g., the valve is stuck open), a leak, and the like. As discussed above, such a drastic change in usage (e.g., real-time value exceeds anticipated value by more than 3 standard deviations) would cause the VRI program to trigger an alert for the user at time unit "001". For the purposes of this chart, the data may include, but is not limited to, water volume usage, actuations, and the like.

In still other embodiments, the VRI program may allow the user to adjust the sensitivity for any particular alerts being generated. The alerts sensitivity may be adjusted for a facility, on a room-by-room basis, or on a fixture-by-fixture basis. For example, in instances where a particular room in a facility is expected to be used less than normal, the user may decrease the sensitivity level (e.g., set the "high usage alert" to 5 sigma instead of 3) to compensate for an anticipated reduction in usage. In still other embodiments, the user may be able to turn off the system in instances where a facility or room will not be in use so as not to skew the machine learning. As indicated above, such abilities may be set both globally or on a room-by-room or building-by-building basis to accommodate where and when such anticipated usage changes are expected to occur (e.g., turn off alert in a particular production area where machines are shut down but keep system on where production remains nominal).

The illustrated system 10 is configured to classify each of the alerts into one or more "severity levels." The severity levels are generally configured to convey to the user, at a glance, the general level of urgency and/or damage that may or has occurred to the plumbing system. In the illustrated embodiment, the system 10 includes three severity levels: Severe, Warning, and Information. "Severe" generally represents the most urgent, past due, and/or potentially damaging events, "Warning" generally represents events resulting in moderate damage and/or events that are scheduled to occur in the near future, and "Information" generally represents events that either have large lead times and/or pose a low risk of severe consequences. An "Information" classification may also be used for events that are routine, optional, and/or informational in nature. Furthermore, the system 10 also includes an "all clear" level configured to confirm to the user that no alerts are currently active for the corresponding fixture 14 (see FIG. 8B). In alternative embodiments, more or fewer classifications may be used where additional levels or points of emphasis are desired.

In the illustrated embodiment, the active alerts widget 100 is subdivided into an active alerts overview section 104 and an active alerts list section 108. The active alerts overview section 104 is intended to provide a broader "system-wide" overview of the number of alerts that are currently active within a particular classification of fixtures 14. In contrast, the active alerts list section 108 is intended to provide a more detailed representation of the active alerts.

The illustrated active alerts overview section 104 includes a plurality of alert indicators 112a, 112b, 112c, each corresponding with and configured to represent the number, and in some cases, the severity level of alerts active within a specific classification of fixtures 14. To do so, each alert indicator 112a, 112b, 112c includes an identifier 116, to graphically represent which classification of fixtures 14 the indicator 112a, 112b, 112c represents, and a plurality of alert counters 120a, 120b to signify the number of alerts active at select severity levels. Generally speaking, the system 10 generates the metrics underlying the active alerts overview section 104 by analyzing the data associated with two or more fixtures 14. In some embodiments, the system 10 analyzes the data from each fixture 14 associated with the system 10.

The identifier 116 of each alert indicator 112a, 112b, 112c generally includes a photo, logo, icon, drawing, or other indicia intended to represent the classification of fixtures associated with that particular alert indicator 112a, 112b, 112c. Each identifier 116 also includes a unique color to help distinguish each classification from the others. In the present interface 84, the look and color of each identifier 116 is typically standardized across the entire platform (e.g., for alerts, fixture locations, maintenance events, and fixture information) to allow the user to more readily identify and associate various fixtures 14 having common attributes.

In the illustrated embodiment, each alert indicator 112a, 112b, 112c of the illustrated system 10 is configured to represent the alerts associated with a particular classification of "fixture type" (described above). As such, the indicators 112a, 112b, 112c, include a simplified representation of a faucet 112a, a flush valve 112b, and a backflow preventer 112c, respectively, to allow the user to quickly and easily associate the information provided with a particular type of fixture (e.g., a faucet, a flush valve, and a backflow preventer, respectively). In other embodiments, each alert indicator may be configured to represent different classifications of fixtures 14 such as, but not limited to, physical locations (e.g., building classifications, room classifications, floor classifications, and the like), room type, and the like.

The alert counters 120a, 120b of a particular alert indicator 112a, 112b, 112c each include a numeric identifier 124a, 124b, which in turn is representative of the number of alerts active in the designated class of fixtures 14 (e.g., as represented by the identifier 116) that fall within an associated severity level. More specifically, the first alert counter 120a indicates the number of alerts designated as "Severe," and the second alert counter 120b indicates the number of alerts designated as "Warning." In the illustrated embodiment, each alert counter 120a, 120b, is visually distinguishable from the others. More specifically, the alert counters 120a, 120b include a colored circle with a number positioned therein (e.g., red for Severe, and yellow for Warning). Similar to the identifiers, the color and shape of each alert counter 120a, 120b, is typically standardized across the entire platform to allow the user to more readily identify and associate different elements with a common set of severity levels.

While the illustrated embodiment only includes numeric identifiers 124a, 124b for the "Severe" and "Warning" level alerts, it is to be understood that in alternative embodiments an additional numeric identifier (not shown) may be included for "Information" level alerts. Still further, the system 10 is configured so that the user can selectively turn on and off numeric identifiers 124*a*, 124*b* for any of the individual alert levels.

While the illustrated alert counters 120*a*, 120*b*, are represented as a number contained in a colored circle, in other embodiments, different shapes and/or symbols may be associated with each severity level (e.g., triangles, circles, squares, exclamation points, question marks, stars, and the like). In such embodiments, the color of each symbol remains constant across the entire platform for ease of use and identification. In the illustrated embodiment, the alert counters 120*a*, 120*b* may not be rendered or displayed when the associated numeric value is "0" (see alert indicators 112*a* and 112*b*).

Together, the identifier 116 and alert counters 120*a*, 120*b* of each individual alert indicator 112*a*, 112*b*, 112*c* allows the user to quickly and easily identify large quantities of information. More specifically, looking at the active alerts overview section 104 allows the user to immediately identify the number of severe, and warning level alerts currently present in an entire classification of fixtures 14. For example, a user can immediately identify in FIG. 5A that all fixtures 14 classified as a "faucet" combine to have six "Severe" level active alerts and zero "Warning" level alerts. Furthermore, a user can identify that all fixtures 14 classified as a "flush valve" combine to have one "Severe" level active alert and zero "Warning" level alerts. Finally, the user can quickly identify that all fixtures 14 classified as a backflow preventer combine to have thirty-two "Severe" level alerts and two "Warning" level alerts.

The alert indicators 112*a*, 112*b*, 112*c* may also be embedded with links so that selecting (e.g., clicking on) a specific element thereof will cause a pre-determined subset of information to appear in a pop-up window, and/or in the active alert list section 108. For example, selecting the "red number 1" shown in FIG. 5A would provide a list of all Severe level alerts associated with flush valve classified fixtures 14. Similarly, selecting the black identifier 116 depicting a backflow preventer would provide a list of all alerts, regardless of severity level, associated with backflow preventer classified fixtures 14 (e.g., 35 alerts in total).

The active alerts list 108 of the active alerts widget 100 is configured to supplement the active alerts overview section 104 and provide more detailed information for easy review by the user. More specifically, the illustrated active alerts list 108 includes a list of one or more entries 128, each representative of a currently active alert in the user's plumbing ecosystem.

In the illustrated embodiment, each entry 128 may include, among other things, 1) identifying information 110 of the fixture 14 associated with the alert, 2) the identifier 116 representative of the fixture classification of the corresponding fixture 14, 3) a severity indicator 132 representative of the severity level of the corresponding alert, 4) a time stamp 136 representative of the time the alert was triggered, 5) an alert title 140 giving a brief description of the type of alert triggered, 6) an alert details section 142 providing a brief description of pertinent facts regarding the alert, and 7) location information 144 listing the location classifications of the fixture 14 associated with the alert.

As shown in FIG. 5A, the identifying information 110 of the entry 128 includes the title or name of the fixture 14 involved. As described below, the title is typically taken from the associated fixture profile 92, to allow for consistency and ease of reference for the user. Furthermore, the identifier 116 of each entry 128 is typically chosen from and corresponds with the identifier 116 present in one of the alert indicators 112*a*, 112*b*, 112*c* of the active alerts overview section 104 to provide visual consistency and ease of reference between the two sections 104, 108. However, in other embodiments, the identifier 116 of each entry 128 may be chosen from and represent other classifications.

As discussed above, the severity indicator 132 is configured to visually represent the severity level of the associated alert. In the illustrated embodiment, the severity indicator 132 generally corresponds with the alert counters 120*a*, 120*b* in at least one of color, shape, and/or symbol. For example, the severity indicator 132 of the first entry 128 in FIG. 5A has the same color and shape as the alert counter 120*a* with the primary difference being that the numeric identifier 124*a* has been replaced with a standardized symbol (i.e., an exclamation point).

During use, the user may select an individual entry 128 (e.g., by clicking on it) causing the interface 84 to open and display the fixture profile 92 of the fixture for which the alert applies. In other embodiments, selecting the entry 128 may also cause the system to display a form of alert page (not shown) which contains the specific information regarding the selected alert. For example, an alert page may include, but is not limited to, potential remedies suggestions, a list of replacement parts commonly associated with a particular type of alert, an ability to "send" the alert to another party responsible for clearing the alert, and the like.

The active alerts list 108 is also capable of being organized and sorted depending upon the user's needs. In the illustrated implementation, the active alerts list 108 is organized by time stamp 136 (see FIG. 5A) such that the active alerts list 108 will display the most recent alerts from the entire plumbing ecosystem at the top of the list regardless of severity level or fixture classification. The active alerts list 108 may also be sorted by severity (e.g., listing Severe alerts first, followed by Warning alerts; see FIG. 5D) or fixture (e.g., to group alerts applying to a single fixture 14 together regardless of severity level or time stamp; see FIG. 5C). While not listed, other forms of organization may also be used.

As shown in FIG. 5C, when organized by fixture, the active alerts list 108 changes in format such that each entry 128' now has two subsections: a header 1000' and a body 1004' associated with each header 1000'. The header 1000' of each entry 128' includes information associated with the fixture 14 while the body 1004' includes a complete list of alerts associated with the named fixture 14. As shown in FIG. 5C the header 1000' includes the identifying information 1008' of the fixture 14, the location information 1012' of the fixture 14, a severity indicator 1016', and the identifier 116 as described above. To note, the severity indicator 1016' generally represents the severity of the highest severity level alert associated with that particular fixture 14. However, in alternative embodiments (not shown) multiple severity indicators may be present. For example, one severity indicator may be present for each alert associated with a particular fixture 14. For example, the top entry 128' shown in FIG. 5C, the header 1000' may include three "Severe" icons.

Below each header 1000' is the body 1004'. The body 1004' of each entry 128' includes a list of each alert associated with the fixture 14 named in the header 1000'. Each listed alert includes a time stamp 1020', an individual severity indicator 1024', and an alert title 1028'.

During use, selecting (e.g., clicking) an entry 128' will cause the corresponding fixture profile 92 to be displayed. However, in alternative embodiments, clicking on a specific alert entry within the body 1004' may cause the associated alert page (described above) to be displayed.

In some embodiments, the active alerts widget 100 may also include a response section (not shown) allowing the user to send communications back to the fixture 14 in response to the alert. More specifically, if an alert is active, the user may select an input whereby the system 10 will take appropriate action in response-including sending operational instructions to both the fixture 14 itself or related fixtures 14. For example, if a run-on condition is detected, the user may select an input whereby the system 10 will instruct the fixture 14 to shut down. If that is unsuccessful, the system 10 may prompt or automatically then instruct the necessary smart-valves to turn the water supply off for that particular room or floor.

As shown in FIG. 5A, the illustrated dashboard 88*a* also includes an "alerts by building" (ABB) widget 148. The ABB widget 148 is configured to provide a graphical representation of the number of alerts that occurred over a pre-determined period of time as organized by building classification. As shown in FIG. 5A, the illustrated ABB widget 148 includes a bar graph with an individual bar or entry 146 included for each building associated with the user's plumbing ecosystem. As indicated previously, the graph can be updated in real-time reliant on the different inputs from the individual end fixtures 14 as processed by the system 10. The ABB widget 148 is also configured such that when the user selects and/or positions their cursor over a particular bar of the graph, the graph will present a label showing the exact number of alerts that bar represents (not shown). While the illustrated ABB widget 148 is based on a vertical bar graph, it is understood that in alternative embodiments, different forms of graphical representation may be used. In still other embodiments, a text-based list may also be used.

In the illustrated embodiment, the ABB widget 148 includes a single bar 146 for each building classification, generally configured to represent the total number of alerts (e.g., both Sever, and Warning) active for any fixtures 14 classified as being located in the corresponding building. However, in alternative embodiments, each building classification may include a separate bar for each severity level (e.g., a bar representing the number of Severe alerts in a given building, and a bar representing the number of Warning alerts in a given building). In still other embodiments, each building classification may include a separate bar for each fixture type classification.

As shown in FIG. 5A, the ABB widget 148 can be customized by the user to display data collected over varying time periods. Some selectable time periods may include, but are not limited to, the current amount of alerts (e.g., alerts currently active), the number of alerts active at any time over the past 24 hours, the number of alerts active at any time over the past 7 days, the number of alerts active at any time over the past month, the number of alerts active at any time over the past year, any alerts older than a set time period, and the like. In still other embodiments, the ABB widget 148 may allow the user to enter a date range or multiple date ranges (not shown). Furthermore, in some embodiments the widget 148 may be customizable regarding which levels of alerts are included in the displayed data. For example, the user may select that only Severe level alerts are included in the total displayed. In still other embodiments, the user may select which buildings are displayed at any given time.

The dashboard 88*a* may also include an "alerts by room" (ABR) widget 152 and/or an "alerts by floor" (ABF) widget 156 available for the user to select and display (see FIGS. 5A and 5C). Both widgets 152, 156 are substantially similar to the ABB widget 148, described above, aside from having the location classification based on room and floor, respectively, instead of by building. More specifically, the ABR widget 152 and ABF widget 156 each include a bar or entry 158 corresponding with the number of alerts present in a particular room classification or floor classification, respectively. During use, the user is able to customize the ABR and ABF widgets 152, 156 to display data collected over varying time periods and from specific buildings.

More specifically, a first drop-down menu 162*a* allows the user to select a building classification, whereby the displayed entries 158 are limited to floors or rooms located in the selected building classification (see FIG. 5B). A second drop-down menu 162*b* allows the user to select the time period over which the data is displayed as described above with respect to the ABB widget 148. In still other embodiments, the user may select a subset of alert levels to be included in the displayed data (e.g., only Severe).

As shown in FIG. 5C, the dashboard 88*a* may also include a "top water usage" (TWU) widget 160. The TWU widget 160 is configured to provide a graphical representation of the top individual fixtures 14 as measured by the volume of water that flowed therethrough over a predetermined period of time. In the illustrated embodiment, the TWU widget 160 includes a bar graph with an entry 164 included for each individual fixture 14 up to a set maximum (e.g. five). Each entry 164, in turn, has a bar having a length representative of the volume of water that flowed through the fixture 14 over the pre-determined period of time and a label identifying the specific fixture 14 itself. In some embodiments, the color of the bar may be representative of a classification, such as but not limited to, the fixture type or location classification information (e.g., green for flush valves and blue for faucets). The classification influencing the bar color may be user customizable. In such embodiments, the color of the bar generally corresponds with the color of the associated identifiers 116 included in other widgets of the dashboard 88*a* and throughout the system 10 itself for easier association.

The TWU widget 160 is also configured such that when the user selects and/or positions their cursor over a particular bar of the graph, the graph will present a pop-up label (not shown) to provide additional information regarding the fixture and its corresponding water usage. For example, the pop-up label may display the amount of water used over the selected period of time, and the number of uses 182 over the selected period of time. However, in alternative embodiments different combinations of data may be displayed within the pop-up label.

With continued reference to FIG. 5C, the TWU widget 160 can be customized by the user to display data collected over varying time periods. Some selectable time periods may include, but are not limited to, the past 24 hours, the past 7 days, the past month, the past year, and the like. In other embodiments, the TWU widget 160 may allow the user to enter a date range or multiple date ranges (not shown). In still other embodiments, the TWU widget 160 may be filterable by one or more classifications. For example, the user can select a specific fixture type, building, floor, room, room type, and the like to limit the entries 164 to those that fall within the selected classifications. In still other embodiments, the user may select the maximum number of entries 164 that the TWU widget 160 will display at any given time. While the illustrated TWU widget 160 is based on a horizontal bar graph, it is understood that in alternative embodiments, different graphical presentation styles may be used. In still other embodiments, a text-based chart may also be used.

The dashboard 88*a* may also include a "top faucet actuations" (TFA) widget 168 and/or a "top flush valve actuations" (TFVA) widget 172 for the user to select and display (see FIG. 5D). Both widgets 168, 172 are substantially similar to the TWU widget 160, described above, aside from having the resulting chart display the number of faucet and flush actuations, respectively, instead of the volume of water flow. As such, the TFA widget 168 and TFVA widget 172 will not be described in detail herein.

As shown in FIG. 5E, the illustrated dashboard 88*a* also includes a "backflow pressure" (BP) widget 176. The BP widget 176 is configured to provide a list of data entries 180, each representing the backflow pressure data for a particular fixture 14. More specifically, each illustrated entry 180 lists: 1) identifying information 186 for the listed fixture 14, 2) location information 187 for the listed fixture 14, 3) the minimum backflow pressure 184 detected over a pre-determined period of time, 4) the maximum backflow pressure 190 detected over the same pre-determined period of time, and 5) the average backflow pressure 194 detected over the same pre-determined period of time.

In some embodiments, the user is able to customize the time period over which the maximum, minimum, and average backflow pressures are calculated. For example, the user may select a time period including, but not limited to, the last 24 hours, the last 7 days, the last month, the last year, and the like. In some embodiments, the BP widget 176 may be configured to allow the user to enter a start and end time to establish a custom time period (not shown). In still other embodiments, the user may be able to organize or filter the resulting list of entries 180 by any of the individual columns including, but not limited to, the name, the location, average pressure, the maximum pressure, and the minimum pressure. The widget 176 may also allow the user to filter the entries 180 by classification (e.g., fixture type, building, floor, room, etc.) so that only fixtures 14 falling within the selected classification are displayed.

As also shown in FIG. 5E, the illustrated dashboard 88*a* may also include a "building pressure" (BuP) widget 200. The BuP widget 200 is configured to graphically display the building pressure as detected by a pre-selected fixture 14 over a pre-determined period of time. The illustrated widget 200 displays this information using a line graph where a first axis (e.g., the x-axis) represents the passage of time and a second axis (e.g., the y-axis) represents the pressure reading.

In some embodiments, the user may customize the BuP widget 200 based upon one or more of the following: 1) the fixture 14 whose data the user would like to display, and 2) the length of time over which the user would like the widget 200 to display pressure data (e.g. over an hour, a day, a week, a month, a year, etc.). Once selected, the BuP widget 200 calculates a maximum pressure 204, an average pressure 208, and a minimum pressure 212 using a pre-determined interval over the selected time range (e.g., every month over a year when year is selected; every day over a week when week is selected, etc.). The widget 200 then displays the results. In some embodiments, the calculation interval may be limited based on the frequency that data is provided to the system 10 or the relevant fixture 14. However in other embodiments, the user may also select the interval over which the maximum, average, and minimum pressures 204, 208, 212 are calculated.

Although the illustrated BuP widget 200 calculates and displays data for a single fixture 14, in alternative embodiments the widget 200 may also combine pressure data from multiple fixtures 14 (e.g., taking the average of the two) or overlay the pressure data from multiple fixtures 14 onto the same graph. In still other embodiments, the widget 200 may calculate a "building" average based on all of the fixtures 14 associated therewith and display the resulting data.

Figure 5G:
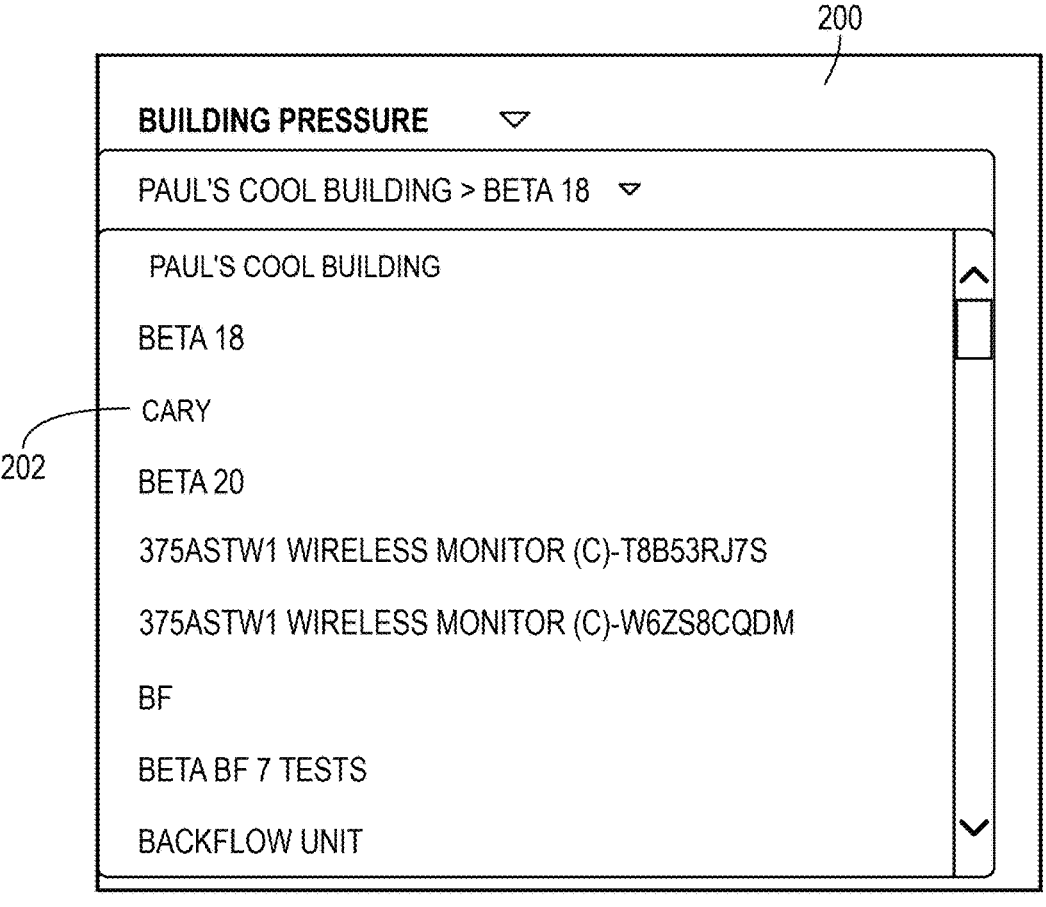

As shown in FIG. 5G, the drop-down menu 202 for the BuP widget 200 is subdivided by building classification. More specifically, the resulting list includes a building classification followed by a list of fixtures 14 contained within the listed building. This organization makes it easier for the user to locate and select an individual fixture 14 for use in the widget 200.

The BuP widget 200 is also configured such that when the user selects and/or positions their cursor over a particular entry in the line graph, the graph will present a pop-up label (not shown) to provide supplemental information. More specifically, the pop-up label may display the exact data point for the maximum, minimum, and average pressure for the selected interval period. However, in alternative embodiments different combinations of data may be displayed within the pop-up label.

As shown in FIGS. 5A-5E, the dashboard 88*a* may also include an upcoming maintenance (UM) widget 216 that is configured to provide a list of maintenance action items or tasks that are scheduled to occur. In the illustrated embodiment, the UM widget 216 includes a list of maintenance entries 220, each of which include 1) the date 224 the maintenance task is scheduled to occur, 2) the current status 226 of the maintenance task, 3) the name 228 of the individual fixture 14 to which the maintenance task applies, 4) the location data 232 for the corresponding fixture 14, and 5) a service type descriptor 236 of the maintenance action that is scheduled to occur. While not shown in FIGS. 5A-5E, each entry 220 may also include an additional column listing the person(s), department, and/or vendor charged with completing the listed maintenance task.

In some embodiments, the user may customize the UM widget 216 to sort or filter the entries 220 by classification, severity level, status, date, and the like. Furthermore, the UM widget 216 may be customized so that only maintenance tasks of a particular severity level (e.g., only Severe) are displayed. Still further, the UM widget 216 may be customized so that only maintenance tasks from a particular classification (e.g., fixture, building, room, room type, floor, etc.) are displayed.

The status indicator 226 of each entry 220 of the UM widget 216 is configured to convey to the user the operational condition of the corresponding maintenance task. More specifically, the system includes a "pending" status configured to convey that the task has not yet been completed or addressed, a "scheduled" status configured to convey that the task has been initially addressed for completion but still remains undone, a "cancelled" status configured to represent that the task has been cancelled and will no longer take place, and a "completed" status to signify that the task has been completed.

The service type descriptor 236 of each entry 220 is configured to convey to the user the type of maintenance occurring. More specifically, the system includes a "Preventative Maintenance" description that generally corresponds to maintenance tasks intended to be completed to avoid a future failure, a "Repair" description that generally corresponds to maintenance tasks intended to fix or correct an item that has failed but the item itself can still be used, and a "Replace" description that generally corresponds to maintenance tasks where the failed item needs to be removed and replaced with a new item. Although not shown, additional descriptions may also be used including, but not limited to, a "Test" description that generally corresponds to maintenance tasks where the fixture 14 needs to be tested or re-certified, a "Cleaning" description where the part needs to be cleaned, "Upgrade" when the fixture needs to be upgraded to a newer model or firmware, and the like.

The UM widget 216 also includes the ability to export 218 the data included therein to an external program for subsequent analysis (e.g., Excel, Word, PowerPoint, and the like). More specifically, when exporting the entries 220 of the UM widget 216, the widget 216 compiles the listed information and produces a new file in the desired third-party format. In embodiments where the user desires an Excel spreadsheet, the widget 216 maintains the overall layout of the data such that each individual entry 220 is a row in the resulting spreadsheet and each data element within the entry 220 is included in a unique column (see FIG. 6). Furthermore, the widget 216 is configured to generate and add appropriate column labels to the exported data for ease of use.

During use, selecting any one of the individual entries 220 causes the interface 84 to open the fixture profile 92 for the fixture 14 corresponding with the selected maintenance task. In some embodiments, the interface 84 will automatically open the fixture profile 92 so that the appropriate maintenance task page 222 is displayed. In still other embodiments, the maintenance display 340 of the corresponding fixture profile 92 will be displayed providing the maintenance history 376 of the fixture 14.

While not shown, other widgets may also be included in the dashboard 88a. For example, widgets depicting and displaying LEED certifications may be included. In such a widget, data can be provided on how efficient the building is relative to LEED certification and identify where improvements can be made. The user may be automatically notified of recommendations regarding how to save water (based upon historical water and/or fixture usage data). The LEED data can be provided in real-time as water usage data is collected from the building's end point fixtures 14. Furthermore, widgets may be included that correlate remotely sensed flush valve and faucet data with a personal identifier (e.g., an employee badge) to display the sanitary practices of individual and groups of individuals over the entire plumbing ecosystem. In still other embodiments, a widget may be present that correlates sink actuations with soap dispensing actuations. In still further embodiments, a display may be included that compares room entry, flushing, sink activity, and soap dispensing activities to generate hand washing or other sanitary data. In still further embodiments, a widget may be included that correlates sanitation data (described above) with illness or time-off and the like.

In still other embodiments, a "sanitary paper usage" widget may be included in the dashboard 88a. The sanitary paper usage widget would include a display of how much sanitary paper is available in a particular location or classification (e.g., an individual stall, a paper towel dispenser, an individual bathroom, an individual floor, and the like). The widget would then calculate the usage of the sanitary paper at a particular location based at least in part on the number of flushing or faucet actuations taking place at that location. Specifically, the user would initially set the amount of sanitary paper present at a particular location, the widget would calculate the amount of paper used by multiplying the number of flushing actuations by an average amount of paper used per flush. The widget would then subtract the resulting amount of paper from the stock available to determine the remaining amount. In the present embodiment, the user would be able to set and/or adjust the average amount of paper used per flushing actuation, and the system 10 may use machine learning to adjust or make suggestions for adjustments to that value. A similar calculation can be performed for hand towels and faucet actuations.

When the stores of sanitary paper at an individual location or classification drops below a pre-determined level (a level that can also be set by the user), an alert will be triggered. In some embodiments, the widget itself will include a plurality of entries (e.g., bars on a bar graph) where each bar represents the amount of sanitary paper remaining at that particular location or in a particular fixture. During use, the user would be able to customize the display by selecting the classifications displayed.

In the illustrated embodiment, the dashboard 88a includes a combination of "primary" widgets (e.g., the active alerts widget 100, and UM widget 216) that are located in a fixed location within the visible screen, and "mobile" widgets (e.g., the ABB widget 148, ABR widget 152, ABF widget 156, TWU widget 160, BP widget 176, and BuP widget 200) that can be selectively displayed in multiple locations. More specifically, the illustrated dashboard 88a includes two mobile widget locations where any combination of two mobile widgets may be selectively displayed. In alternative embodiments, more or fewer mobile widget locations may be present. In still other embodiments, the size, shape, and location of the mobile widgets may be changed. Furthermore, while the primary widgets are generally stationary on the screen, the data displayed by the primary widgets may still be customized.

Figure 8A:
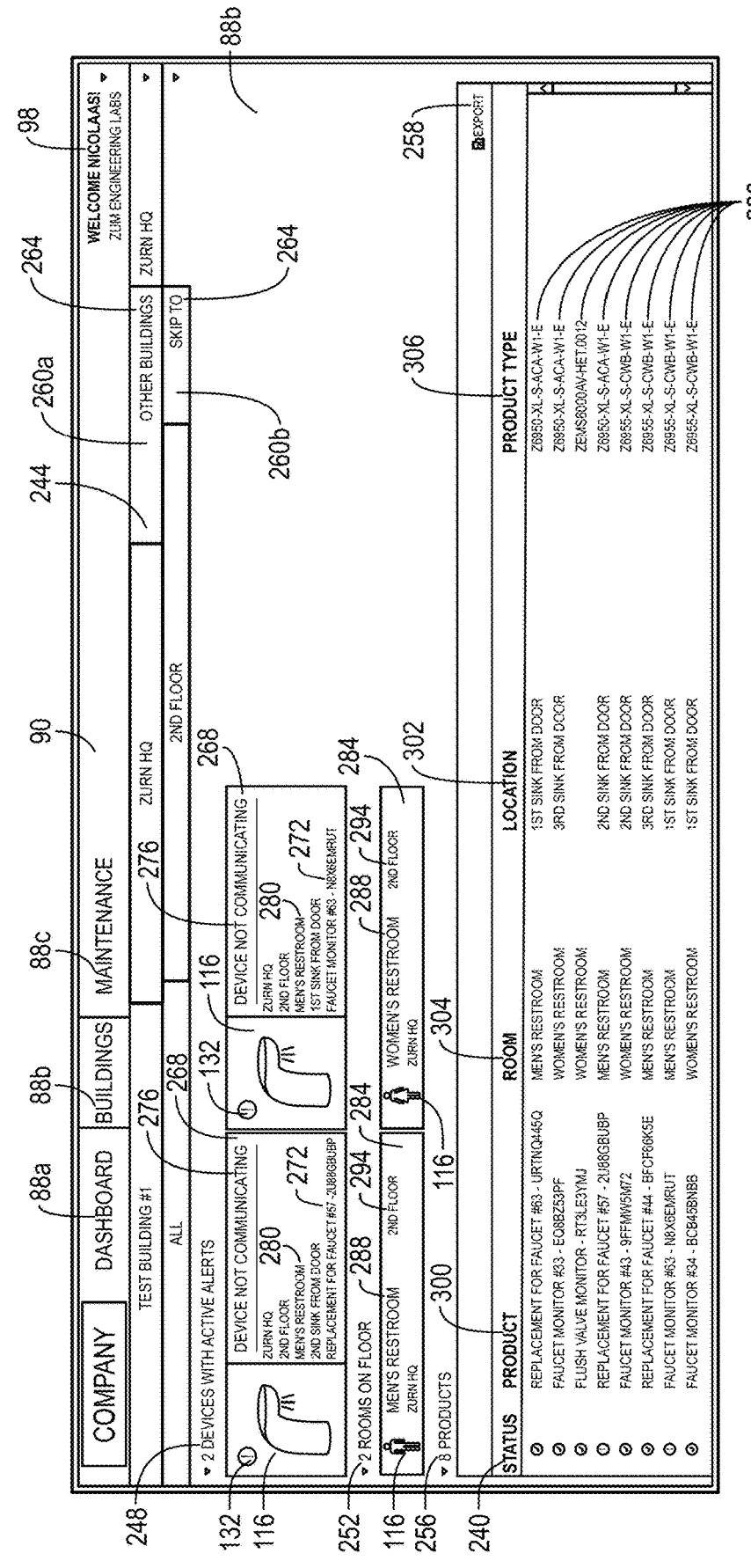
FIGS. 8A-8B illustrate a building display page of an interface for use with the system of FIG. 1.
Figure 8B:
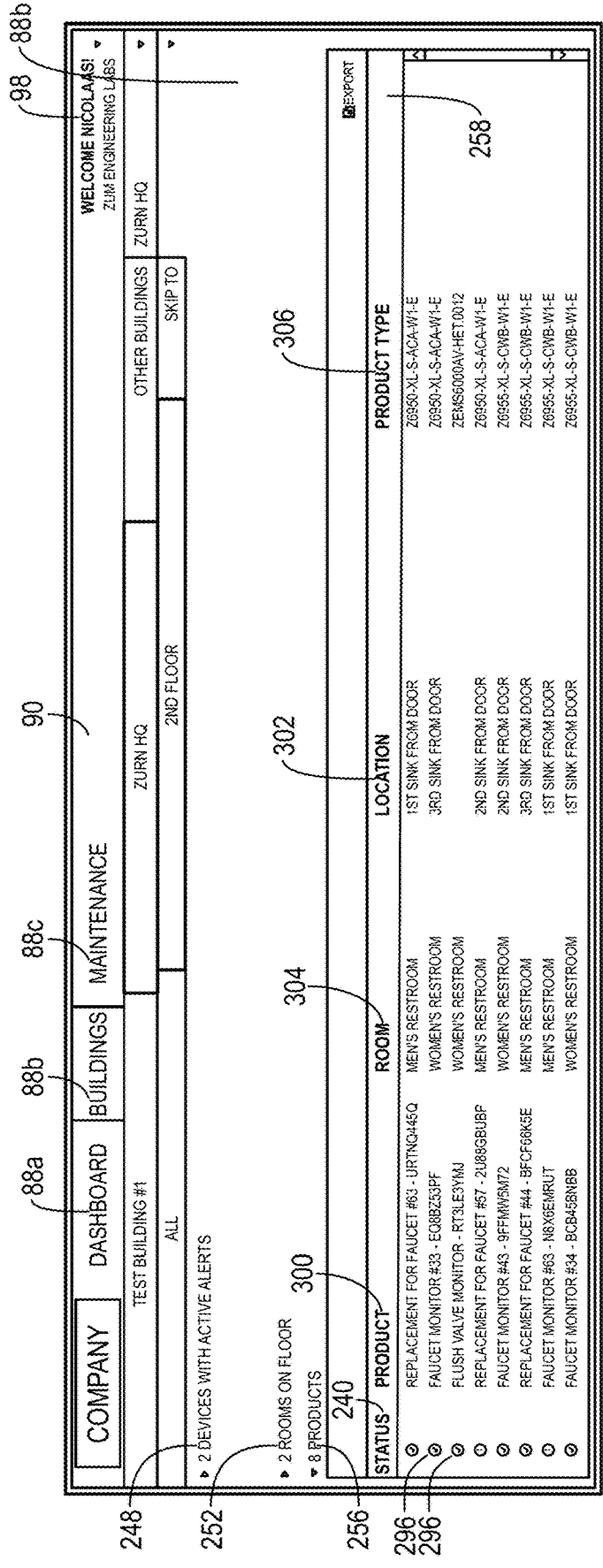

As shown in FIGS. 8A-8B, the illustrated building display 88b of the interface 84 is generally configured to organize and display the fixtures 14 according to their physical location within the client's facilities, and provide information regarding any active alerts associated with a particular location classification. In the illustrated embodiment, the building display 88b includes: 1) a location navigation bar 244 for quickly and easily selecting a particular location classification within the user's plumbing ecosystem, 2) an active alerts list 248 configured to display any active alerts associated with the selected location classification, 3) a rooms list 252 configured to display any rooms associated with the selected location classification, and 4) a products list 256 configured to display a list of all fixtures 14 associated with the selected location classification. In the illustrated embodiment, some of the elements (e.g., the active alerts list 248, the rooms list 252, and the products list 256) are collapsible so they can be easily removed from view to provide easier access to the remaining elements (see FIG. 8B).

The illustrated navigation bar 244 includes multiple navigation levels 260a, 260b (see FIG. 8A), each associated with a particular location classification. More specifically, the illustrated navigation bar 244 includes a first level 260a, generally corresponding with the building classification of the fixtures 14, and a second level 260b, generally corresponding with the floor classification of the fixtures 14. During use, the navigation bar 244 is configured to automatically display the associated second level 260b information based on the selections made on the first level 260a. For example, if the user selects "Zurn HQ" from the first level 260a of the navigation bar 244, the building display 88b will automatically list all of the floor classifications associated with "Zurn HQ" on the second level 260b (e.g., $2^{nd}$ Floor). Similarly, if the user selects "All" from the first level 260a of the navigation bar 244, the building display 88b will automatically display all floor classifications present within all of the building classifications included in the user's plumbing ecosystem. In instances where a large number of options are available, a "skip to," "other buildings" or other navigation aid 264 may be included to allow the user to more quickly and easily identify which classifications they wish to select. Still further, in some embodiments, the navigation bar 244 may allow the user to select multiple classifications from each level 260*a*, 260*b*. In such embodiments, the second level 260*b* would automatically display a combined list of all possible floors classifications present in each of the buildings selected.

While not illustrated in FIGS. 8A-8B, the second level 260*b* may not be shown in instances where a second level selection is not possible or superfluous. For example, if the user selects a building having only a single relevant floor classification, the second level 260*b* of the navigation bar 244 may be omitted to preserve space on the screen.

Although not shown, a third level may also be included in the navigation bar 244 to provide the user a third level of classification selection. In such embodiments, the third level may be used to select, among other things, a particular room classification, a particular room type classification, fixture classification, and the like. Still further, more than three levels may be present if more detailed location classifications are present (e.g., locations within a room, individual stalls within a bathroom, specific machine assemblies, etc.)

Together, the selections from the navigation bar 244 are configured to establish the sub-group of fixtures 14 to be included and displayed in the active alerts list 248, the rooms list 252, and the products list 256. More specifically, the navigation bar 244 serves as a filter to limit the three lists 248, 252, 256 to only fixtures 14 that satisfy all of the classification selections.

The active alerts list 248 of the illustrated building display 88*b* is configured to list each of the active alerts associated with fixtures 14 satisfying each of the selected location classifications (e.g., all fixtures located in the selected locations). As shown in FIG. 8A, the active alerts list 248 includes one or more fixture alert tiles 268, each corresponding with a fixture 14 that falls within the selected location classifications, and includes at least one alert associated therewith. In the illustrated embodiment, the active alerts list 248 is configured to include each fixture 14 once regardless of the number of alerts associated therewith (e.g., list the most urgent alert only). This minimizes clutter and avoids duplicating information so that the user may navigate the building display 88*b* more easily. However, in alternative embodiments, each fixture 14 may be listed multiple times, such as once for each corresponding alert.

Each fixture alert tile 268 is configured to convey, in a combined graphical and textual manner, information to the user regarding an alert, the severity of the alert, and the fixture 14 to which the alert corresponds. For example, each illustrated alert tile 268 includes: 1) identifying information 272 for the fixture 14 associated with the alert(s), 2) an identifier 116 representative of a classification of the corresponding fixture 14, 3) a severity indicator 132 corresponding to the severity level of the corresponding alert, 4) a title block 276 configured to list and briefly describe the type of alert, 5) location data 280 listing the location classifications associated with the fixture 14.

As shown in FIG. 8A, the identifier 116 of each alert tile 268 is configured to represent the fixture type classification, and is typically chosen from and corresponds with the identifier 116 present in one of the alert indicators 112*a*, 112*b*, 112*c* of the active alerts overview section 104 to provide visual consistency and ease of reference between the various sections of the interface 84. However, in other embodiments, the identifier 116 of each alert tile 268 may be chosen from and represent other classifications.

The illustrated severity indicator 132 is configured to visually represent the severity level of the associated alert. In the illustrated embodiment, the severity indicator 132 generally corresponds with the alert counters 120*a*, 120*b* in at least one of color, shape, and/or symbol. For example, the severity indicator 132 of both alert tiles 268 has the same color and shape as the alert counter 120*a* with the primary difference being that the numeric identifier 124*a* is replaced with a standardized symbol (i.e., an exclamation point). In instances where multiple alerts are present for a single fixture 14, the severity indicator 132 is generally configured to represent the highest level of severity present within the multiple alerts.

During use, a user may select (e.g., click) on an alert tile 268 whereby the fixture's 14 corresponding fixture profile 92 will be presented either on a separate page or as a pop-up (described below).

The rooms list 252 of the illustrated building display 88*b* is configured to list each room classification corresponding to the building and floor classifications established via the navigation bar 244. As shown in FIG. 8A, the rooms list 252 includes one or more room tiles 284, each corresponding with a particular room that shares the selected location classifications.

Each illustrated room tile 284 is configured to convey, in a combined graphical and textual manner, information to the user regarding the name, type, and location of the room with which it corresponds. More specifically, each illustrated room tile 284 includes: 1) a title block 288 listing the associated room's name, 2) an identifier 116 representative of the type of room represented by the tile 284, and 3) location data 294 listing the location classifications associated with the room.

The identifier 116 of each room tile 284 generally includes a photo, logo, icon, drawing, or other indicia intended to represent the room type classification associated therewith. For example, a room type classification may include, but is not limited to, a men's bathroom, a women's bathroom, a kitchen, a break room, a utility closet, and the like. Similar to the identifiers 116 discussed above, the identifier 116 of the room tile 284 is generally reproduced across the entire platform to provide visual consistency and ease of reference between the various sections of the interface 84. However, in other embodiments, the identifier 116 of each room pod 284 may represent other classifications. In still other embodiments, the identifier 116 may include or be supplemented with geolocation data regarding the location of the room within the user's facilities. Such an identifier may include, but is not limited to, a map with location indicator, GPS data, and the like.

In some embodiments, a user may select (e.g., click) on a room tile 284 whereby the room's individual room profile 96 will be presented either on a separate page or as a pop-up (described below).

The products list 256 of the illustrated building display 88*b* is configured to provide a list of all the fixtures 14 that fall within the location classifications selected in the navigation bar 244. In the illustrated embodiment, the products list 256 includes one or more fixture entries 296, each of which include: 1) the name 300 of the corresponding fixture 14, 2) the room classification 304 associated with the fixture 14, 3) the specific location information 302 of the individual fixture 14 within the room, 4) supplemental fixture information 306, and 5) the status indicator 240 configured to represent the highest severity level alert currently associated with the fixture 14. During use, the user may customize the products list 256 to sort or filter the entries 296 by product name 300, building classification 304, severity level, room classification, product type, and the like.

The status indicator 240 of each entry 296 is configured to graphically display the highest severity level currently attributed to the corresponding fixture 14. Similar to the severity indicator 132, described above, the status indicator 240 generally corresponds with the alert counters 120a, 120b, 120c in at least one of color, shape, and/or symbol. In some embodiments, the indicia used for the status indicator 240 and severity indicator 132 are the same.

In some embodiments, a user may select (e.g., click) on an entry 296 (e.g., the name 300) whereby the fixture's 14 corresponding individual fixture profile 92 will be presented either on a separate page or as a pop-up (described below). Furthermore, the product list 256 has an export icon 258 such that the user can export the data from the list 256 to a third-party program (e.g., Word, Excel, PowerPoint, etc.; see FIG. 7).

FIGS. 9A-11F generally illustrate various embodiments of a fixture profile 92. Each fixture profile 92 is configured to serve as the primary information repository of a single end point fixture 14. More specifically, the profiles 92 provide easy and thorough access to various data sets affecting the corresponding fixture 14 such as, for example, a list of past and present alerts, past and present performance charts, scheduled and past maintenance tasks, replacement part data and purchasing capabilities, and operating limits and parameters of the fixture 14. In the illustrated embodiment, the exact layout and features of any one profile 92 is at least partially dependent upon the fixture classification of the corresponding fixture 14. For example, the layout of a fixture profile 92 for a backflow preventer is generally illustrated in FIGS. 9A-9F, the layout of a fixture profile 92' for a faucet is generally illustrated in FIGS. 10A-10E, and the layout of a fixture profile 92" for a flush valve is generally illustrated in FIGS. 11A-11F. In alternative embodiments, additional or fewer fixture profile 92 layouts may be used to accommodate the specific operating conditions and parameters of a specific fixture (not shown). In the illustrated embodiment, each fixture profile 92 is a pop-up that appears in response to the user selecting (e.g., clicking) on a particular fixture 14 elsewhere in the interface 84. However, in different embodiments, the fixture profile 92 may open in a separate tab or window in the browser (when present)

FIGS. 9A-9F illustrate a fixture profile 92 for use with a backflow preventer. The fixture profile 92 includes: 1) a severity indicator 310 configured to represent the highest severity level associated with the fixture 14, 2) an identifier 116 representative of a classification of the associated fixture 14, 3) one or more alert titles 314 to briefly describe and title each of the associated alerts, 4) a photograph or depiction 318 of the fixture 14, 5) the name 316 of the fixture 14, 6) the location information 320 of the fixture 14, and 7) a database portal 324 where the user may selectively access various forms of information corresponding to the listed fixture 14.

In the illustrated embodiment, the photograph 318 of the fixture 14 includes a professional or stock photo of the type and model of fixture 14 associated with the profile 92. However, in alternative embodiments, additional photographs of the fixture 14 may be included. For example, the photograph 318 may include a "contextual" photo of the fixture 14 in its installed location to allow the user to visually see the location, mounting style, and the like. As such, the user can reference the photo 318 to more easily locate the fixture 14 in the field.

In still other embodiments, geolocation data may also be included in the fixture profile 92 to supplement the photograph 318. In such embodiments, the information may be depicted on a map or electronically transferable to a mobile device (e.g., a cell phone or GPS device) to allow the user to use GPS to more easily find the fixture 14 in the field.

The severity indicator 310 of the fixture profile 92 is configured to visually represent the highest severity level of the associated alerts. In the illustrated embodiment, the severity indicator 310 generally corresponds with the alert counters 120a, 120b in at least one of color, shape, and/or symbol. For example, the severity indicator 310 of FIG. 9A has the same color and shape as the alert counter 120a with the primary difference being that the numeric identifier 124a is replaced with a standardized symbol (i.e., an exclamation point). While the illustrated fixture profile 92 includes a single indicator 310, it is understood that in alternative embodiments multiple indicators may be present (not shown) with one indicator present for each outstanding alert.

The illustrated identifier 116 of each fixture profile 92 is configured to represent the fixture type classification, and is typically chosen from and corresponds with the identifier 116 present in one of the alert indicators 112a, 112b, 112c of the active alerts overview section 104 to provide visual consistency and ease of reference between the various sections of the interface 84. However, in other embodiments, the identifier 116 of each fixture profile 92 may be chosen from and represent other classifications. In still other embodiments, more than one identifier 116 may be present where multiple classifications relating to the fixture 14 are to be shown.

The database portal 324 is configured to allow the user to selectively access various data sets, graphical interfaces, points of purchase, operating parameter inputs, remote operation capabilities, and detailed information regarding the associated fixture 14. More specifically, the illustrated database portal 324 includes a display region 328, and a menu region 332. In some embodiments, the user is able to select one of multiple options from the menu region 332 whereby the corresponding information is displayed in the display region 328 (see FIGS. 9A-9F).

The illustrated database portal 324 includes a plurality of screens or displays, each of which is configured to present a unique set of graphical displays, data analysis, and/or data entry capabilities. In the illustrated embodiment, the database portal 324 includes: 1) a chart display 336, 2) a maintenance display 340, 3) a replacement parts display 344, 4) a parameters display 348, and 4) a details display 352. As discussed above, the user may selectively change which display is presented in the display region 328 by selecting the various options in the menu region 332.

The chart display 336 (see FIG. 9A) of the database portal 324 is configured to display operational data regarding the use and/or operation of the associated fixture 14. In the illustrated embodiment, the chart display 336 includes a combination line and bar graph including a first data set 338a displaying the number of uses of the fixture over a predetermined period of time (e.g., a line graph) and a second data set 338b displaying the volume of water discharged by the fixture 14 over the same predetermined period (e.g., a bar graph). In alternative embodiments, different combinations of data sets may be used (not shown) or a plurality of data sets may be available for the user to selectively choose to display on the graph when viewing the chart display 336. In the illustrated embodiment, the user can customize the resulting chart by adjusting the pre-determined time period, such as via a drop-down menu 342.

The maintenance display 340 of the illustrated database portal 324 is configured to display (e.g., in list form), both the upcoming maintenance events 372 and recent past maintenance events 376 corresponding with the selected fixture 14. Both lists include, 1) the date 382 of the main-tenance event, 2) the current status 226 of the maintenance event (described above), and 3) the service type descriptor 236 of the maintenance event (described above). By listing the two sets of data 372, 376 next to each other and on the same display, the user can more easily compare and contrast what has been done to the fixture 14 in the past and what needs to be done to the fixture 14 moving forward. This also allows the user to more easily determine if any maintenance patterns or re-occurring issues may need to be addressed.

During use, the user may select (e.g., click) any one of the individual maintenance events causing the interface 84 to open and display the corresponding maintenance page 222 of the maintenance task for which the entry applies. In the illustrated embodiment, the interface 84 displays the page 222 within the database portal 324.

In some embodiments, the maintenance display 340 may also display a "maintenance score" representative of the timeliness and thoroughness of maintenance being per-formed on the particular fixture 14 (or a group of fixtures). In such embodiments, the score would be increased for instances where the scheduled maintenance tasks are being performed on time, and reduced for late tasks. Furthermore, the score may be increased for a higher percentage of tasks being completed and reduced when greater number of tasks remain unfinished or cancelled. In still other embodiments, the system 10 may correlate a score dropping below a certain threshold with voiding of a factory warranty and the like. In still other embodiments, a specific score may not be dis-played but, rather, the raw information regarding the time-liness and thoroughness of maintenance task completion.

The replacement parts display 344 (see FIG. 9C) of the illustrated database portal 324 is configured to list replace-ment parts associated with the listed fixture 14, and provide one or more links 386 to a point of purchase where the listed parts can be purchased. In some embodiments, the replace-ment parts display 344 will provide a purchase suggestion 390 listing or identifying specific parts or kits dependent upon the type and number of alerts associated with the current fixture 14. For example, if a current alert indicates that a diaphragm has exceed its operational life span and needs to be replaced, the replacement parts display 344 will identify and suggest the proper parts needed to make the necessary repair (e.g., the diaphragm itself, seals, fasteners, etc.) and allow the user to order those parts from the database portal 324. In still other embodiments, the user may select a particular maintenance task whereby the replace-ment parts display 344 will identify or pre-select the items required to complete that task.

FIG. 16 illustrates another embodiment of the replace-ment parts display 2344. The replacement parts display 2344 is substantially similar to the replacement parts display 344 and therefore only the differences will be described herein. The parts display 2344 includes a list 2004 including one or more entries 2008, each of which correspond with a par-ticular item or part associated with the fixture 14. Each entry 2008 includes, 1) a part number and title 2012, 2) a brief description of the part 2016, and 3) an online buying option 2020. If the user selects the online buying option 2020 for a particular entry 2008, the list 2004 will produce a sub-menu 2024 listing the specific stores where the part can be purchased and availability of the part in question.

As shown in FIG. 16, the sub-menu 2024 includes a list of entries 2028, each of which list a particular vendor, retailer, or wholesaler where the part can be purchased. Specifically, each entry 2028 includes 1) the name of the retailer 2032, 2) the description of the part in question 2016, 3) the availability indicator 2036 corresponding to that part and retailer, and 4) a purchase link 2040 configured to direct the user to the relevant point of purchase or part page for the selected retailer. In the illustrated embodiment, the avail-ability indicator 2036 is updated in real-time to indicate to the user whether the part in question can be purchased from a particular retailer. Such connectivity may be provided by the system itself, or through access to third-party servers.

Still further, the system 10 may be configured to operate in conjunction with the replacement parts display 344 to automatically order the parts necessary to complete a sched-uled maintenance task 394. More specifically, when a main-tenance event has been scheduled, the system 10 will automatically purchase the necessary parts with sufficient lead time so that the parts will be delivered to the user on or before the date the repair is scheduled to occur. Still further, in other embodiments, the system 10 may provide inputs 400 where the user can allow the system to suggest or automati-cally order parts for similar maintenance tasks not directly associated with the fixture 14 (e.g., for other fixtures in the same room or floor, for other fixtures having the same maintenance task occurring within a pre-determined number of days, and the like). By grouping like tasks, the user can more efficiently plan for and accommodate particular main-tenance tasks.

In some embodiments, the system 10 is configured so that the parts that were ordered include labels and sufficient information so that the user can identify the exact fixture 14 for which it is intended. The system 10 may also include information on the label or inside the packaging that also identifies the specific maintenance task it is intended to remedy.

Figure 9A:
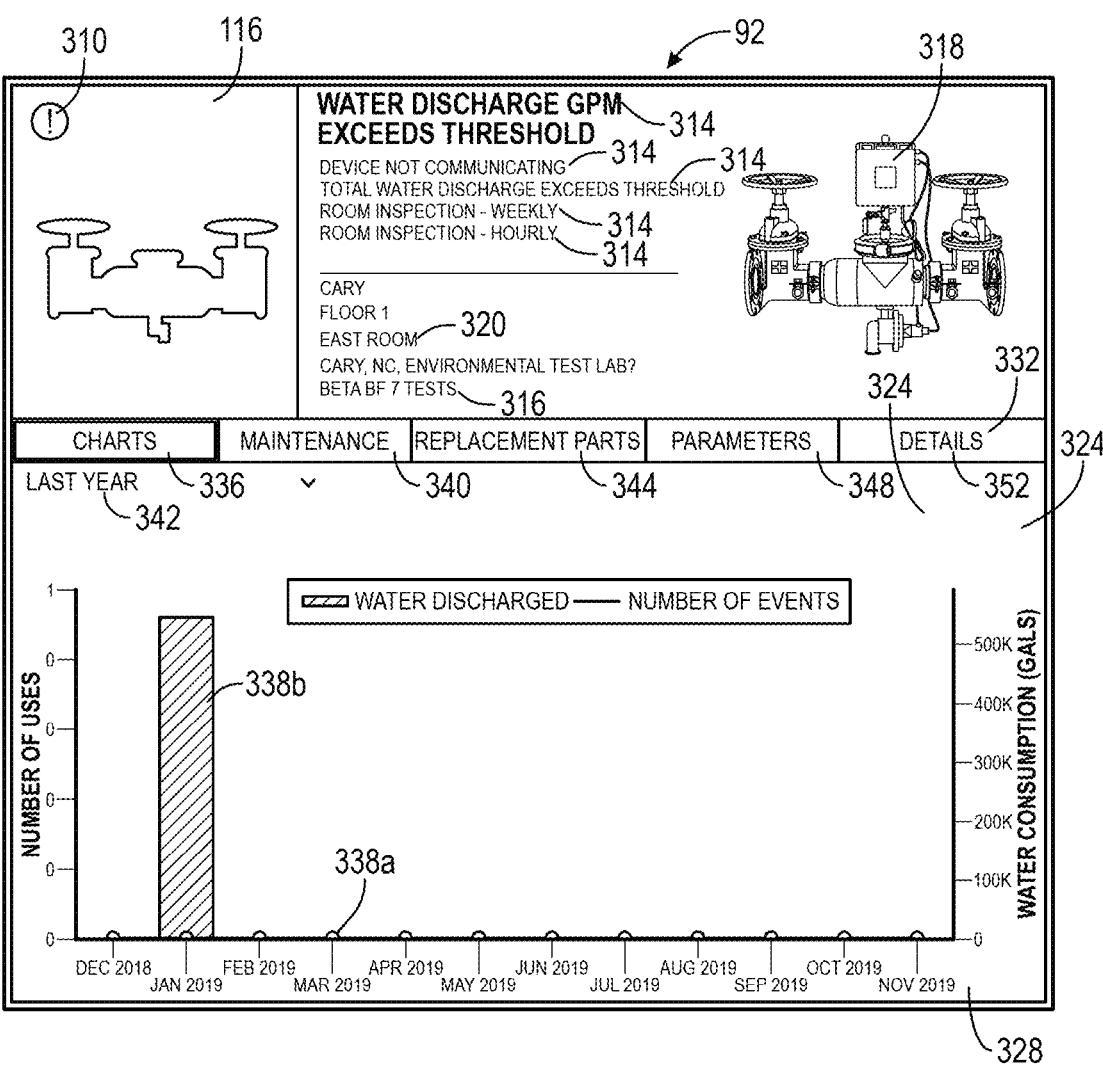
FIGS. 9A-9F illustrate an embodiment of a fixture profile page.
Figure 9B:
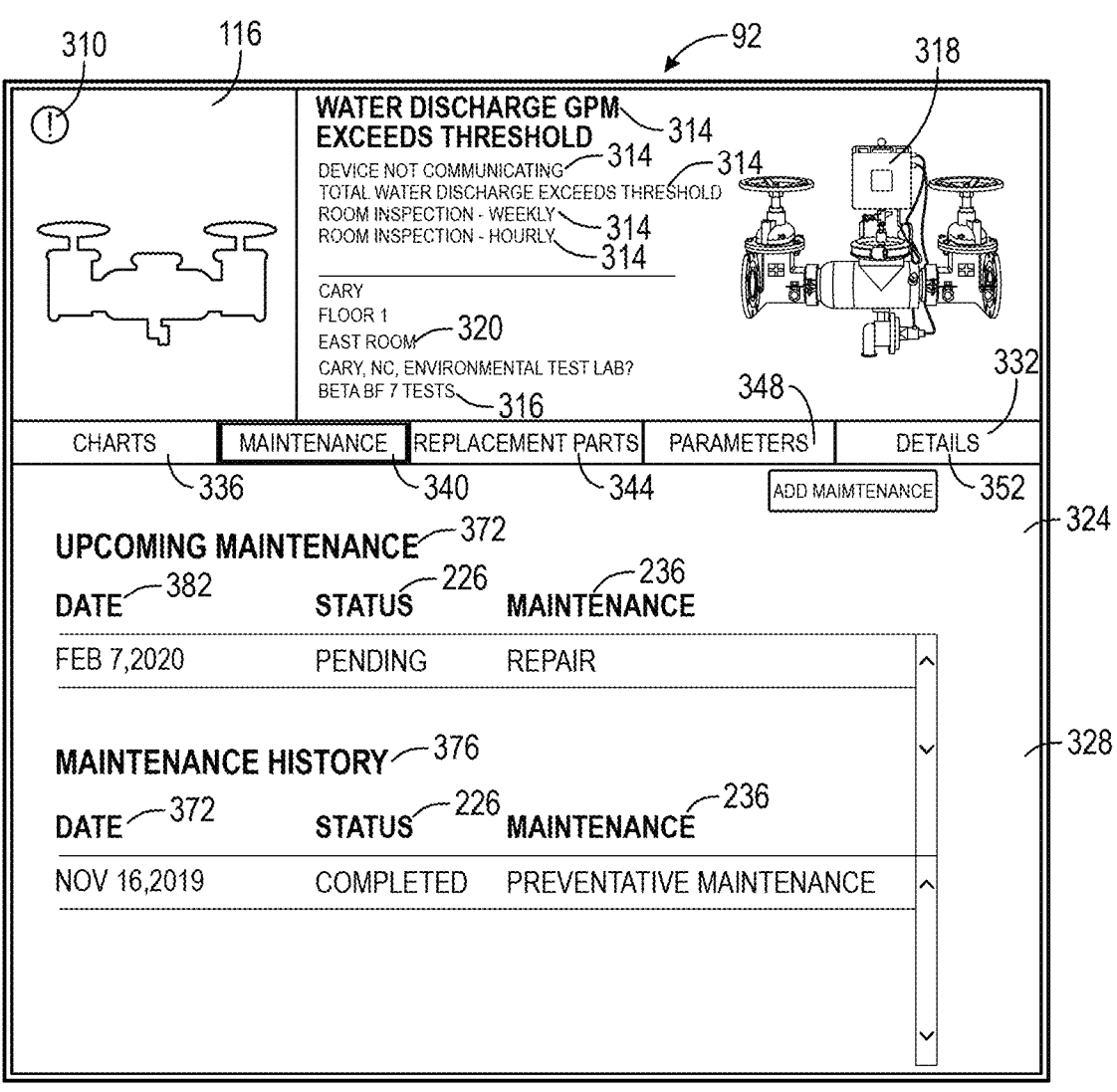
Figure 9C:
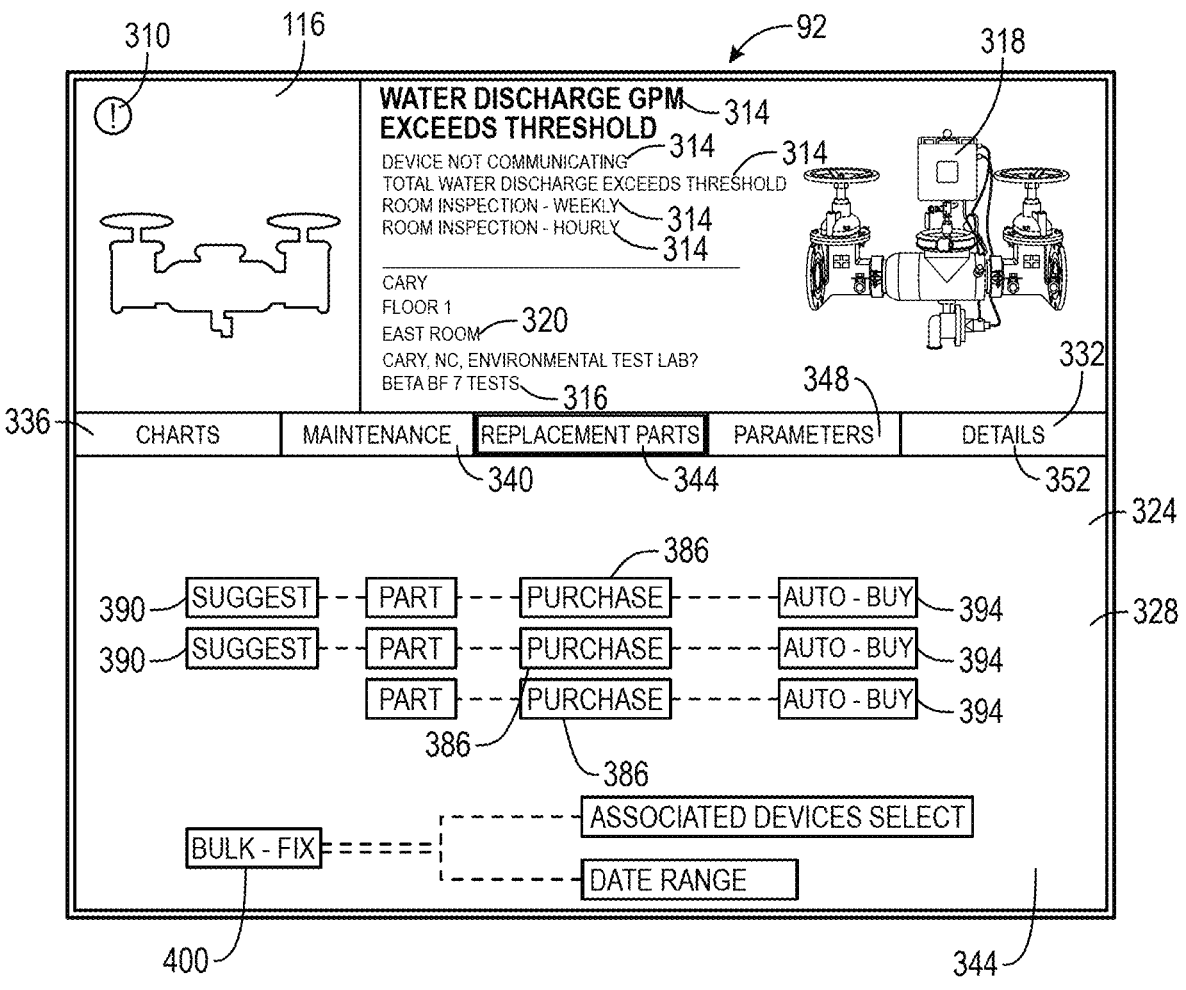
Figure 9D:
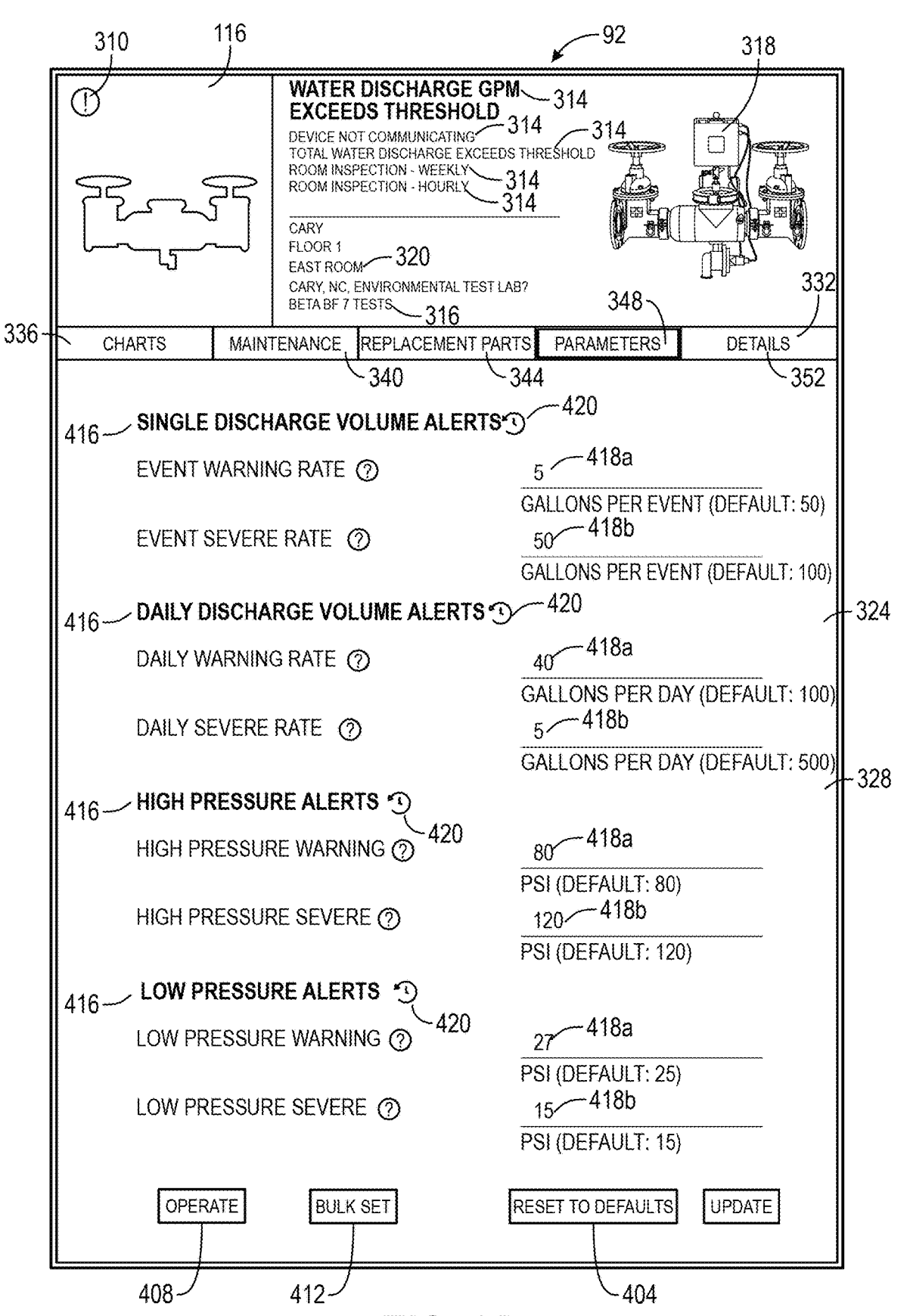

The parameters display 348 of the illustrated database portal 324 includes a series of operational parameters asso-ciated with the fixture 14 (see FIG. 9D). More specifically, the parameters mode 348 grants the user the ability to send signals back to the fixture 14 to alter or modify operating conditions and thresholds. In the illustrated embodiment, the parameters display 348 also includes a "default" setting 404 that allows the user to return the fixture 14 back to the original factory default settings.

As shown in FIG. 9D, the parameters display 348 of the fixture profile 92 includes a series of operational parameters 416 that may be individually set by the user. More specifi-cally, the illustrated embodiment includes 1) a single dis-charge volume alert configured to inform the user when the amount of water flowing backwards through the fixture 14 during a single discharge even is too great, 2) a daily discharge volume alert configured to inform the user when the amount of water flowing backwards through the fixture 14 during a single day is too great, 3) a high pressure alert configured to inform the user when the water pressure within the fixture 14 is too high, and 4) a low pressure alert configured to inform the user when water pressure within the fixture 14 is too low. As shown in FIG. 9D, each operational limitation 416, in turn, includes a "warning" level threshold value 418*a* and a "severe" level threshold value 418*b* configured establish when a Warning and Severe alert is triggered, respectively. In some embodiments, the user may also establish a "shut-down" threshold whereby the system 10 will shut down the fixture 14 and/or related fixtures 14 if the threshold is exceeded.

In some embodiments, the parameters display 348 may also allow the user to set the parameters of how the data from the fixture 14 is collected, processed, and displayed. For example, the user may set the frequency at which data is collected from the fixture 14 (e.g., once an hour, once a day, once a week, and the like). Furthermore, the parameters display 348 may also include interfaces that allow the user to set "trend" thresholds (e.g., how many data points constitute a trend). Still further, the system 10 may be configured such that the user can apply such inputs in bulk to a sub-set of fixtures 14 sharing one or more classifications or other attributes.

Figure 19:
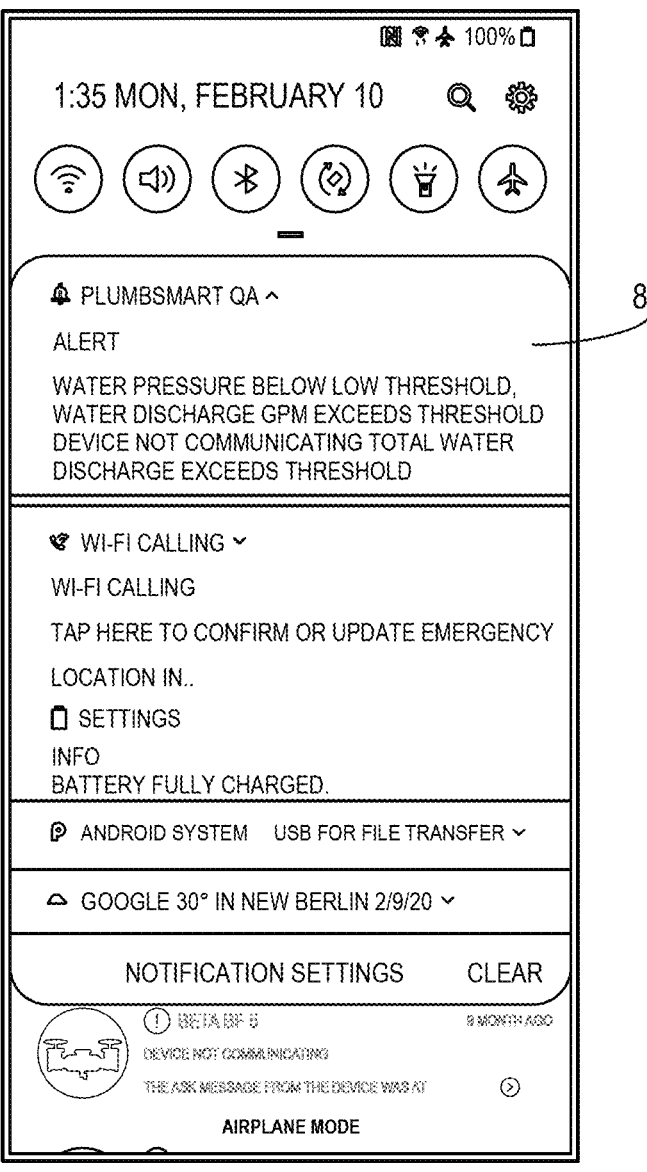
FIG. 19 illustrates a mobile device screen with a push notification thereon.

In still other embodiments, the parameters display may also allow the user to select if, how, and where different alerts are displayed. For example, the user may select what notification styles are applicable for a particular alert (e.g., displayed within the interface 84, displayed on the dashboard 88a, sent out as a text message, sent out as a push alert, and the like). In such embodiments, the user may individually select what, if any, notification styles apply to each severity level, or even to each individual alert type. For example, the user may indicate that both Warning and Severe level "single discharge alerts" should be displayed on the interface 84 generally, on the dashboard 88a apps, and in push notifications but not sent out as a text message. A sample push notification 86 is shown in FIG. 19.

Alternatively, the user may also select that Warning level alerts—as a whole—should not be displayed anywhere but the fixture profile 92. Still further, the user may apply such notification parameters, in bulk, to multiple fixtures 14 sharing one or more parameters. For example, the user may indicate that all Warning level alerts for fixtures 14 located in a particular room should not be displayed. In still other embodiments, the user may select the time at which notifications can be sent (e.g., during business hours). In still other embodiments, the user may set that alerts for a specific fixture or maintenance task will no longer be set once the necessary maintenance activities have been scheduled (e.g., halt alert sending after the necessary maintenance crew has been called and a repair date finalized).

The parameters display 348 also includes the ability to actuate or operate the corresponding fixture 14 remotely. More specifically, the parameters display 348 may include one or more inputs 408 that can be utilized by the user to send signals back to the fixture 14 and operate the fixture 14 from a remote location. Such capabilities may include, but are not limited to, opening and closing valves, changing operating water temperatures, starting tests, and the like. In some embodiments, the parameters display 348 may have a separate "control" page having a number of user inputs relating to individual operational aspects of the fixture 14 and one or more pre-set operating procedures. The system 10 may also include some form of "diagnostics" procedure whereby the fixture 14 will exercise the various elements contained therein to confirm everything is working as desired.

For example, the display 348 for a faucet fixture 14 may include a first user input relating to the opening and closing of the valve and a second user input relating to the temperature of the water being discharged. Furthermore, the faucet may include a "discharge" procedure whereby the system 10 will automatically open the valve for a predetermined period of time at a predetermined temperature. Furthermore, the display 348 for a flush valve fixture 14 may include an individual input regarding the opening and closing of the valve or a test procedure that instructs the fixture 14 to undergo an entire flush cycle. With regards to a backflow preventer fixture 14, the display 348 may include individual inputs for each of the check valves and procedure inputs to test the fixture, test for leaks, and the like.

Still further, both individual and procedural inputs may be pre-scheduled and re-occurring such that the system 10 will automatically, and without direct prompting from the user, execute the scheduled tasks. For example, the user may schedule that a faucet will run for a pre-determined period of time every night. In still other embodiments, remote operations may be pre-set to occur when one or more operational parameters are met. For example, the fixture 14 may be operated when the water reaches a certain temperature, has gone a pre-determined period of time since it was last used, and the like. As another example, one or more tasks may be stored in the system 10 with a time stamp associated therewith. In such embodiments, the system 10 may be configured to send the necessary task instructions to the fixture (e.g., via the end point) at the time indicated by the time stamp.

When operating the fixture 14 remotely, it is understood that the system 10 may include one or more safety parameters built in to limit how and when the fixture 14 may be controlled from afar. For example, the system 10 may be configured to limit or lockout the ability of a fixture 14 to be remotely activated when a user is detected in close proximity thereof. Still further, the system 10 may be configured to re-schedule or delay pre-programed processes in instances where a user or some other lockout condition is detected.

In a default setting, the values entered in the parameters display 348 are only apply to the corresponding fixture 14. However, the illustrated embodiment also includes one or more user inputs 412 to bulk-apply the entered settings to a plurality of fixtures 14 sharing one or more classifications with the single fixture 14. For example, the user may bulk-change one or more operating parameters 416 on multiple fixtures 14 simultaneously based at least in part on, common location characteristics, usage history, building classification, room classification, installation date, geographic region, and the like.

The illustrated parameters display 348 also includes alert pop-ups 420 configured to display the history of that particular parameter. For example, selecting the alert pop-up 420 associated with the single discharge volume alerts (see FIG. 9D) causes a pop-up to appear showing each date that the Severe and/or Warning alert levels have been changed in addition to the values associated with those changes. By doing so, the user is able to more easily track any changes or modifications to the operating parameters of each individual fixture 14.

Figure 9E:
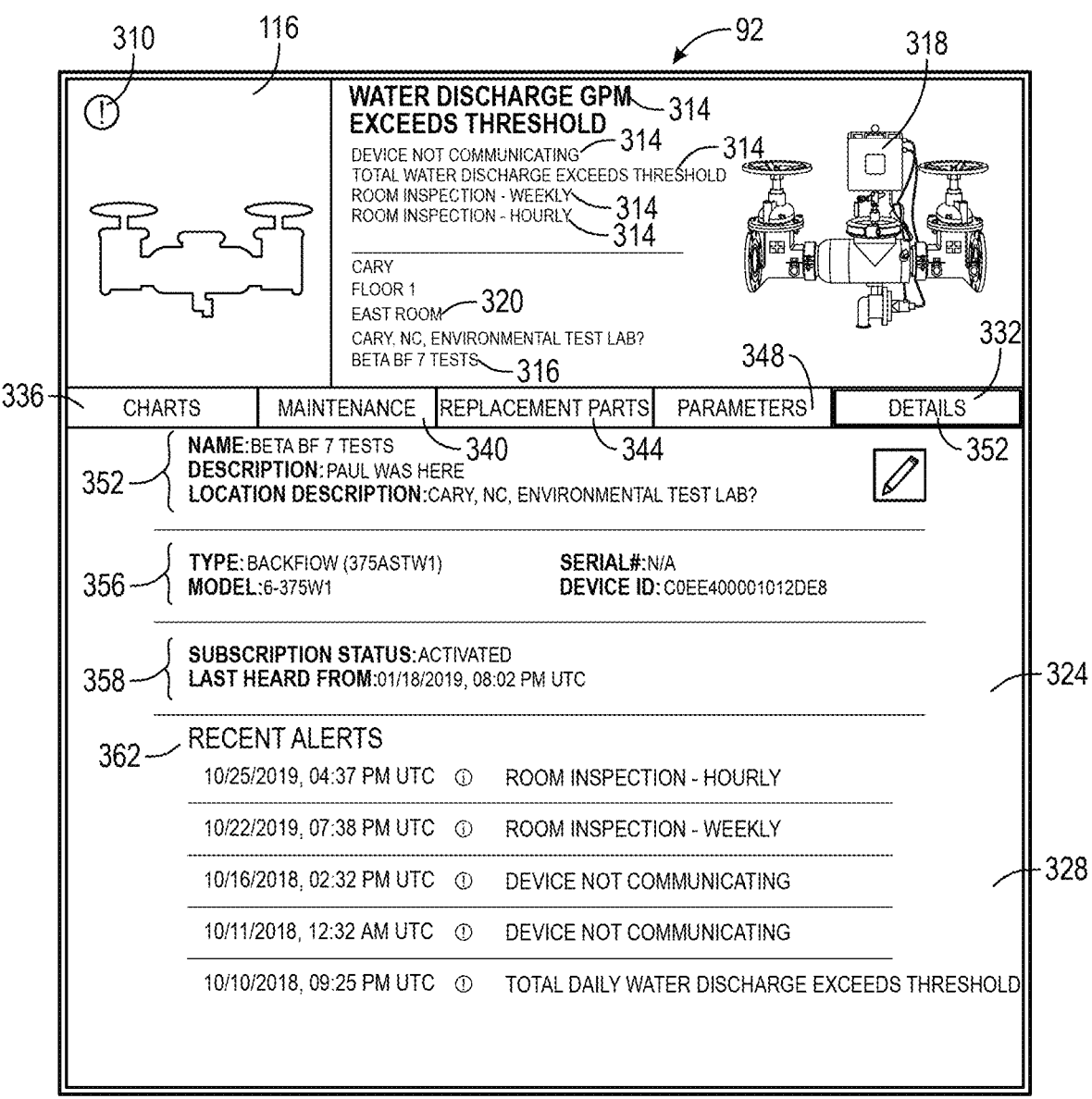

As shown in FIG. 9E, the details display 352 of the illustrated database portal 324 includes a listing of various types of information relevant to the associated fixture 14. For example, the details display 352 may include product information 354 such as, but not limited to, the name of the fixture, a short description of the fixture entered by the user, and the specific location and installation details of the fixture 14 (see FIG. 9E). The details display 352 may also list relevant model information 356 such as, but not limited to, the type, model, serial number, and fixture ID. Still further, the details mode 352 may list system 10 communication data 358 such as, but not limited to, the last time information was exchanged between the fixture 14 and the system 10, and the subscription status.

The illustrated details display 352 is also configured to display a list 362 of recent alerts that applied to the fixture 14. More specifically, the details display 352 lists the time stamp, severity level, and title of each recent alert. The list 362 also includes listings confirming when specific alerts have been remedied or cleared (see FIG. 10E).

An alert may be cleared in the system 10 both manually and automatically. In instances where the alert is attributable to one or more operating parameters being monitored by the system 10 (e.g., water pressure, valve position, water temperature, and the like), the alert may be automatically cleared when the relevant attribute returns to the acceptable operation envelope. In other instances, such as those where the system 10 does not monitor the relevant parameters (e.g., such as cleaning the fixture), the user may manually indicate that the task has been complete and the alert cleared. For example, the user may select an input in the fixture profile 92 indicating the task is complete. In other embodiments, the user may press or activate a button on the fixture 14 itself, whereby the processor 72 will communicate to the system 10 that the task is complete and alert cleared. In still other embodiments, the user may scan a bar-code located on the fixture 14 and the like.

While the illustrated display 352 is configured to allow the user to enter and/or modify the entered data manually; in the illustrated embodiment, some data points may be filled-in automatically by the system 10. More specifically, the system 10 is configured such that when a fixture ID or other identification information is entered therein, the system 10 will automatically reference a pre-set collection of data (e.g., from a third-party server or the system 10 itself) corresponding with the entered fixture to allow various aspects of the profile to be entered in automatically. Such data may include, but is not limited to, product information 354, model information 356 and the like. The data may also correspond with default operational parameters (see parameters display 348). In still other embodiments, the data may be automatically input based on the scanning of a QR code and the like.

Figure 9F:
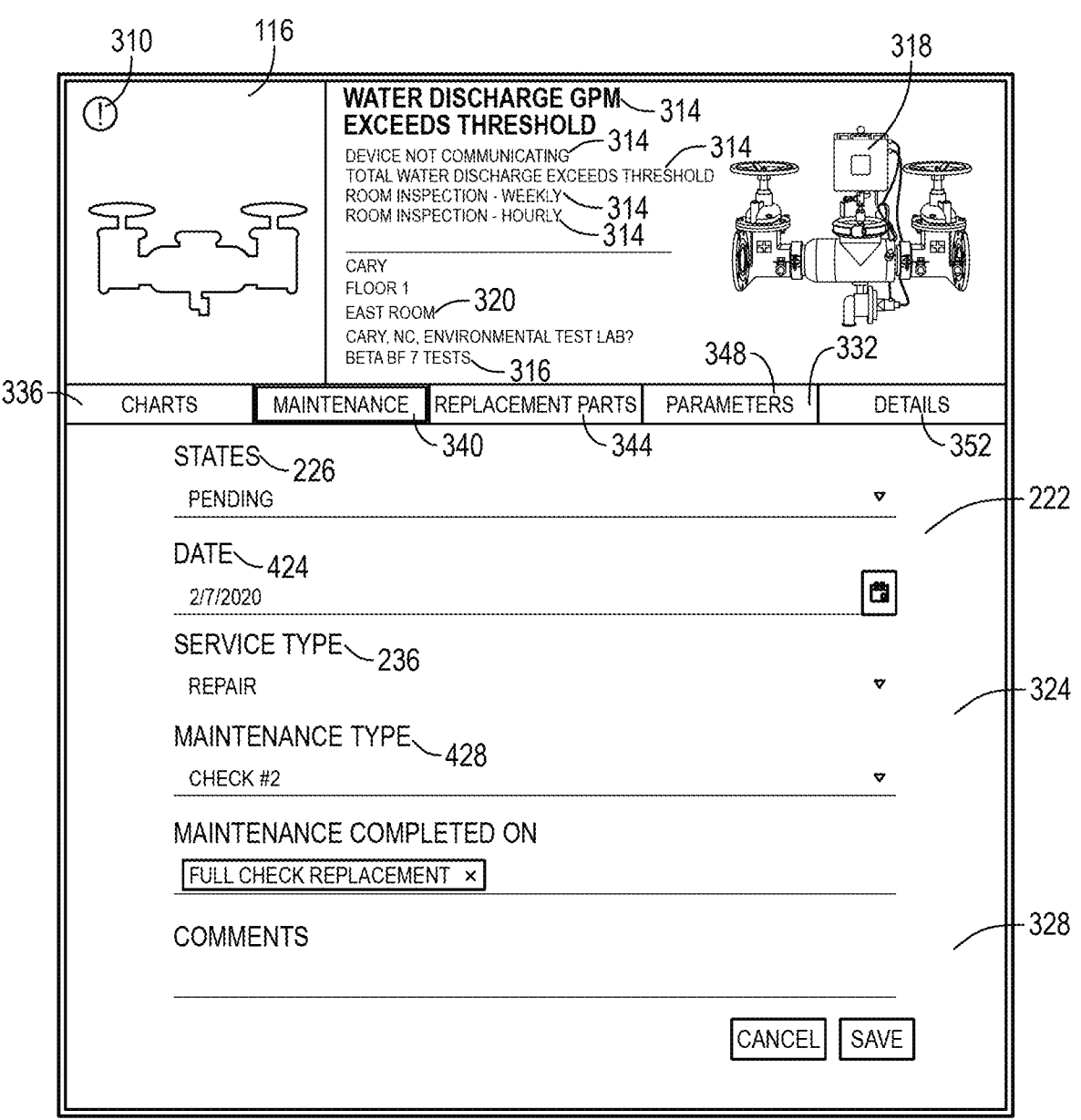
Figure 10A:
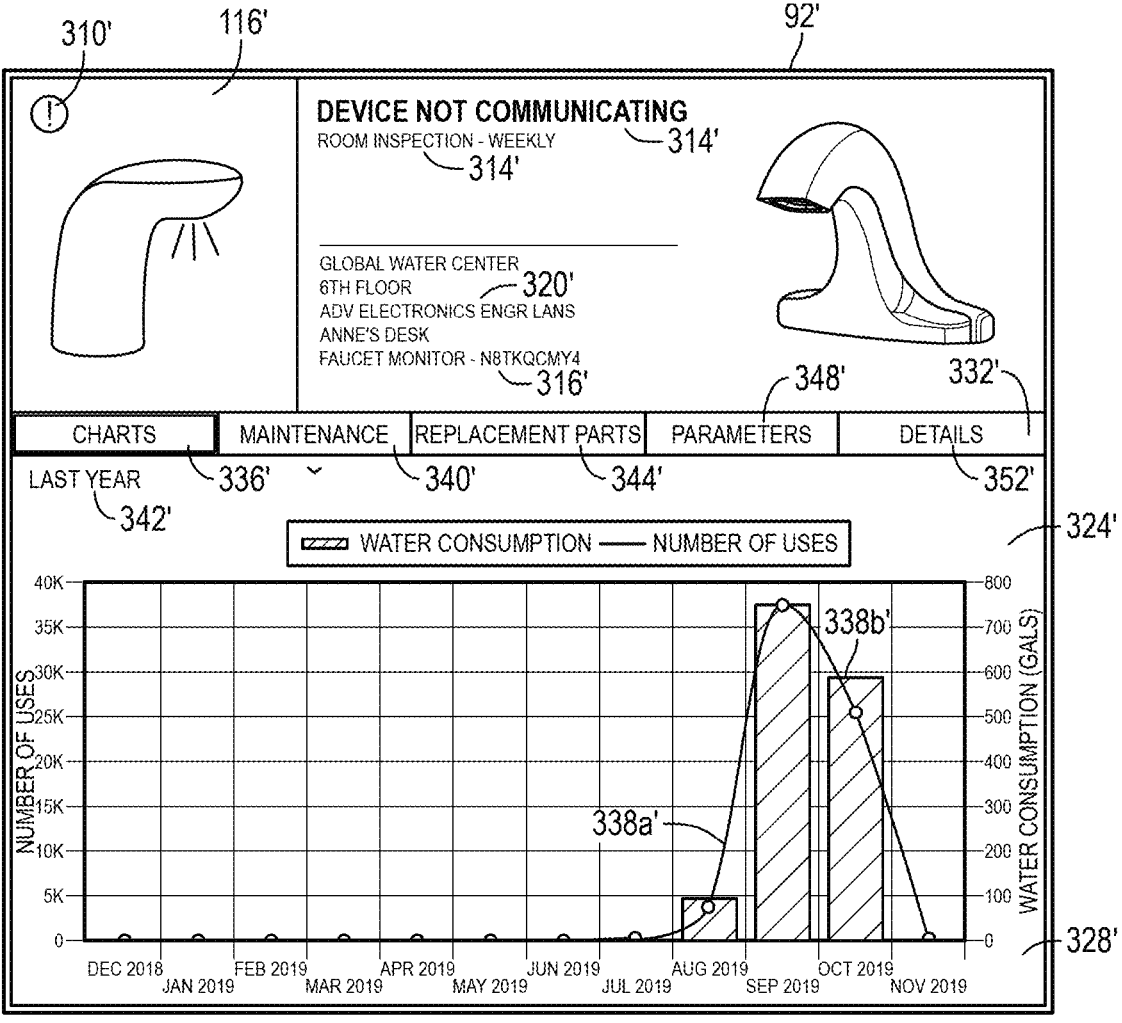
Figure 10B:
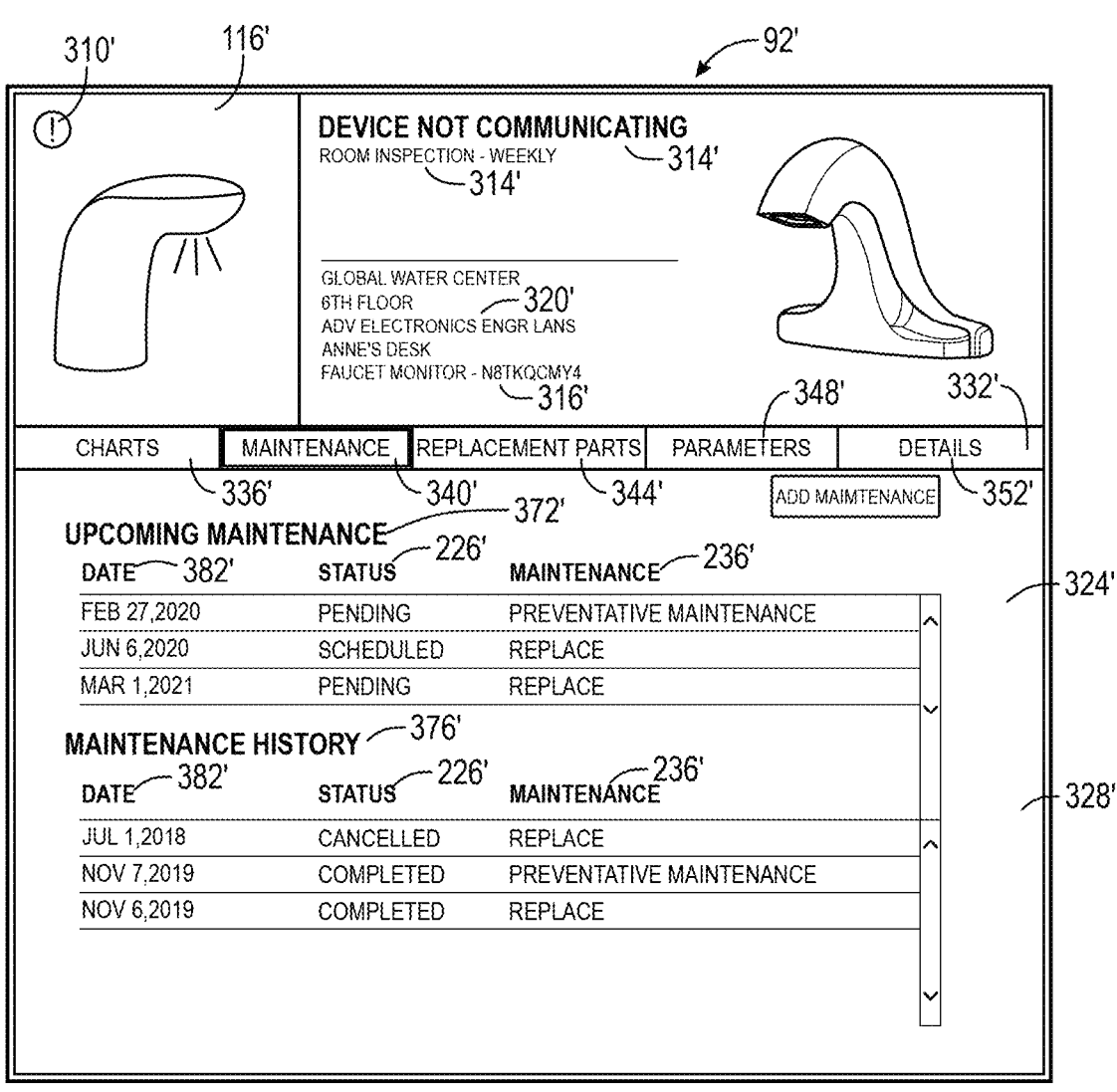
Figure 10C:
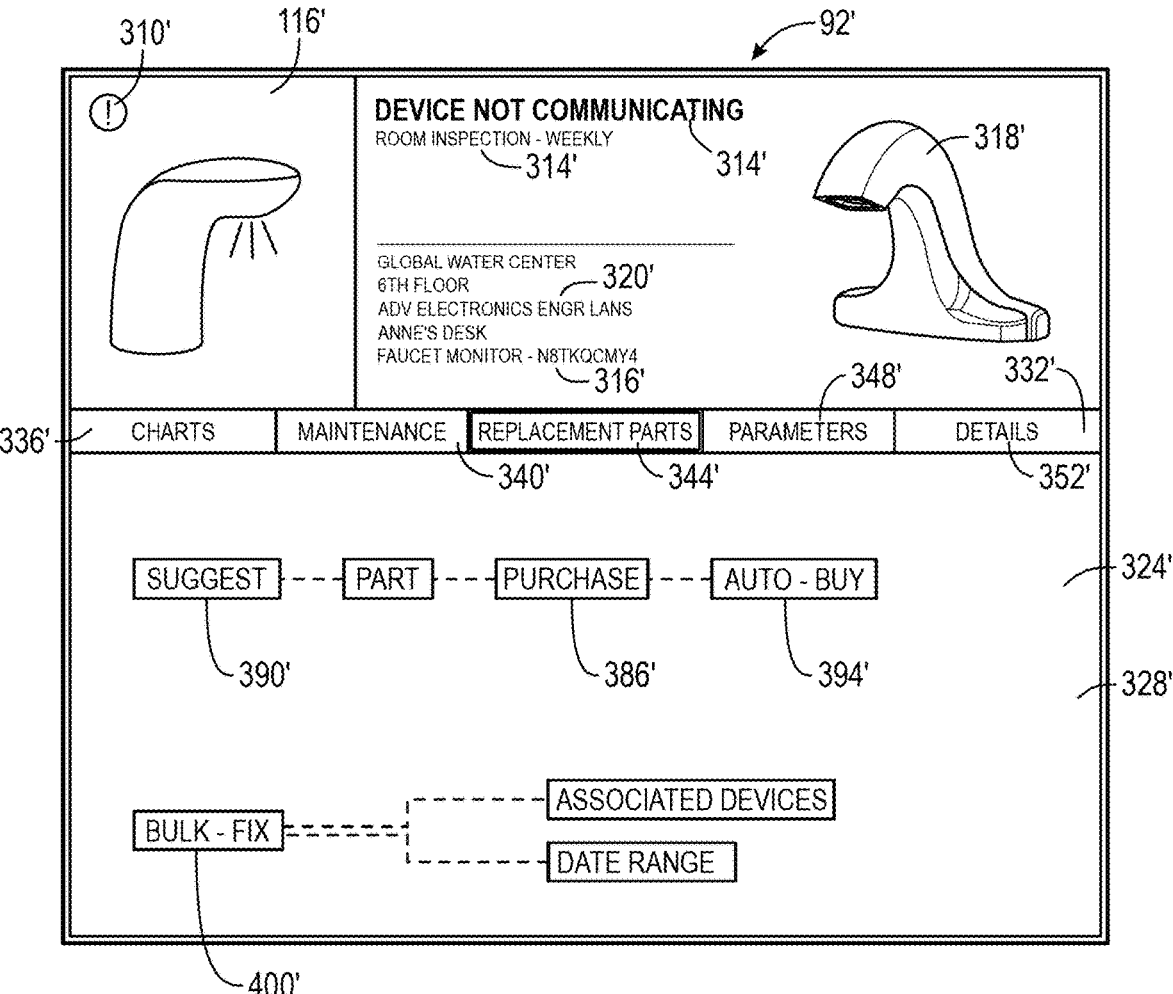
Figure 10E:
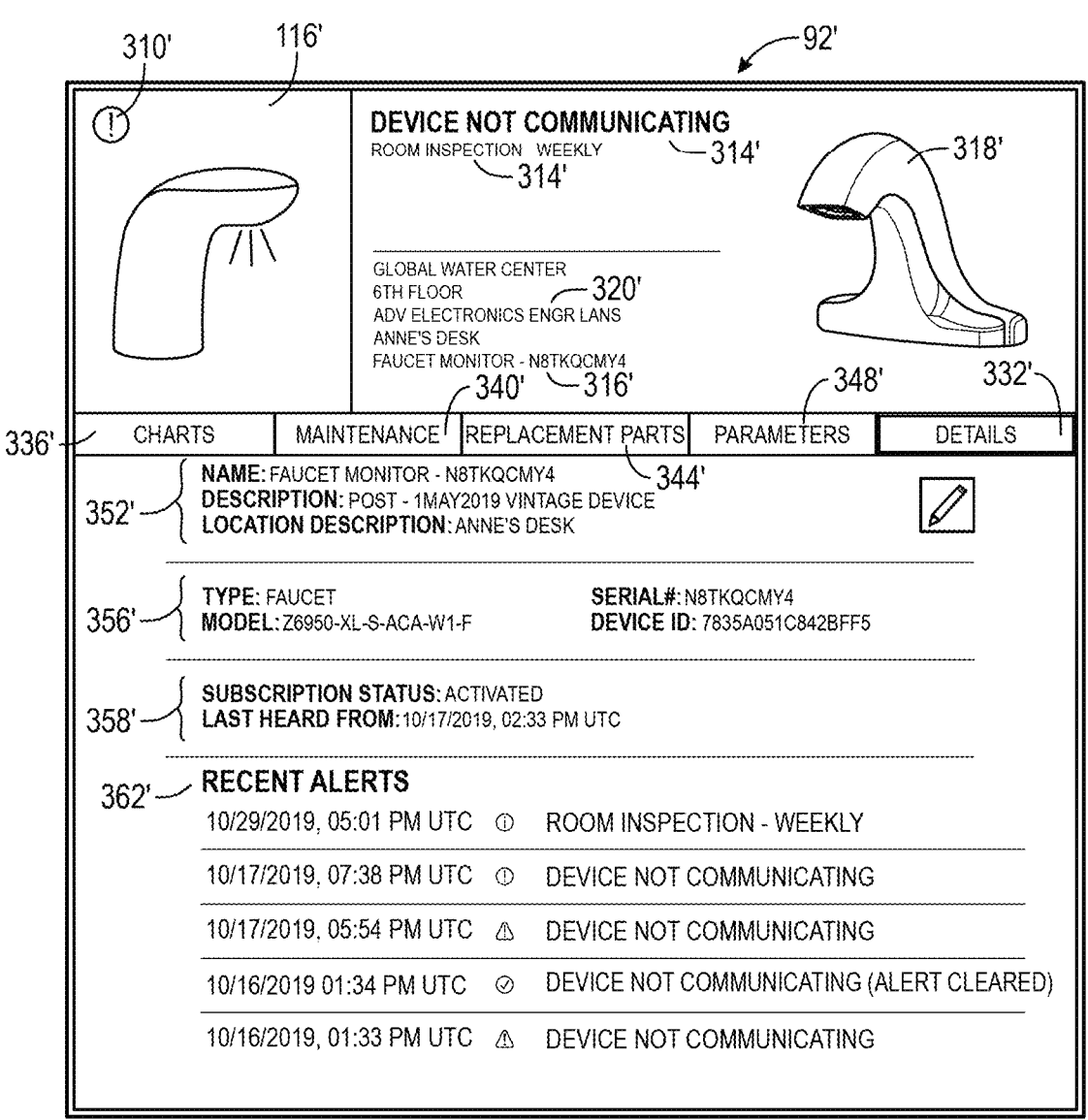

As shown in FIG. 9F, the database portal 324 also includes a maintenance task page 222. The maintenance task page 222 is configured to serve as the primary information repository of one corresponding maintenance task. More specifically, the page 222 provides easy and thorough access to various data sets corresponding with the relevant maintenance task such as, 1) the status 226 of the task (described above), 2) the date 424 the task is scheduled to be performed, 3) the service type descriptor 236 of the task (described above), and 4) the maintenance type 428 of the task. The maintenance task page 222 also includes a field to allow the user to add comments or notes regarding the task.

To note, the maintenance tasks within the system 10 may be both auto-generated and manually entered. Specifically, the system 10 may auto-generate one or more maintenance tasks based on data collected from the fixtures 14. For example, the system 10 may rely on usage data, and wear models to auto-generate various preventative maintenance tasks. Furthermore, the system 10 may generate a repair or replace tasks in instances where data indicates the fixture 14 is already damaged. Still further, maintenance tasks may be auto-generated based at least in part on legal or system requirements-such as for testing and re-calibrations.

In the illustrated embodiment, the date 424 of the maintenance task generally corresponding with the date on which the scheduled task is intended to occur. However, in alternative embodiments, each maintenance task may include both a default date, generally corresponding to the initial date on which the maintenance task was intended to occur based on factory or default settings, and a modified or actual date, generally corresponding to the date the task is actually scheduled to occur after having been adjusted from the default date based on one or more factors. When determining a modified date, the system 10 may rely upon, among other things, the historical usage of the fixture, wear forecasts from machine learning based upon the historical usage of the fixture, manual adjustments input by the user, the maintenance schedule of other fixtures 14 having similar characteristics (e.g., in a similar location, having a similar issue, having similar classifications), business schedule and usage seasons (e.g., busy season v. off-season), environmental impact, budgetary schedules, time ranges where maintenance personnel are available, and the like.

For example, the system 10 may extend a task (e.g., increase the length of time before it is scheduled to occur) if data collected from the corresponding fixture 14 or related fixtures 14 illustrates that the maintenance task was being undertaken before the relevant parts were even worn. In contrast, the system 10 may shorten a task (e.g., decrease the length of time before it is scheduled to occur) if data provided by the fixture 14 or related fixtures 14 indicate that the required parts were breaking or becoming damaged at an increased rate.

Furthermore, the system 10 may be configured to "bunch" or adjust related maintenance tasks together so that they all occur on or near the same date. For example, the system 10 may bunch a plurality of common maintenance tasks together if each of the corresponding fixtures 14 are located in the same room or building to avoid excess closures or shutdowns.

The maintenance type 428 is a drop-down list of common replacement items within a particular classification of fixture 14. During use, the user manually or the system 10 automatically selects the appropriate item from the list to indicate the type of work that is to be done to the fixture 14. In some embodiments, the maintenance type 428 includes a series of pre-determined maintenance tasks and instructions allowing the user to more quickly and efficiently repair the desired part. For example, selecting a particular item from the maintenance type list causes the system 10 to provide a list of necessary parts or tools to complete the task. In still other embodiments, the maintenance type 428 may also be used for record keeping to determine if a particular element within a product is susceptible to failure.

FIGS. 10A-10E illustrate another embodiment of the fixture profile 92'. The fixture profile 92' is configured for use with a faucet style fixture 14. The fixture profile 92' is substantially similar to the fixture profile 92 of FIGS. 9A-9F such that similar elements will use the same reference number with the addition of a prime symbol ('). As such, only the difference will be discussed herein.

As shown in FIG. 10D, the parameters display 348' of the fixture profile 92' includes a series of operational parameters 416' that may be individually set by the user. More specifically, the illustrated embodiment includes 1) an aerator flow rate to establish the rate at which water flows through the aerator of the faucet, 2) the solenoid replacement rate configured to inform the user when the solenoid is ready for replacement based on a number of actuations, 3) an hourly usage limit configured to inform the user when the faucet has exceeded a set number of actuations in one hour, and 4) a daily usage limit configured to inform the user when the faucet has exceeded a set number of actuations in one day. As shown in FIG. 10D, each operational limitation 416', in turn, includes a "warning" level threshold value 418a' and a "severe" level threshold value 418*b*' configured establish when a Warning and Severe alert is triggered, respectively.

The parameters display 348' also includes the ability to actuate or operate the corresponding fixture 14 remotely. More specifically, the parameters display 348' may include one or more inputs 408' that can be utilized by the user to send signals back to the fixture 14 and operate the fixture 14. Such capabilities may include, but are not limited to, actuating the valve (e.g., opening and closing the faucet), changing the temperature at which water flows through the faucet, changing the rate at which water flows through the faucet, and the like.

FIGS. 11A-11F illustrate another embodiment of the fixture profile 92". The fixture profile 92" is configured for use with a flush style fixture 14. The fixture profile 92" is substantially similar to the fixture profile 92 of FIGS. 9A-9F and as such all of the same elements will use the same reference numbers with an added double prime ("). Only the difference will be discussed herein.

Figure 11A:
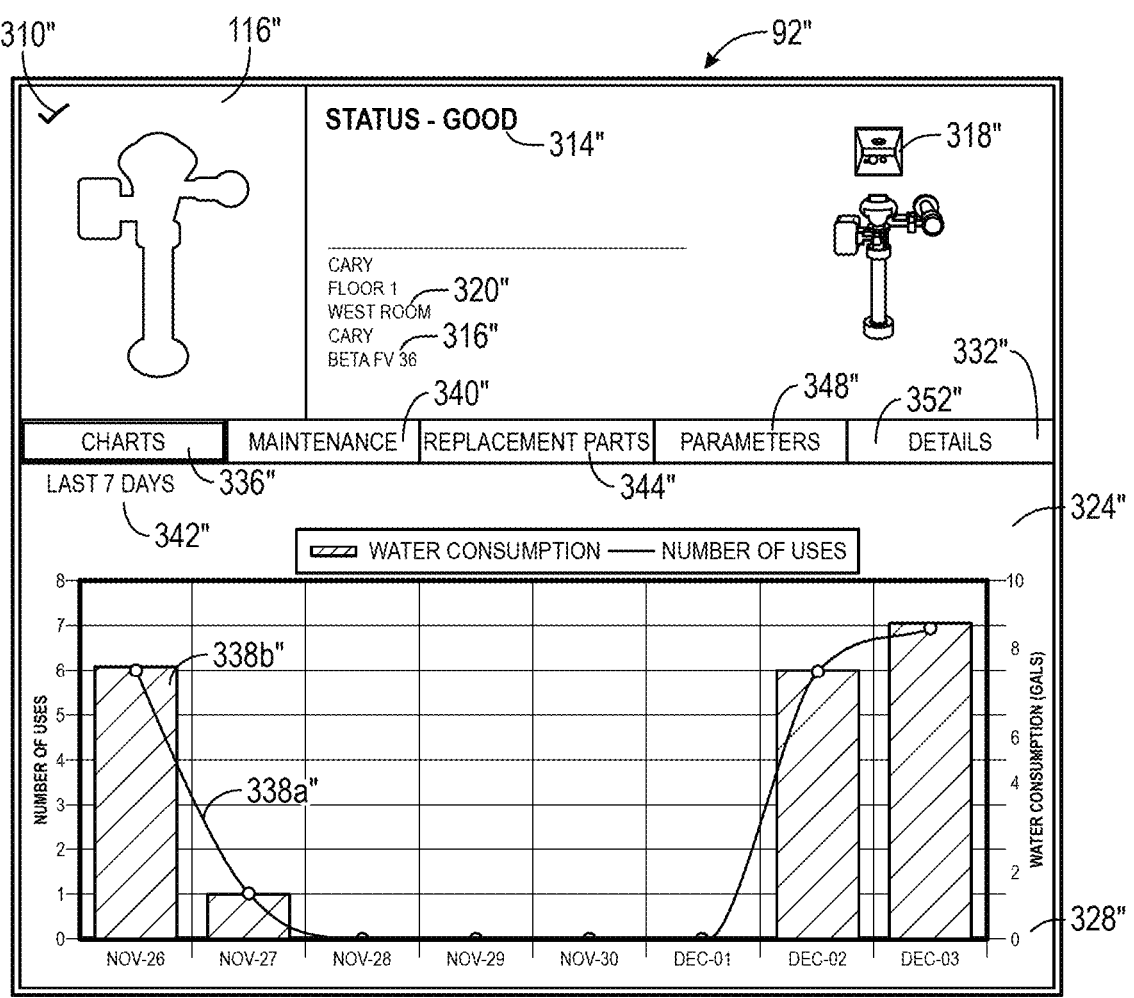
FIGS. 11A-11F illustrate another embodiment of a fixture profile page.
Figure 11B:
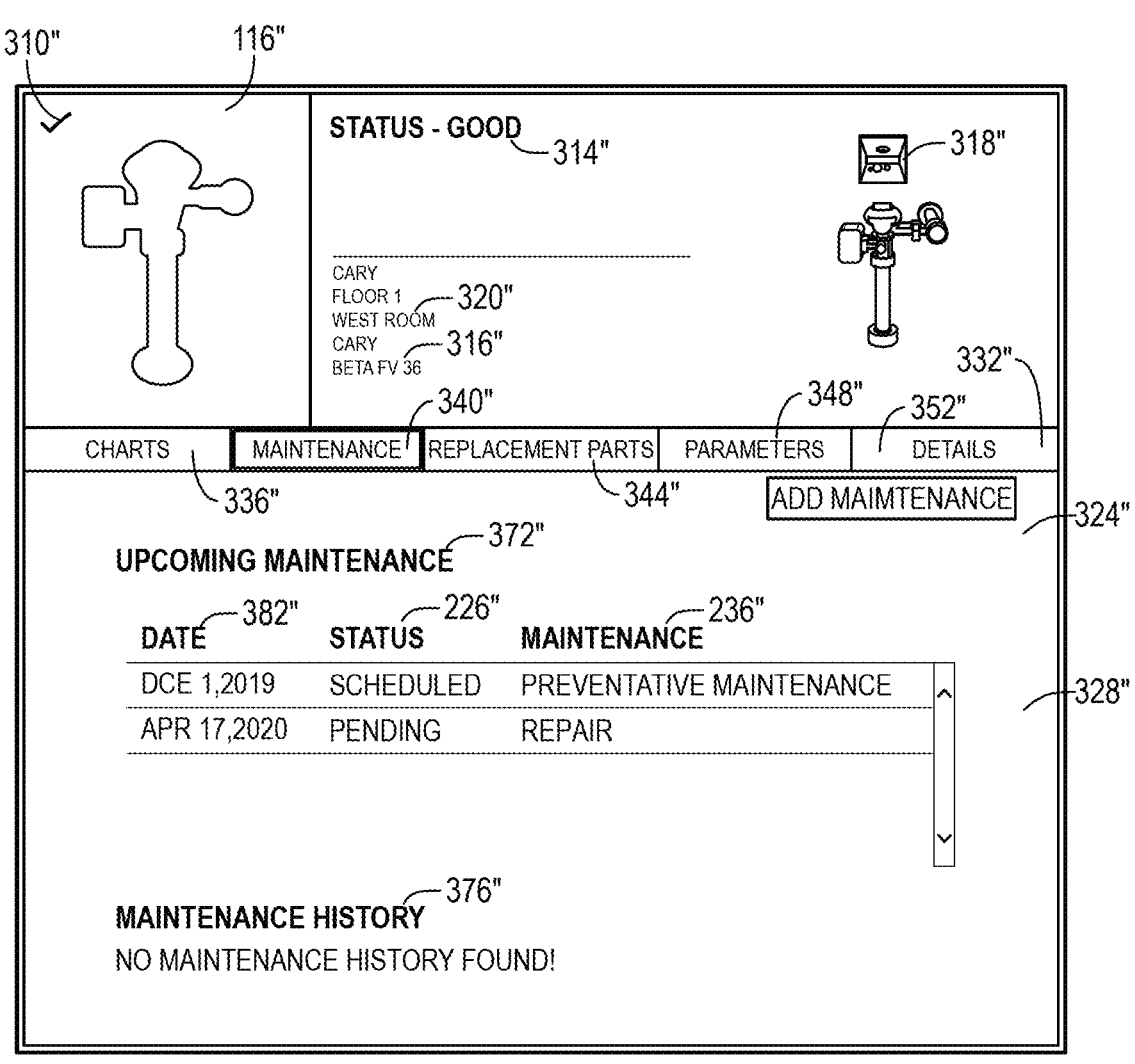
Figure 11C:
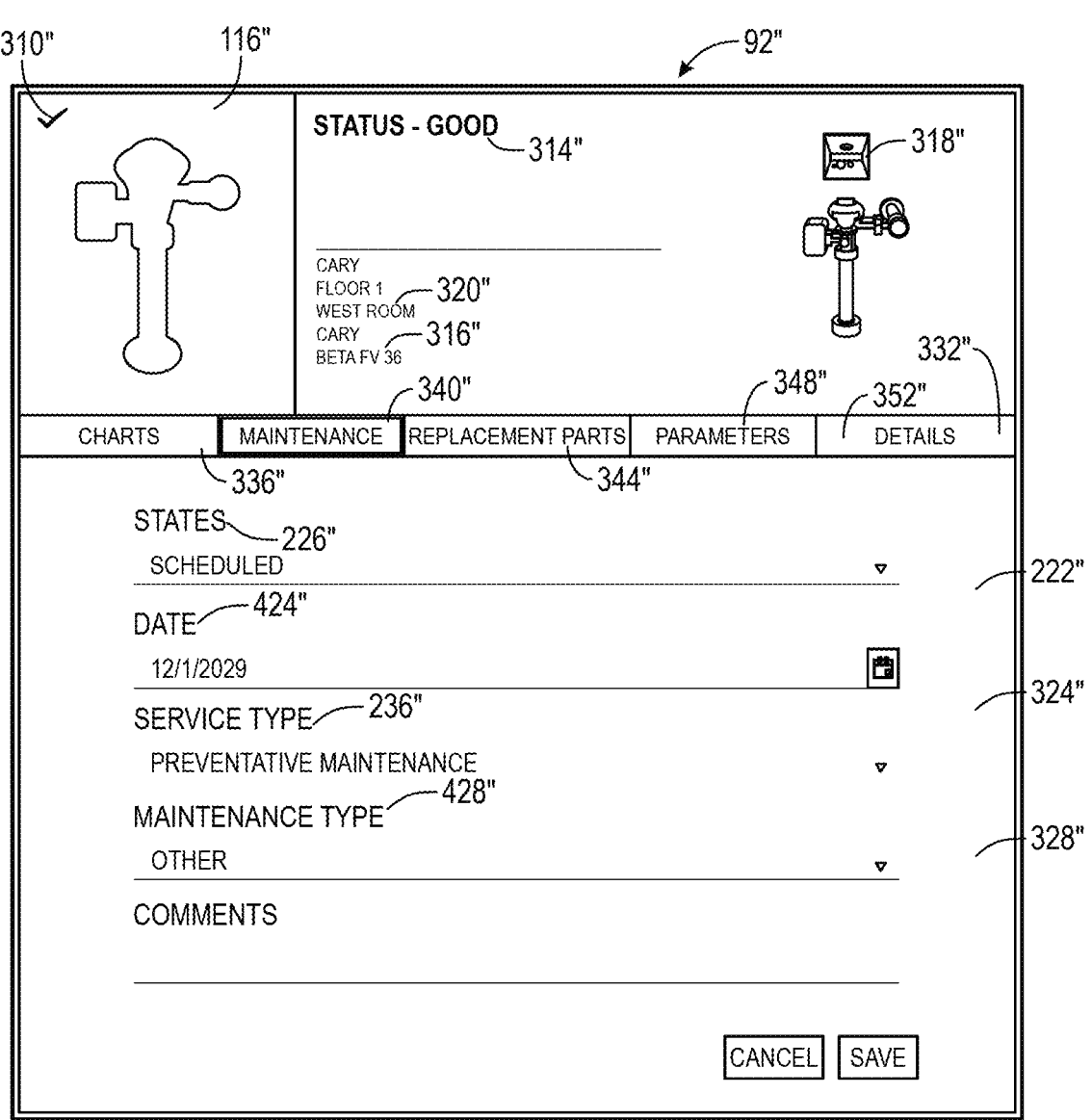
Figure 11D:
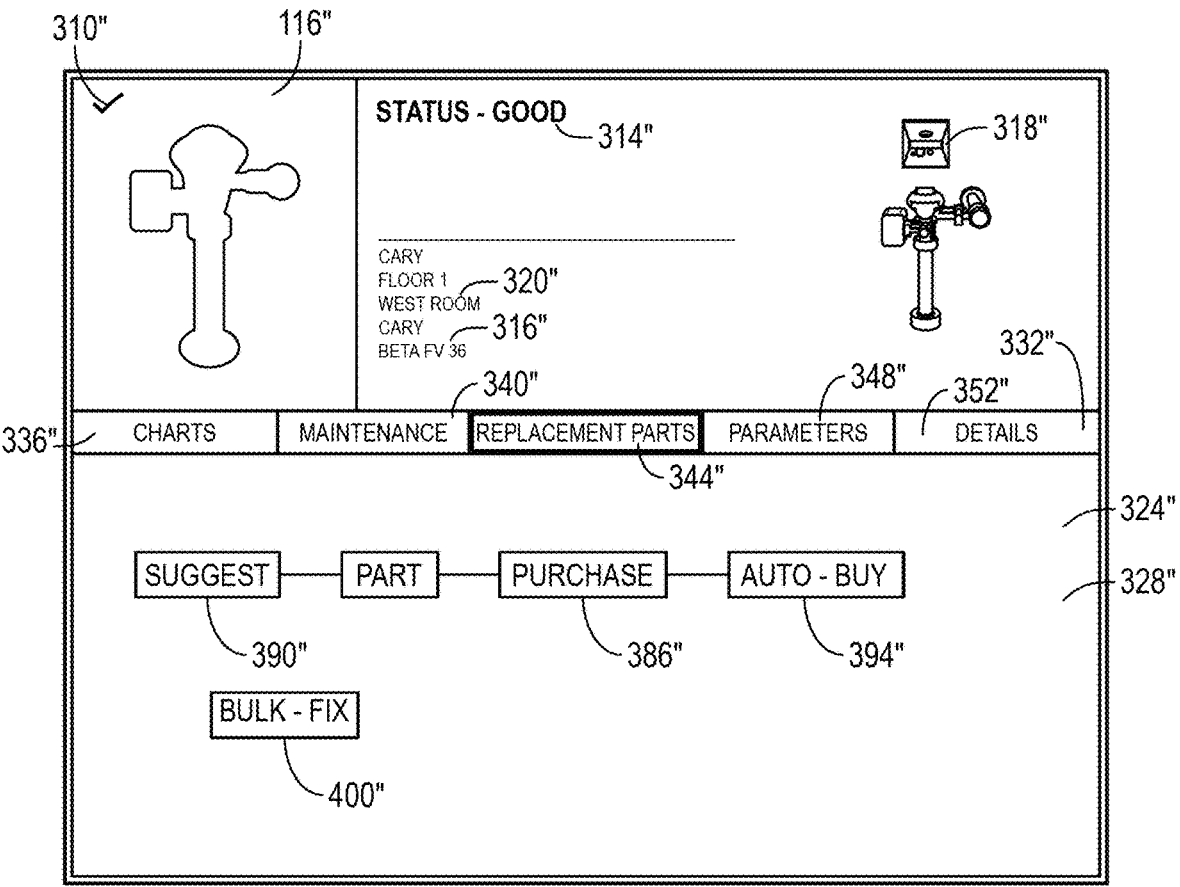
Figure 11E:
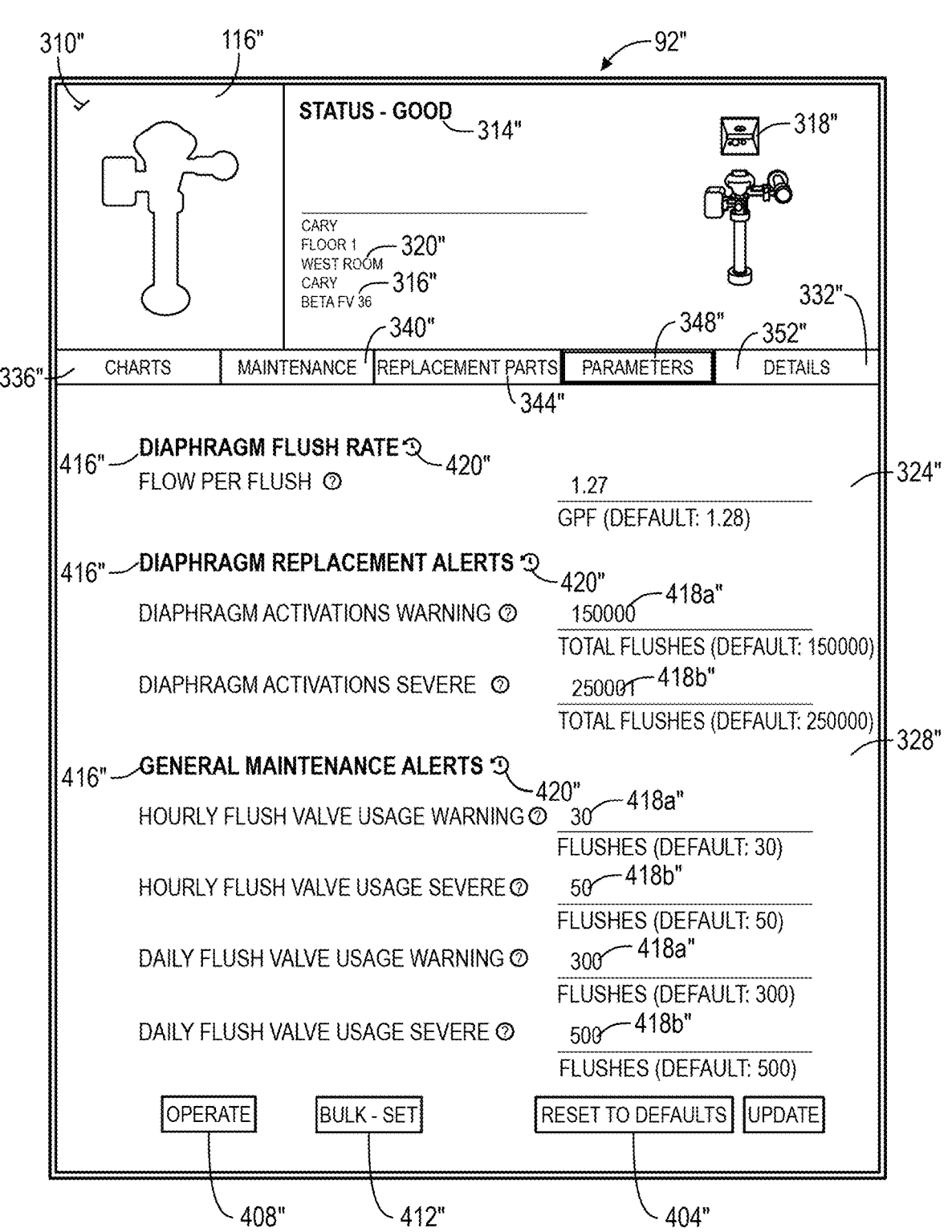
Figure 11F:
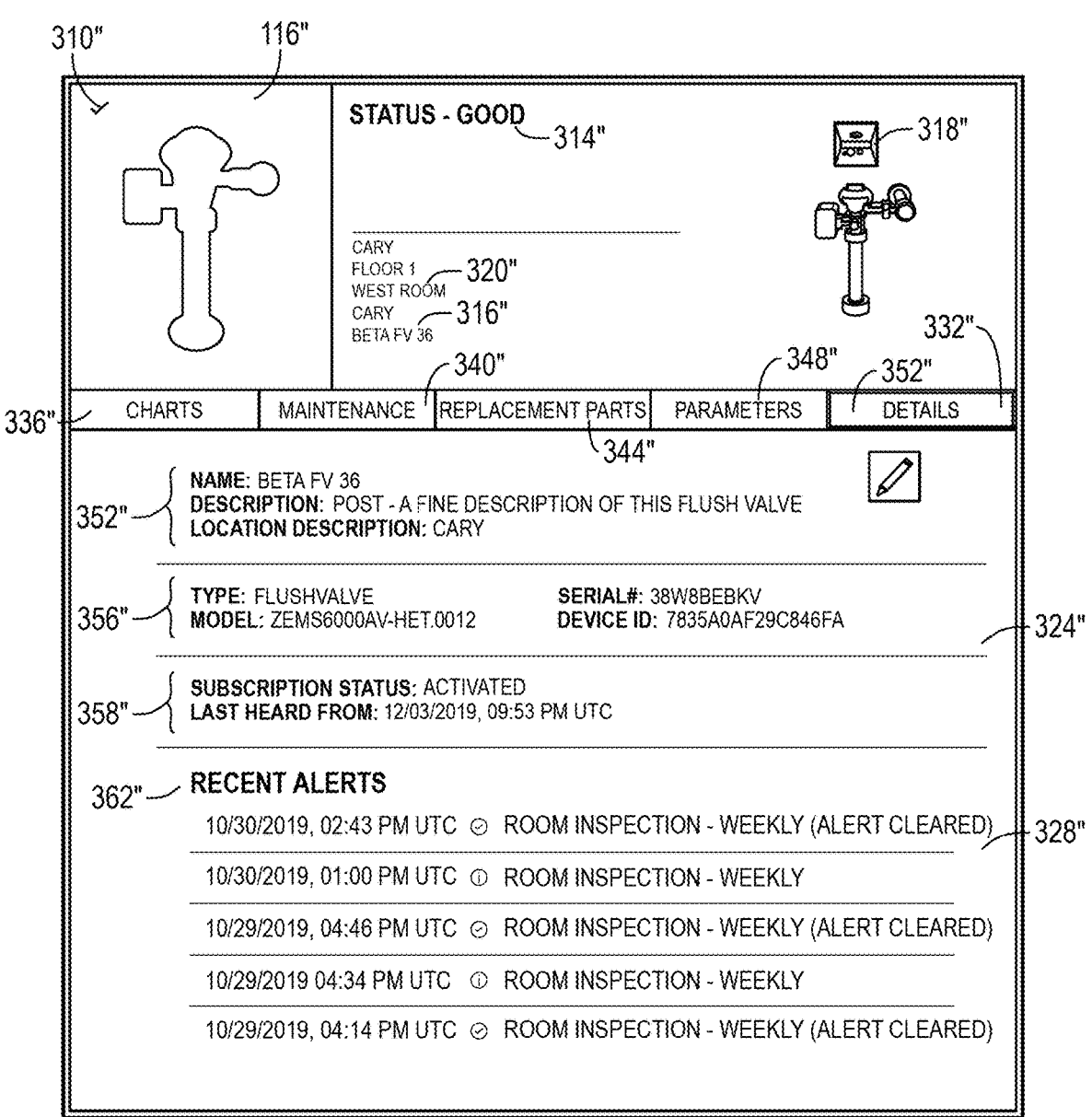

As shown in FIG. 11E, the parameters display 348" of the fixture profile 92" includes a series of operational parameters 416" that may be individually set by the user. More specifically, the illustrated embodiment includes 1) a flow per flush configured to set the amount of water that flows through the valve for each flush actuation, 2) a diaphragm replacement rate configured to inform the user when the diaphragm is ready for replacement based on a set number of actuations, 3) an hourly usage limit configured to inform the user when the flush valve has exceeded a set number of actuations in one hour, and 4) a daily usage limit configured to inform the user when the flush valve has exceeded a set number of actuations in one day. As shown in FIG. 11E, each operational limitation 416", in turn, includes a "warning" level threshold value 418*a*" and a "severe" level threshold value 418*b*" configured to establish when a Warning and Severe alert is triggered, respectively.

The parameters display 348" also includes the ability to actuate or operate the corresponding fixture 14 remotely. More specifically, the parameters display 348" may include one or more inputs 408" that can be utilized by the user to send signals back to the fixture 14 and operate the fixture 14. Such capabilities may include, but are not limited to, actuating the valve, setting the volume of water discharged for each flush actuation, and the like.

FIGS. 17A-17D illustrate another embodiment of a fixture profile 5092. The fixture profile 5092 is substantially similar to the fixture profile 92, 92', and 92" discussed above and as such only the differences will be discussed herein.

The fixture profile 5092 includes a parameters marker 5004 configured to visually display to the user the real-time status of one or more operating parameters of the corresponding fixture 14 using a combination of text, symbols, and/or color. In the illustrated embodiment, the marker 5004 includes a data indicator 5008, configured to display the current value of the corresponding operating parameter, and a graphical indicator 5012, configured to graphically represent the status of the corresponding operating parameter (e.g., via color, shape, symbol, and the like).

The data indicator 5008 is generally textual in nature and displays the current value of the parameter being monitored. For example, in instances where water pressure is being monitored (see FIGS. 17A and 17B), the data indicator 5008 will display the current water pressure. Similarly, when solenoid life is being monitored (see FIG. 17C), the data indicator 5008 may display the current life value of the solenoid (e.g., as percentage of current actuations compared to the maximum threshold value of actuations), display the current number of actuations, and the like. Still further, in instances where diaphragm life is being monitored (see FIG. D), the data indicator 5008 may display the current life value of the diaphragm (e.g., as a percentage of current actuations compared to the maximum threshold value of actuations), the current number of actuations, and the like.

The graphical indicator 5012 is generally configured to represent the status of the parameter being monitored according to one or more operating thresholds. The graphical indicator 5012 allows the user to quickly and easily identify how the raw data (as provided by the data indicator 5008) corresponds with one or more pre-established threshold values (e.g., within the parameters display 348) without having to deeply investigate the operational capabilities of the fixture 14 itself. For example, the illustrated graphical indicator 5012 includes changing the color of the marker 5004 itself. Specifically, the marker 5004 will remain green if the corresponding parameter falls within acceptable operating conditions of the fixture 14 (see FIGS. 17B-17D), turns yellow if the corresponding parameter exceeds a first threshold value (e.g., the warning threshold value 418*a*, described above), and turns red if the corresponding parameters exceeds a second threshold value (e.g., the severe threshold value 418*b*, described above, see FIG. 17A). Although not shown, the graphical indicator 5012 may also including changing the shape of the mark 5004 (e.g., from circle, to square, to triangle, etc.) or provide one or more symbols.

As shown in FIGS. 17A-17D, the information monitored by a specific parameter marker 5004 may be customized to a specific type of fixture 14. For example, water pressure for a backflow preventer, solenoid life for a faucet, and diaphragm life for a flush valve. However, in some embodiments, the user may customize the fixture profile 5092 by selecting one or more parameters they wish to monitor using a marker 5004 (e.g., so that more than one marker 5004 is present). Furthermore, the user may adjust the thresholds for any individual marker 5004 independently or tie the thresholds to the data entered into the parameters tab 348 of the corresponding fixture 14.

Figure 26:
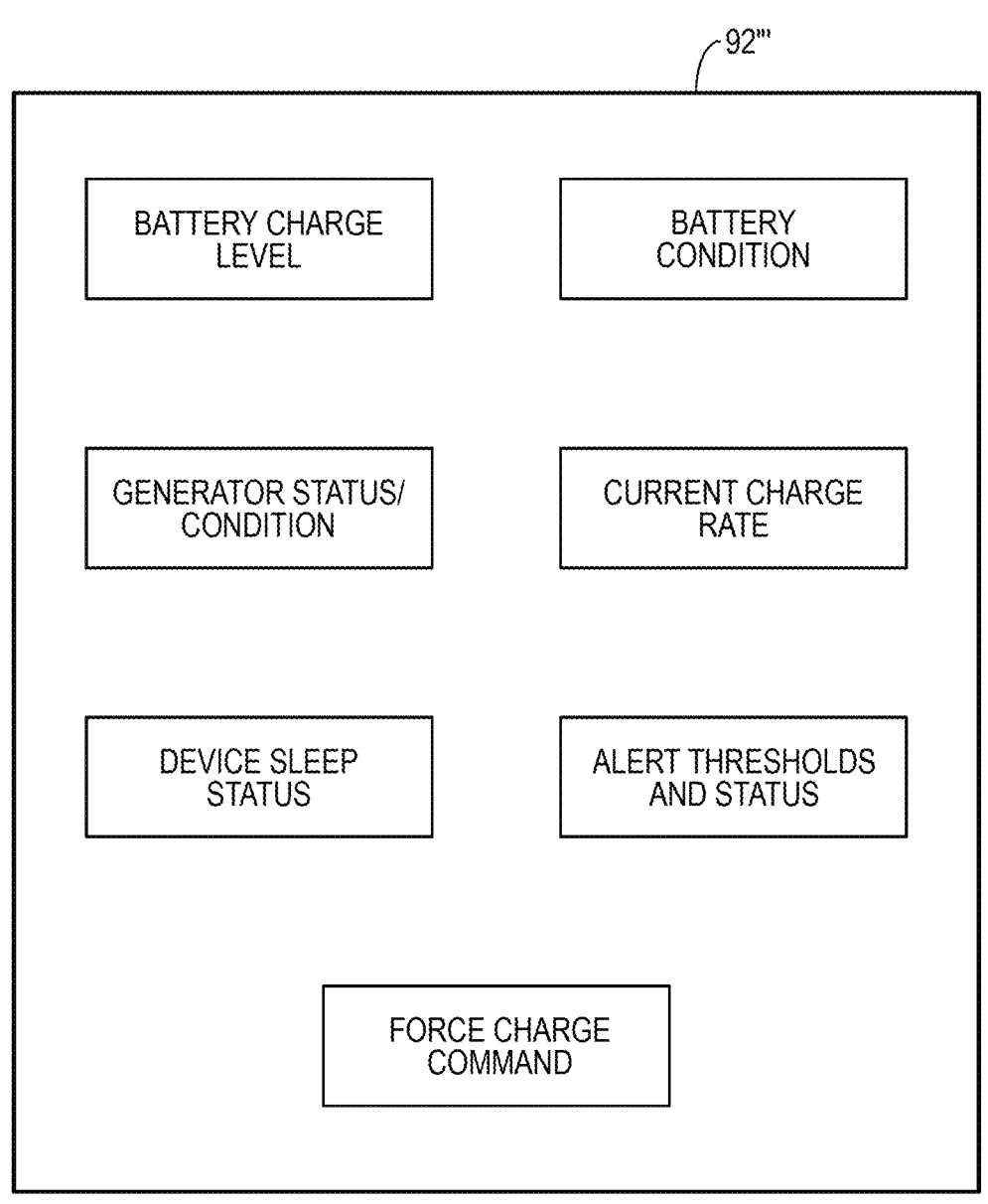
FIG. 26 illustrates a fixture profile configured for interaction with a battery powered device.

FIG. 26 illustrates an additional display 353 that can be included in the fixture profile 92 of any fixture 14 having a battery or that is battery powered. The display 252 is configured to display and inform the user regarding the status of the fixture's battery and/or power generator. Such information may include, but is not limited to, the current power status of the battery, the current or past charge rates, the amount of time spent charging over a pre-determined period of time, the battery charge rate over a pre-determined period of time, the battery charge level over a pre-determined period of time, the condition of the battery and/or generator, the sleep status of the fixture 14, and the like.

The display 535 and system 100 may also be configured to generate alerts based at least in part on the status of the battery and/or power generator. For example, the system 100 may generate alerts if the battery power becomes too low, if the battery condition is compromised or in need of repair, if the charge rate is insufficient to maintain the battery at a desired level of charge, if the generator is in need of repair, if the battery needs a temporary boost in charge, and the like. As discussed elsewhere, the limits and triggers for such alerts may be individually set and adjusted for individual fixtures 14 or universally over sub-sets of fixtures 14.

The display 535 and system 100 may also allow for commands to be sent to one or more fixtures 14 regarding the status of the battery and/or generator. For example, in instances where the battery level is low because the fixture 14 has not been used in a while, the user may be able to command the fixture 14 to actuate (e.g., open a valve in a faucet, flush a toilet, and the like) to generate water flow and run the generator remotely to allow the battery to be recharged to a certain extent. In instances where the generator is not "flow" based, other actions may also be taken as needed (e.g., turning on lights in a room if the battery is charged via solar cells, open automatic blinds if solar powered, and the like). The system 100 may also allow the user to command the fixture 14 to enter a "sleep" mode in instances where battery charge is low or periods of low activity are expected.

Figure 12:
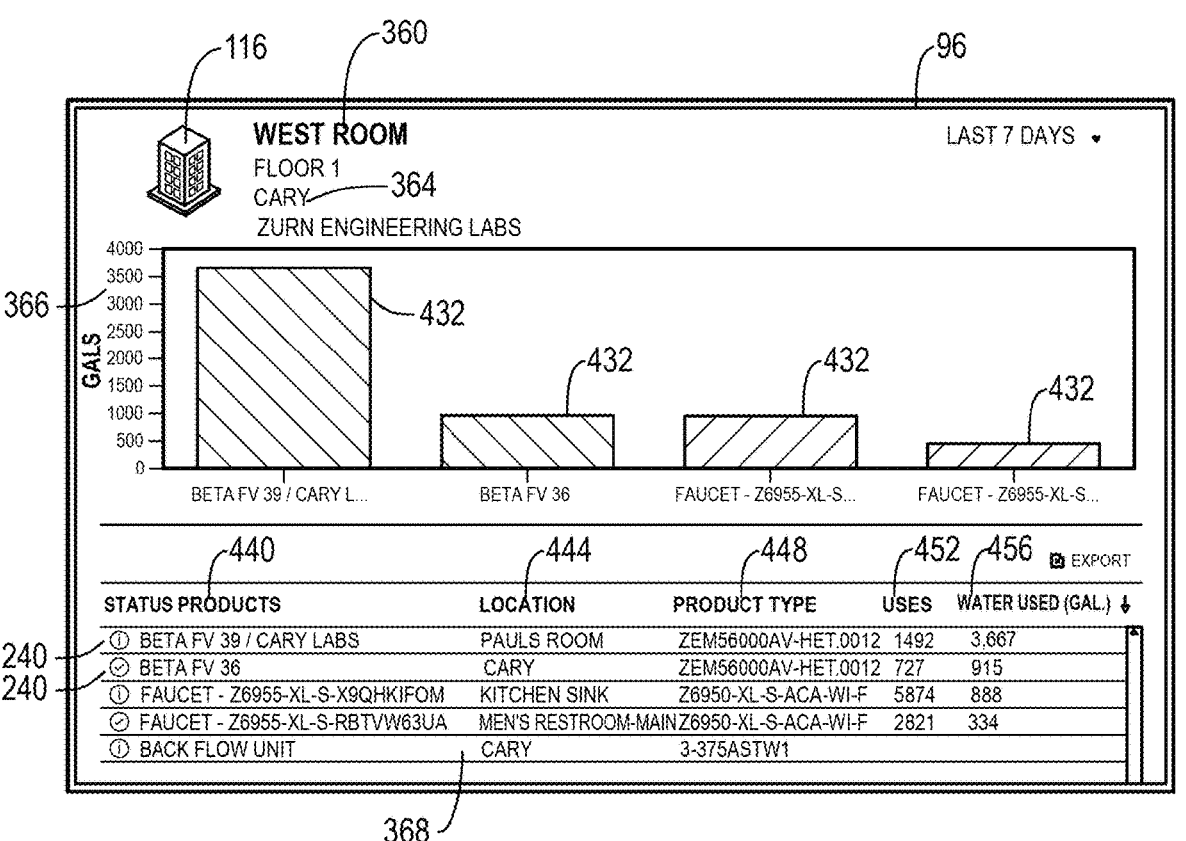
FIG. 12 illustrates an embodiment of a room profile page.

FIG. 12 illustrates a room profile 96 according to some embodiments. Each room profile 96 is configured to serve as the primary information repository of one corresponding room within the user's plumbing ecosystem. More specifically, the profiles 96 provide easy and thorough access to various data sets affecting the corresponding room such as, for example, a list of all fixtures 14 associated with or installed in the room, the type or classification of the room, the location information for the room, and operational data of fixtures 14 located within the room. In the illustrated embodiment, each room profile 96 is a pop-up display that appears in response to the user selecting (e.g., clicking) on a room tile 284 or other links throughout the interface 84.

As shown in FIG. 12, each illustrated room profile 96 includes 1) an identifier 116 representative of a room type classification (e.g., a bathroom, closet, etc.) of the associated room, 2) a room name 360, 3) location information 364, 4) a data chart 366, and 4) a product list 368 configured to list each fixture 14 installed within the room.

The chart 366 of the room profile 96 is configured to provide graphical representation of the volume of water being discharged over a pre-determined period of time from each fixture 14 located within the room. In the illustrated embodiment, the chart 366 includes a bar graph with an entry 432 included for each individual fixture 14 located in the corresponding room. Each entry 432, in turn, has a bar having a length representative of the volume of water that flowed through the fixture 14 over the pre-determined period of time and a label identifying the specific fixture 14 itself. In some embodiments, the color of the bar may be representative of a classification, such as but not limited to, the fixture type (e.g., green for flush valves and blue for faucets).

The chart 366 is also configured such that when the user selects and/or positions their cursor over a particular bar of the graph, the graph will present a pop-up label (not shown) to provide additional information regarding the fixture and its corresponding water usage.

With continued reference to FIG. 12, the chart 366 can be customized by the user to display data collected over varying time periods. Some selectable time periods may include, but are not limited to, the past 24 hours, the past 7 days, the past month, the past year, and the like. In other embodiments, the chart 366 may allow the user to enter a date range or multiple date ranges (not shown). In still other embodiments, the chart 366 may be filterable by one or more classifications (e.g., fixture classification). In still other embodiments, the chart 366 may be adjusted to display other forms of data such as, but not limited to, the number of active alerts for each fixture 14, the number of actuations for each fixture 14, and the like.

The product list 368 of the room profile 96 is configured to list each fixture 14 positioned within the room along with provide supplemental operational data to allow the user to compare and contrast the fixtures 14 within the room as a group. In the illustrated embodiment, the product list 368 includes 1) identifying information 440 for each fixture 14, 2) the specific location 444 of the fixture 14 within the room, 3) the product type 448, 4) the number of uses 452 the product has experienced over a pre-determined period of time, 5) the volume of water 456 used by the fixture 14 over the pre-determined period of time, and 6) a status indicator 240 (described above).

During use, the user is able to customize the product list 368 by organizing the data by any one of the listed entries. Furthermore, selecting one of the entries causes the interface 84 to display the corresponding fixture profile 92 of the fixture 14.

Figure 21A:
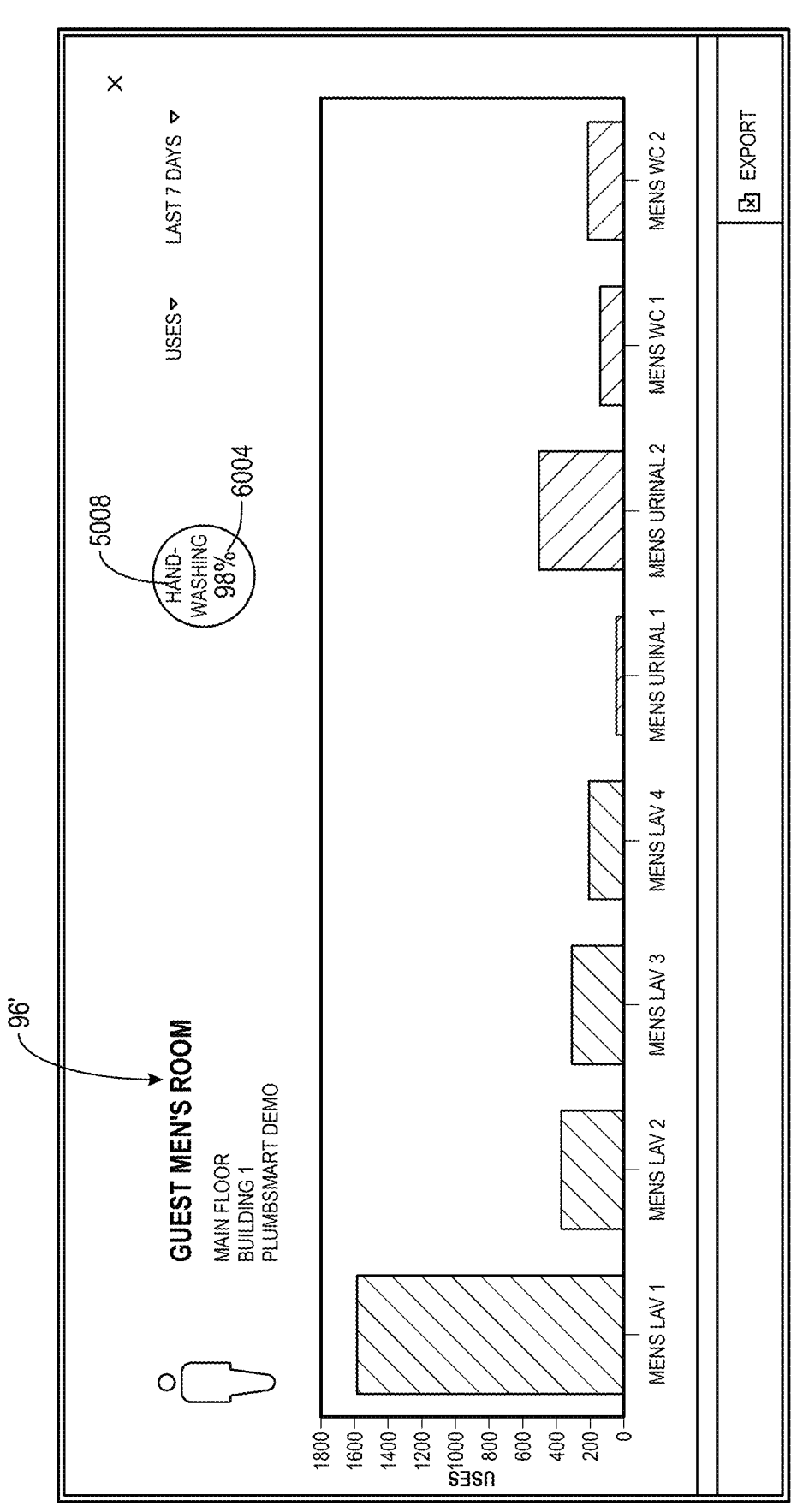
FIGS. 21A-21C illustrate another embodiment of a room profile.
Figure 21B:
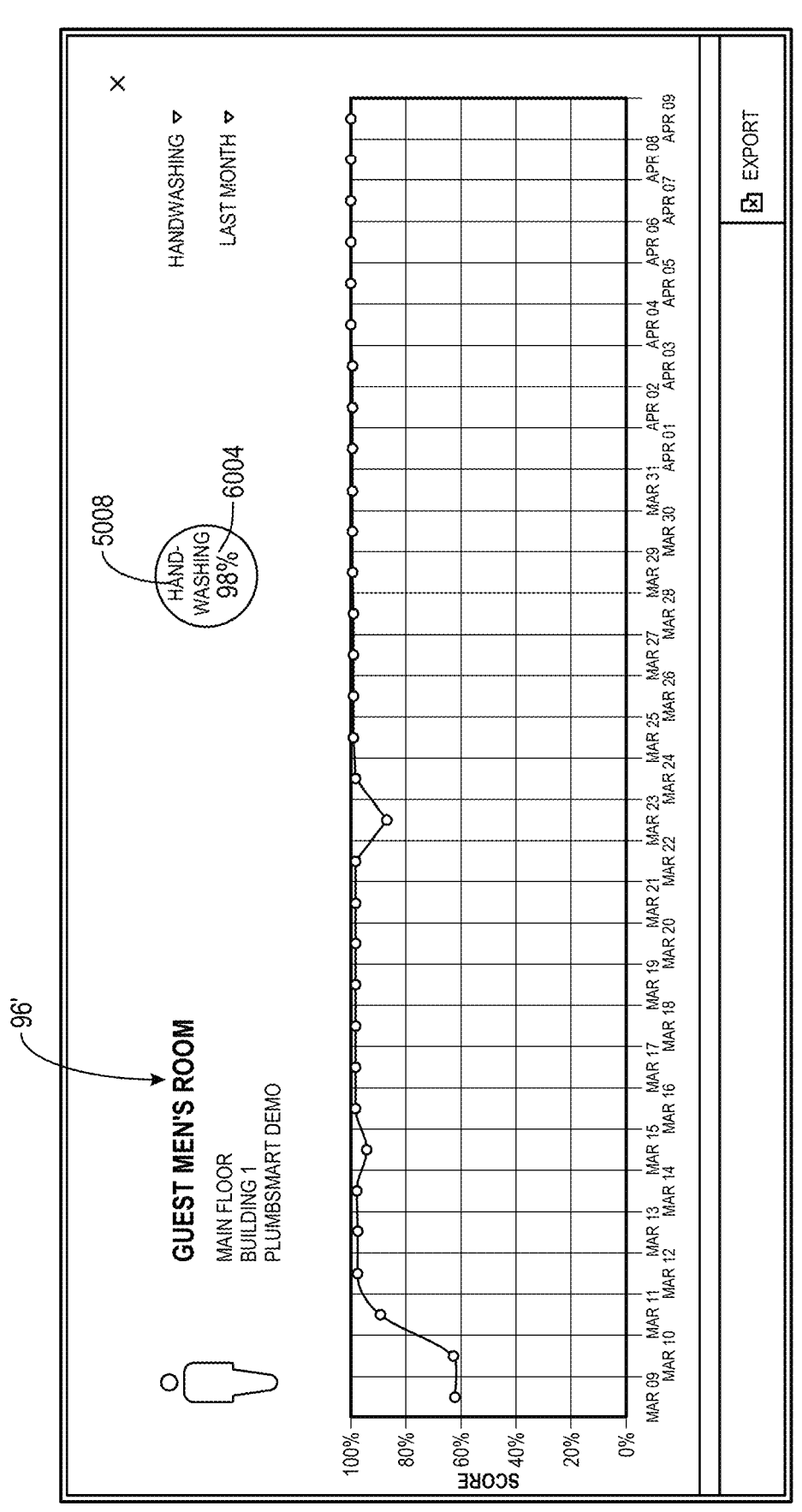
Figure 21C:
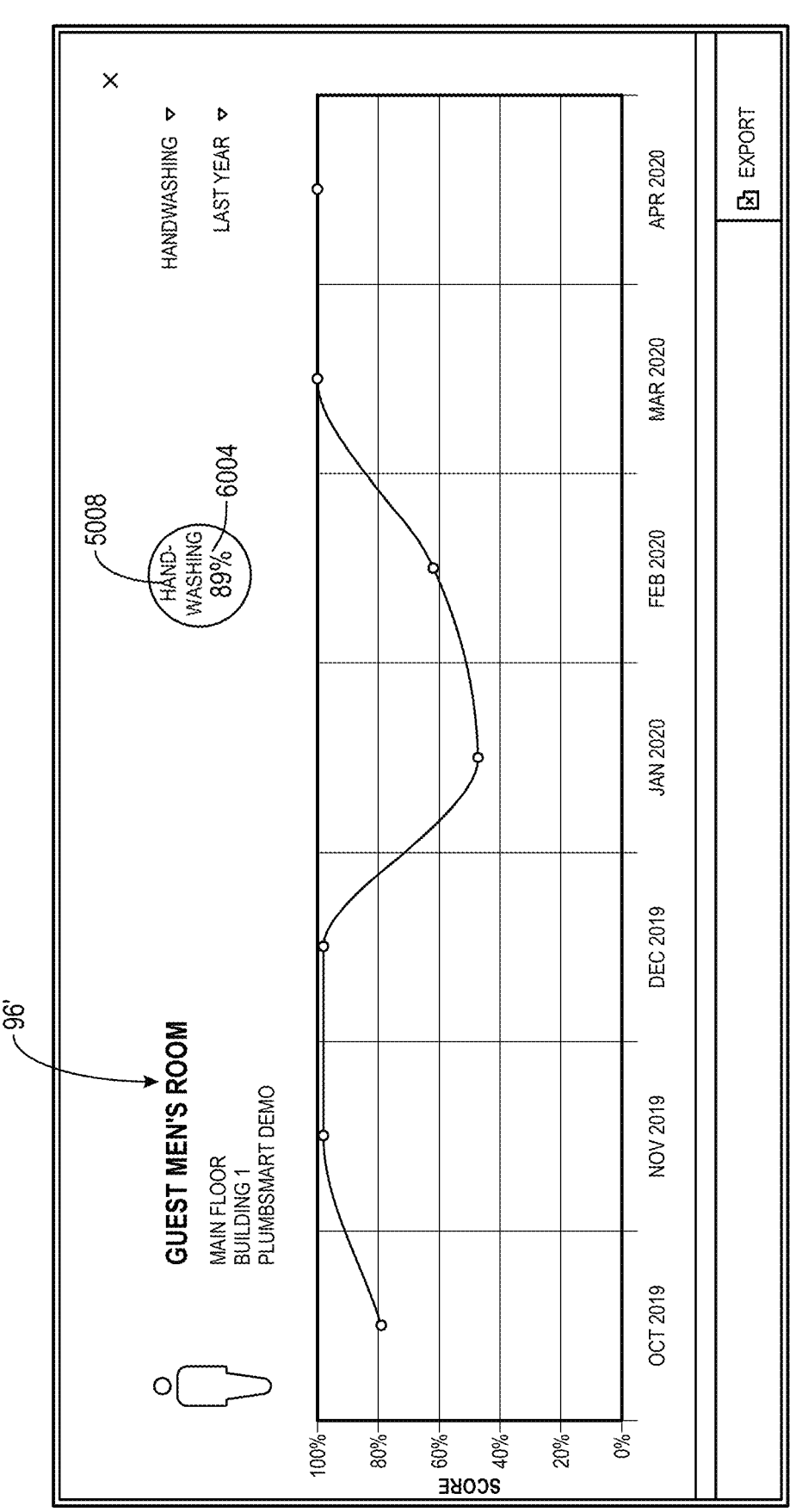

FIGS. 21A-21C illustrate another embodiment of a room profile 96'. The room profile 96' includes a fixture usage program (DUP) 6000. The DUP 6000 is generally configured to monitor the use of the various fixtures 14 within a particular grouping (e.g., within a specific room, building, area, and the like) and determine the rate at which each fixture 14 is used per visit by a user. In the illustrated embodiment, the DUP 6000 is configured to calculate the rate at which users wash their hands after using a toilet or urinal. To do so, the DUP 6000 tabulates, for a given period of time, the number of times all toilets and urinals associated with the room have been used. The DUP 6000 then tabulates the number of times that all of the faucets associated with the same room have been used over the same time period. The DUP 6000 then compares the data to produce a "handwashing score" 6004. In the illustrated embodiment, the DUP 6000 assumes a 2:1 usage ratio of faucets to toilet/urinals. As such, to achieve a 100% handwashing score 1006, the DUP 6000 must tabulate that the faucets were actuated twice as many times, during the given period of time, than the toilets and urinals in the same room. With the score 6004 calculated, the DUP 6000 is configured to display the score on the corresponding room profile 96' via a data indicator 5008 (described above). The DUP 6000 may also calculate this score over multiple time intervals and display the results on a chart (see FIGS. 21B, 21C). In alternative embodiments, different displays may be used. In still other embodiments, a handwashing score widget may be present on the dashboard 88a.

While the illustrated DUP 6000 is shown calculating handwashing rates, it is understood that the program may also be used to calculate the rate at which other elements are used. Such fixtures may include, but are not limited to, paper towel dispensers, soap dispensing, toilet paper usage, hand dryer usage, disinfectant dispenser usage, air quality, and the like. In still other embodiments, the DUP 6000 may also monitor door crossings (e.g., door openings, door beam crossings, and the like) to tie such usage to the entry and exit of a user from the room in question.

Still further, the DUP 6000 may associate the actuation of various elements 14 within a given room or area by timestamp. In such embodiments, the DUP 6000 may generally associate all items happening within a particular time window (e.g., within 2 minutes or the like) with occurring to a single person. As such, the system can avoid misconstruing multiple actuations of a toilet, urinal, faucet, and the like, with multiple people.

While the illustrated DUP 6000 is shown being used in a bathroom setting, it is also understood that the DUP 6000 may be used in alternative areas such as in hospital setting where the DUP 6000 can monitor the rate at which a worker disinfects their hands (e.g., actuates a sanitizer dispenser) or washes their hands (discussed above) when entering a particular patient's room. Such monitoring can also be cross-references with data taken from other medical equipment such as thermometers, blood pressure cuffs, and the like.

While the illustrated embodiment shows the DUP 6000 monitoring the use of various fixtures 14 directly, the DUP 6000 may also monitor the usage of different elements 14 indirectly by monitoring the flow of water into said room. In such embodiments, the DUP 6000 can recognize that every time a first volume of water flows into a room a toilet has been flushed while every time a second volume of water flows into a room, a faucet has been actuated. The DUP 6000 can record and monitor these flow patterns to monitor the usage of various items receiving water from the pipe or junction in which the flow sensor is positioned. By doing so, the DUP 6000 is able to monitor the usage of an entire room without having to equip the room entirely with smart fixtures.

Figure 22:
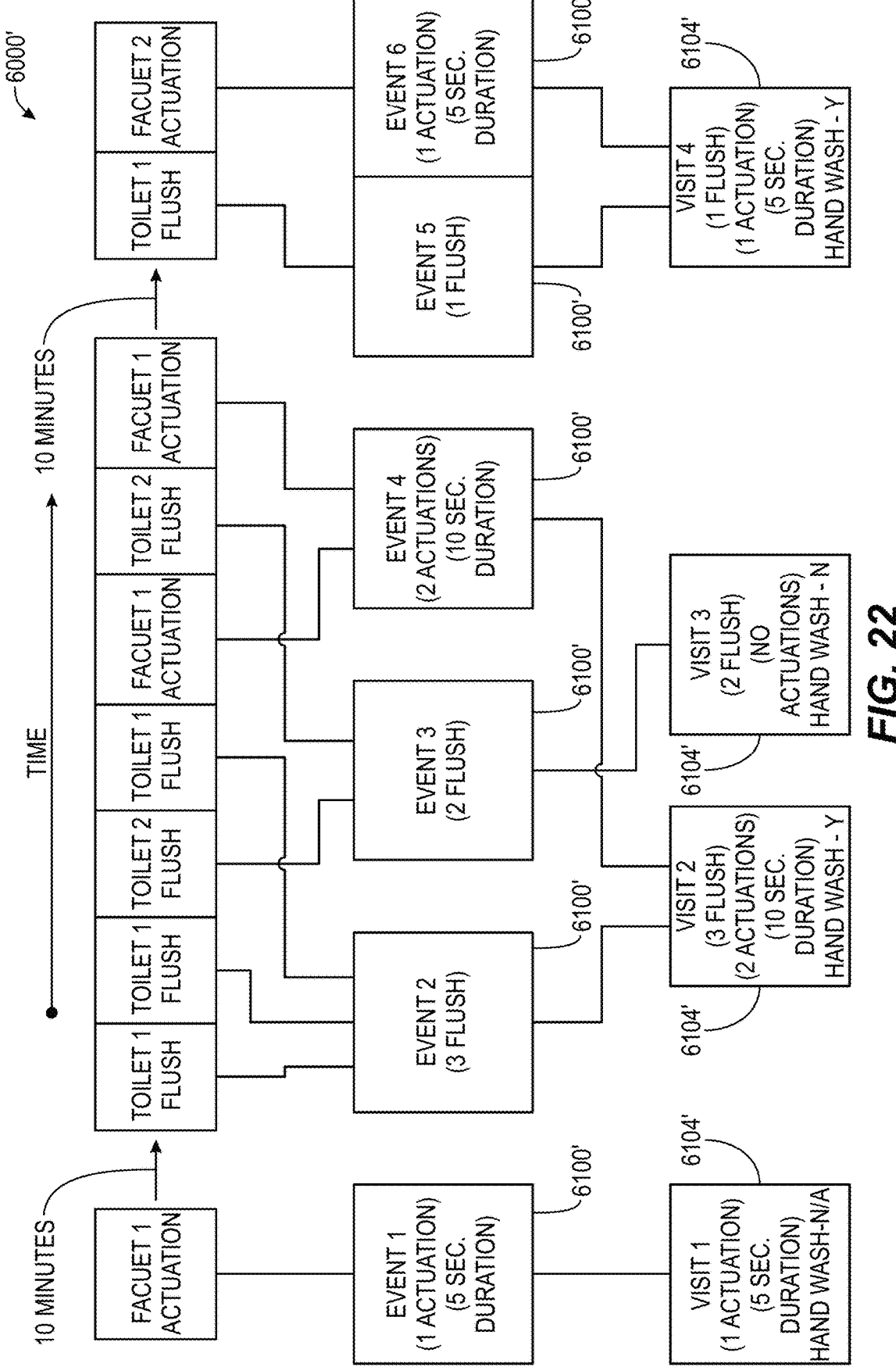
FIG. 22 illustrates an embodiment of a fixture usage program.

FIGS. 22-23 illustrate another embodiment of the DUP 6000'. Similar to the DUP 6000, the DUP 6000' is configured to monitor the usage of various fixtures 14 within a particular room or area and calculate numerous statistical and usage outputs based on the collected data. More specifically, the DUP 6000' employs a multi-tiered data collection and grouping strategy to determine how and when fixtures 14 are being used at a particular location, who is using the fixtures, and the manner in which they are being used. For example, each tier of the DUP 6000' takes a set of data and compiles it into a first set of groupings 6100' based on a first set of parameters, the DUP 6000' then compiles the first set up groupings 6100' into a second set of groupings 6104' based on a second set of parameters different than the first set of parameters. The DUP 6000' then reviews the resulting data and calculates various usage information and statistics.

Figure 24:
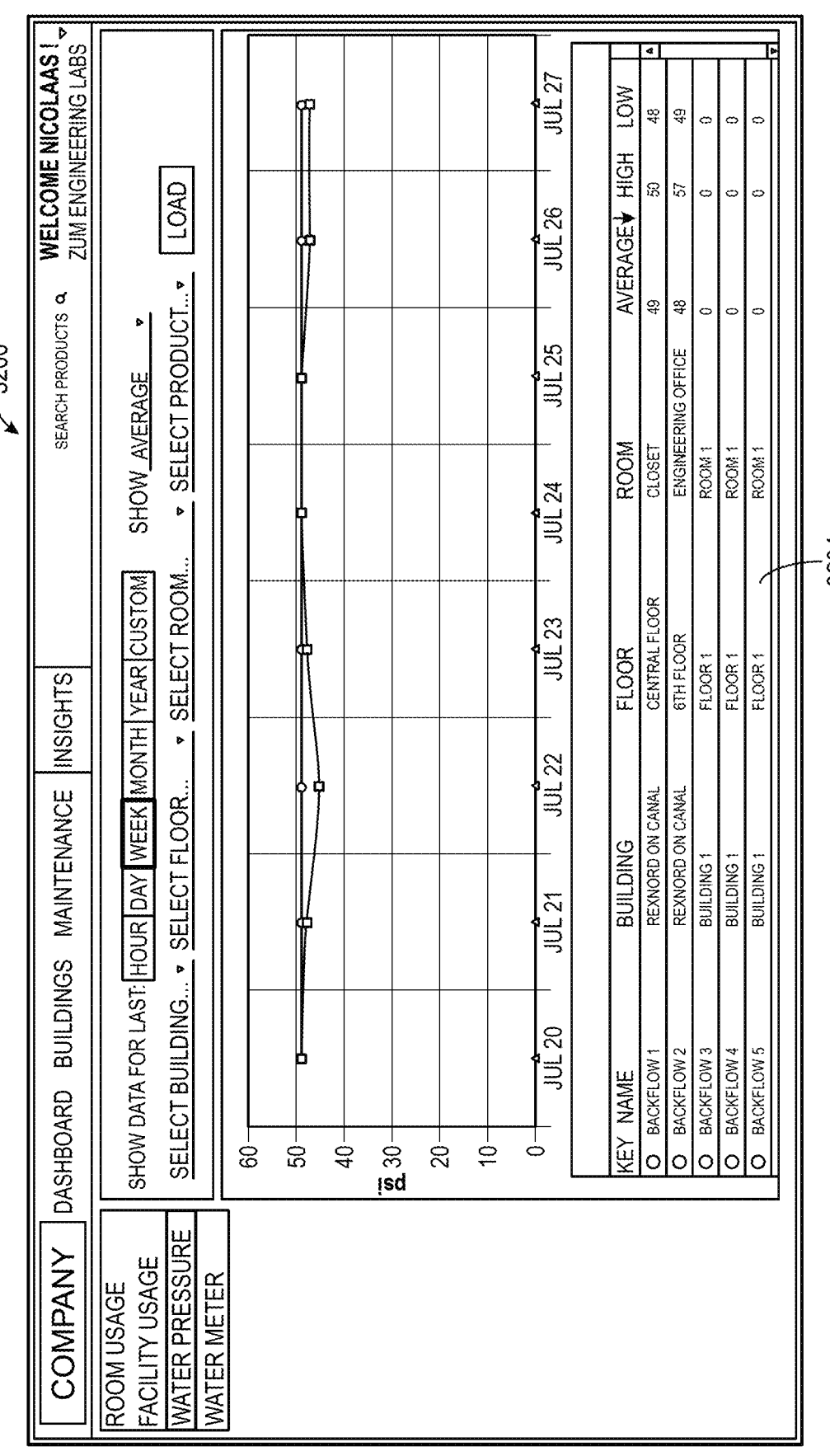
FIG. 24 illustrates a water pressure display.

As shown in FIG. 24, the first tier of the DUP 6000' compiles individual fixture 14 usage information into a first set of groupings or "events" 6100' based on a first set of associative parameters. An "event" 6100' is intended to represent a single interaction between a user and a particular fixture 14. The fixture usage data may include, but is not limited to flushes, actuations, actuation time, total flow volume (e.g., water, soap, etc.). In the illustrated embodiment, the first set of associated parameters include compiling all actions occurring to a single fixture 14 over a pre-determined period of time (e.g., two minutes). For example, the DUP 6000' may be configured to compile all flushes occurring on a single toilet within a two minute period into a single "event" 6100'. Within the resulting event 6100', the DUP 6000' may be configured to collect multiple sets of data for the single fixture 14. For example, the DUP 6000' may compile both the number of actuations, the time spent actuated, and the water temperature occurring at a single faucet within a pre-determined time period into a single event 6100'. However, in alternative embodiments, different associative parameters may have been used. For example, all actions occurring in a single bathroom stall (e.g., multiple fixture 14 treated as a single fixture given their close proximity) could have been compiled together.

For the second tier, the DUP 6000' then compiles individual events 6100' together into a second set of groupings or "visits" 6104 based on a second set of associative parameters. Generally speaking, the resulting "visits" are intended to represent a single user's visit or interaction with the room in question. In the illustrated embodiment, the events 6100' are grouped together by proximity in time and location (e.g., within the same room). For example, an event 6100' representing the usages of a toilet or stall will be grouped together with events 6100' representing usages at a faucet within the same bathroom so long as the two events 6100' occur within a pre-determined period of time relative to one another (e.g., 2 or 4 minutes). In some embodiments, more than two events 6100' may be compiled so long as they meet the grouping requirements (e.g., an event representing toilet usage, an event representing toilet paper usage in the same stall, an event representing faucet usage within the same bathroom, and an event representing soap dispensing within the same bathroom may all be compiled into a single event 6104' so long as they occur within the necessary time period).

In still other embodiments, the DUP 6000' may also employ certain filters that allow additional groupings or determinations to be used. For example, if a faucet event 6100' is combined with a toilet event 6100' to form a visit 6104', the DUP 6000' can determine that a hand-washing has occurred and adjust any handwashing scores appropriately. By doing so, the system can take into account people who actuate the faucet multiple times or flush multiple times without incorrectly assuming additional users have used the facility. In still other embodiments, the DUP 6000' can associate each visit 6104' with a single "user" to determine the number of people who have used the facility within a given time period (e.g., each day, week, month, and the like). In still other embodiments, the DUP 6000' may calculate the average time a user spends washing their hands or the number of times a user typically actuates the faucet by reviewing "event" data corresponding to a faucet. Indirect determinations may also be used with DUP 6000', such as estimating how much toilet paper is remaining in a room based on the number of events that have occurred at a particular toilet (e.g., assuming a single toilet paper dispense for a single toilet event regardless of how many times the toilet has actually been flushed within that event). The DUP 6000' may also have filters installed to help organize the data. For example, the DUP 6000' may only combine toilet events with faucet events assuming the faucet event occurs after the toilet event. Furthermore, the DUP 6000' may only combine a single faucet event to any one toilet event, assuming if two faucets were used within the predetermined time period of the toilet use, only one is associated with the user that actually used the toilet.

Still further, the DUP 6000' may also be used to generate various types of alerts based on the compiled data. For example, if an employee bathroom results in a "visit" that does not include a hand-washing event, that could trigger an alert. Furthermore, if an event associated with a particular faucet results in an event at a soap dispenser associated with a different faucet, an alert may be triggered assuming something is wrong with the soap dispenser associated with that particular faucet since it wasn't used.

FIG. 22 illustrates the DUP 6000' in action. The timeline illustrates a number of individual fixture operations that occurred in a particular bathroom over a pre-determined period of time. As shown, the DUP 6000' compiles the individual operations into the appropriate events 6100' by combining any actions that take place at a single fixture 14 over a pre-determined time period (e.g., within two minutes of each other). This results in a series of events 6100', each representing a particular interaction between a single fixture 14 and a single user.

The DUP 6100' then compiles appropriate events 6100' together to produce a visit 6104'. Again, the DUP 6100' compiles events based on physical proximity (e.g., within the same bathroom), time (e.g., within 2-4 minutes of each other), and any pre-determined algorithm filters (e.g., that any user of a toilet will only use a single faucet). The result is a plurality of visits 6104', each representing how a single user interacted with the room.

Finally, with the visits 6104 compiled, the DUP 6000' can calculate and perform a statistical analysis for each individual's visit and the room itself over a pre-determined period of time. In the present example, the DUP 6000' calculated that it was visited by 4 people, two of which washed their hands, one of which did not, and one that was not applicable because they did not use the toilet. Together these usages produced a hand washing score of 66%. The DUP 6000' also calculates that each user had an average of 2 flushes per use of a toilet, and 1 actuation (e.g., 5 second of flow) per use of the faucet.

FIG. 23 illustrates an insights display 6200' for presenting the results of DUP 60000'. The display includes both current 6204' and historical 6208' modes (e.g., showing the statistics for the current time period or showing the statistics over a pre-determined time period selected by the user). For each mode, the display includes a line entry 6210' representing a particular location (e.g., room). The line entry 6210', in turn, includes a title 6214', a "hand wash rate" 6218', an average wash time 6222', and a bathroom occupancy 6226'.

With regards to the hand wash rate 6218', this is calculated similar to the hand was score discussed above. Specifically, the DUP 6000' determines what percentage of users both 1) used a toilet, and 2) subsequently washed their hands one or more times. As such, users that do not use a toilet (e.g., visit 1 of FIG. 22) are not included in the score. Similarly, users that wash multiple times or flush multiple times will only be considered once (e.g., visits 2, 3, and 4).

With regards to the average wash time 6222' entry, the DUP 6000' is configured to calculate the average amount of time spent with the faucet running for a given user. This statistic includes any user that interacts with a faucet, regardless of whether the toilet or other fixture is also used (e.g., visits 1, 2, 3, and 4 of FIG. 22). The DUP 6000' is configured to take the total run time and divide by the number of users.

With regards to the bathroom occupancy 6226' entry, the DUP 6000' is configured to display 1) the number of people currently in the room 6230', 2) the occupancy percentage 6234', and 3) the total number of users that have used that particular facility over the course of the day 6238'. With regards to the occupancy percentage 6234', the DUP 6000' can calculate this number based on a theoretical number of users the bathroom can hold versus the number of users currently in the facility or base the number on the percentage of a particular fixture or all fixtures being used. For example 2 toilets being used out of a total of 6 would constitute 33% occupancy.

FIG. 30 illustrates another embodiment of the handwash display 6200".

Figure 13:
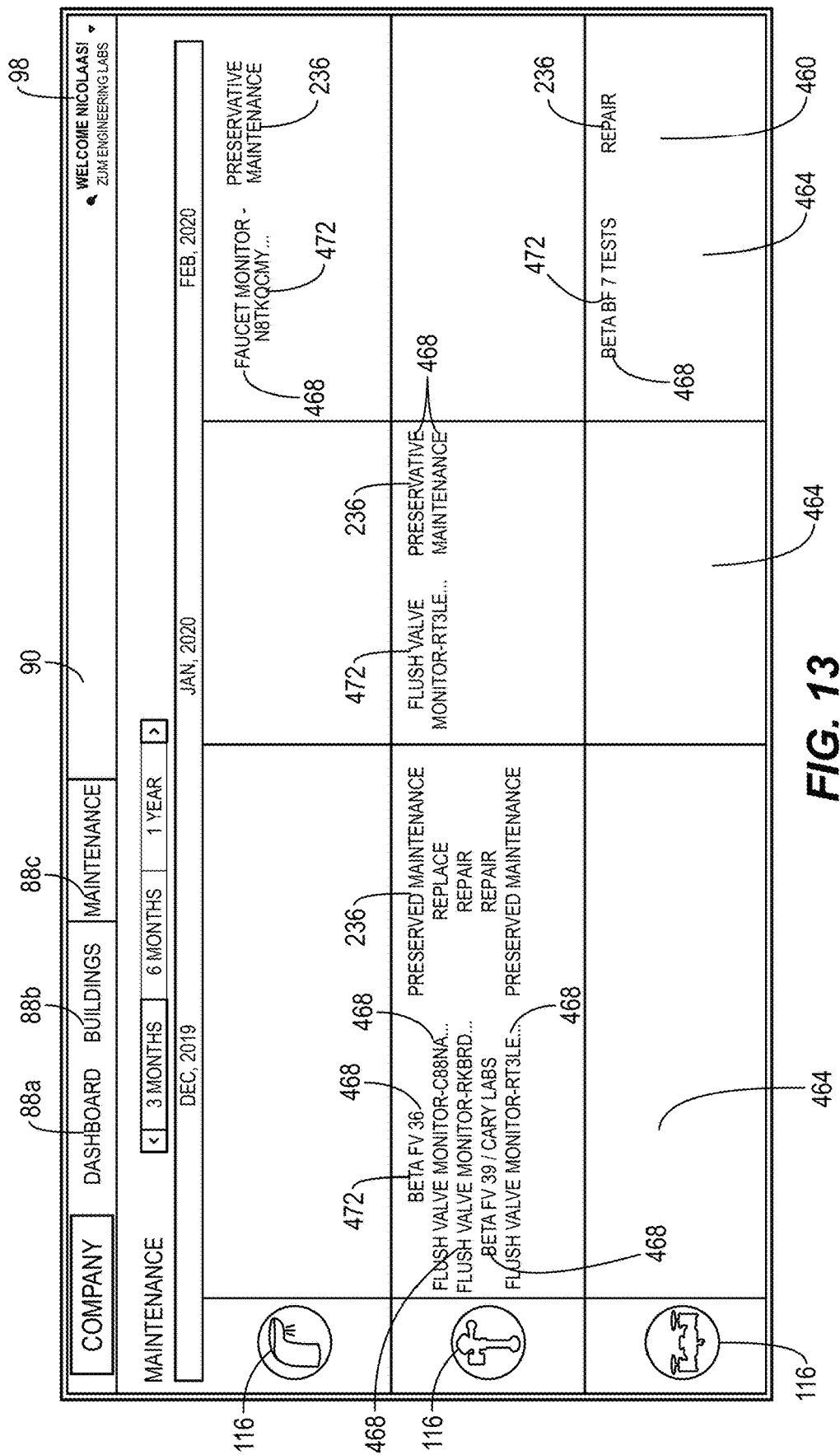
FIG. 13 illustrates a maintenance display page of an interface for use with the system of FIG. 1.

As shown in FIG. 13, the illustrated maintenance display 88c of the interface 84 is generally configured to organize and display the maintenance tasks according to the date the maintenance tasks are scheduled to be completed and the classification of the fixture 14 that the maintenance tasks are to be performed on. The maintenance display 88c includes a calendar grid 460. The grid 460, in turn, includes a plurality of cells 464 arranged with each column representative of a particular date and each row representative of a particular classification. More specifically, each row of the grid 460 corresponds to a particular fixture classification while each column corresponds to a particular month. While the illustrated embodiment is organized by fixture classification and month, it is to be understood that in alternative embodiments the grid 460 may be organized alternatively such as, but not limited to, location classification (e.g., building, floor, room, etc.), severity level, individual fixture, maintenance task type, and the like. Furthermore, the time period may also be subdivided differently such as, but not limited to, by day, by week, by quarter, or by year.

As shown in FIG. 13, the identifier 116 of each row is typically chosen from and corresponds with the identifier 116 present in one of the alert indicators 112a, 112b, 112c of the active alerts overview section 104 to provide visual consistency and ease of reference between the two sections 104, 108. However, in other embodiments, the identifier 116 of each entry 128 may be chosen from and represent other classifications.

The cells 464 of the grid 460 are populated by one or more individual maintenance entries 468 each of which correspond to a particular maintenance task. The entries 468 are positioned such that they are located in the column corresponding with the month in which the maintenance task is scheduled to occur and in the row corresponding with the type of fixture 14 that the maintenance task is to be performed on. In embodiments where a single maintenance date is present, the entries 468 are positioned to correspond with the single date. In embodiments where a modified date is present (described above), the entries 468 are positioned such that they correspond with the modified date. In still other embodiments, the calendar may include entries that display (either graphically or textually) how the date has been moved (e.g., an arrow showing the maintenance task was originally scheduled for day A, and has now been moved to day B).

Each entry 468 of the grid 460 includes 1) the fixture title or name 472, and 2) the service type descriptor 236 (described above). However, in alternative embodiments, more or fewer informational items may be included. Furthermore, selecting a particular entry (e.g., clicking on the entry 468) causes the system to display the maintenance task page 222 for the selected maintenance task (described above).

The maintenance display 88c also allows the user to customize the display by adjusting the time period shown on the screen. More specifically, the user can adjust the display 88c to show three months, six months, one year, and the like. Generally speaking, reducing the time period (e.g., selecting three months) allows for larger cells and therefore more tasks to be displayed at one time while increasing the time period (e.g., selecting one year) allows for more cells 464 to be shown with less information in each one. In other embodiments, the user may be able to sort the maintenance calendar by season, work schedule, vendor availability, weather conditions, and the like. In still other embodiments, the user may be able to sort the maintenance calendar based on product type, location characteristics, severity level, and the like.

While not shown in FIG. 13, in some embodiments the system 10 may also allow for the user to manually add maintenance tasks to the calendar that do not correspond with fixtures registered in the system 10 (not shown).

As shown in FIG. 15A-15B, the insights display 88d is configured to allow the user to organize, display, and compare data for one or more select fixtures 14 over a specified date range. More specifically, the illustrated insights display 88d has multiple operating modes or pages that each provide unique data display and customization options. In the illustrated embodiment, the insights display 88d includes a "top usage" page 3000a, configured to display the top results from a pre-selected sub-group of elements over a pre-selected period of time, and a "usage history" page 3000b, configured to display the usage history of a particular element over a pre-determined period of time. The illustrated insights display 88d also includes a sub-menu 3004 along the side thereof including one or more sections that are constantly visible so long as the insights display 88d is selected. The sub-menu 3004, in turn, allows the user to quickly and easily navigate between the various pages 3000a, 3000b during use.

The top usage page 3000a of the insights display 88d is generally configured to display the top results from a pre-selected sub-group of elements over a pre-selected period of time. More specifically, the top usage page 3000a includes: 1) a specification bar 3008 to allow the user to set the parameters being searched and displayed, 2) a graphical display 3012 to display the specified results from the selected parameters in graphical form, and 3) a list display 3016 to display the list of fixtures 14 included in the sub-group of elements analyzed.

The specification bar 3008 of the top usage page 3000a includes multiple inputs 3020a-3020h, each accessible and individually configurable by the user. The specification bar 3008 is configured to generally establish, among other things, the date range, data type, grouping type, and fixture location parameters. Specifically, the illustrated specification bar 3000a includes a date start input 3020a, a date end input 3020b, a data input 3020c, a fixture grouping input 3020d, a building input 3020e, a floor input 3020f, and a room input 3020g. The specification bar 2008 also includes a "load" button 3020h to allow the user to lock-in the selections and generate the desired outputs.

As shown in FIG. 15A, the date start input 3020a and the date end input 3020b specify the range of dates over which the data will reviewed. While the illustrated specification bar 3008 is configured to accept a single range of dates, alternative embodiments of the top usage page 3000a may allow the user to enter multiple date ranges simultaneously.

The data input 3020c of the specification bar 3008 specifies the type of data the system is to analyze within the specified date range. For example, selecting "water" from the data input 3020c causes the system 10 to analyze the volume of water used by a particular entity over the specified date range. In contrast, selecting "uses" causes the system 10 to review the number of uses or activations a particular entity undergoes during the specified date range. While the illustrated input 3020c includes "water" and "uses" as possible selections, in alternative embodiments additional data types may also be included such as, but not limited to, number or type of alerts, water pressure, flow rate, backflow events, maintenance events, and the like.

The grouping input 3020d determines the classification or item grouping used for an individual entry within the graphical and list displays 3012, 3016. For example, selecting "device" from the grouping input 3020d causes the system 10 to review data on a per-fixture basis (e.g., each entry in the graph and list will include an individual fixture 14). Alternatively, selecting "building," "floor," or "room" cause the system 10 to compile data for all fixtures located in the desired location classification (e.g., each entry in the graph and list 3012, 3016 will be compiled from all fixtures located in a specific building classification, floor classification, or room classification, respectively). While not shown, additional embodiments may allow the user to individually select a plurality of individual fixtures 14 from a master list to include in the analysis. Such an embodiment may be used together with or alternatively from the location classification system described above.

As shown in FIG. 15A, a portion of the inputs 3020c-3020g of the specification bar 3008 are drop-down menus configured to display only the options available to the user. For example, the data input 3020c only displays the types of data the system is prepared to compile (e.g., water volume usage, fixture usage, etc.). Similarly, the grouping input 3020d displays the classifications by which the user can group the data (e.g., fixture, building, floor, room, etc.). In some instances, the drop down menus may also be updated and modified in real-time to reflect and adapt to previous selections. For example, after the user selects a building (e.g., via the building input 3020e), the drop-down menu for the floor input 3020f and room input 3020g will automatically update to only list the floors and rooms associated with the selected building.

In addition to the drop-down menus discussed above, other inputs 3020a, 3020b may include graphical interfaces. For example, the start and end date inputs 3020a, 3020b may include a graphical calendar interface allowing the user to navigate and select the desired dates thereon. In the illustrated embodiment, the interface also highlights the dates included within the range to more clearly display the user's selection.

As shown in FIG. 15A, the graphical display 3012 of the top usage page 3000a is configured to provide a graphical representation of the top results corresponding with the parameters selected in the specification bar 3008. More specifically, the illustrated graphical display 3012 includes a bar graph with each entry 3024 representing the top four results taken from the data type (e.g., the data input 3020c), grouping (e.g., grouping input 3020d), location classification (e.g., inputs 3020e-3020g) and date range (e.g., inputs 3020a-3020b) selected. For example, the illustrated graphical display 3012 of FIG. 15A include the top four fixtures 14 in water volume usage from the second floor men's room in Zurn HQ with the data taken between Jan. 7, 2020 and Jan. 14, 2020. As shown in FIG. 15A, each entry 3024 of the graphical display 3012 includes a vertical bar where the bar is representative of the magnitude of the data being analyzed (e.g., the volume of water used by each fixture 14 or the number of uses). While the illustrated display 3012 includes four entries 3024, in alternative embodiments more or fewer entries 3024 may be included. In still other embodiments, the number of entries 3024 may be adjustable by the user.

The list display 3016 of the top usage page 3000a is configured to list all entities falling within the parameters input via the specification bar 3008. For example, the illustrated list display 3016 of FIG. 15A includes all fixtures 14 located in the $2^{nd}$ Floor Men's Restroom of Zurn HQ. The list display 3016 allows the user to review all of the raw data and entities used to prepare the graphical display 3012. Each entry 3028 of the list display 3016 includes 1) the product name 3032, 2) the building classification 3036, 3) the floor classification 3040, 4) the room classification 3044, 5) a location description 3048, and 6) other raw data entries such as the actual number of uses 3052 and the actual water usage volume 3056. In alternative embodiments, each entry 3028 may include additional information such as, but not limited to, alert status, maintenance status, and the like.

As shown in FIG. 15A, the entries 3028 of the list display 3016 may be organized by any one of the individual data elements described above. For example, the list 3016 may be organized by number of uses, water usage volume, location, and the like. The list 3016 is also configured to allow the user to export the resulting data as is described above.

As shown in FIG. 15B, the usage history page 3000b is configured to display both graphically and textually the historic data associated with a specific fixture 14 over a pre-selected period of time. More specifically, the usage history page 3000*b* includes: 1) a specification bar 3060 to allow the user to set the parameters being analyzed and displayed, 2) a graphical display 3064 to display the historical data from the selected fixture 14 in graphical form, and 3) a list display 3068 to display the historical data from the selected fixture 14 in textual form.

The specification bar 3060 of the usage history page 3000*b* includes multiple inputs 3072*a*-3072*e*, each accessible and individually adjustable by the user. The specification bar 3060 is configured to generally establish, among other things, the date range, the specific fixture 14 being analyzed, and the time scale displayed. Specifically, the illustrated specification bar 3060 includes a date start input 3072*a*, a date end input 3072*b*, a time scale input 3072*c*, and fixture selection inputs 3072*d* (e.g., a building, floor, room, and fixture classification inputs).

As shown in FIG. 15B, the date start input 3072*a* and the date end input 3072*b* specify the range of dates over which the data will reviewed. While the illustrated specification bar 3060 is configured to accept a single range of dates, alternative embodiments of the top usage page 3000*b* may allow the user to enter multiple date ranges simultaneously.

The fixture selection inputs 3072*d* of the specification bar 3060 allow the user to select a specific device 14 for the analysis. In the illustrated embodiment, the selection inputs 3072*d* include four separate drop-down menus ranging from broader to more narrow location classifications, specifically, building, floor, room, and individual fixture. As discussed above, each drop-down menu automatically updates to only display the options that satisfy the options already selected (e.g., the floor menu only displays floors pertaining to the building selected). The narrowing effect provided by these menus allow a user to more easily locate and select an individual fixture 14 within the plumbing ecosystem. In alternative embodiments, alternative forms of fixture selection may be present such as, but not limited to, selecting a fixture from a graphical interface (e.g., maps, lists, etc.), allowing the fixtures to be sorted by an alternative set of menus (e.g., fixture classification, model, install date, alert status, etc.), and the like. In still other embodiments, the fixture selection inputs 3072*d* may also support alternative forms of inputs such as, but not limited to, QR codes, GPS data, and the like.

The time scale input 3072*c* determines the time frame over which each entry of the graphical and list displays 3064, 3068 will be calculated. For example, if the user selects "day," then each entry in the graphical and list displays 3064, 3068 will include the average data for a particular day. In contrast, if the user selects "hour" or "month," each entry in the graphical and list displays 3064, 3068 will include the average data over a particular hour or month, respectively.

As shown in FIG. 15B, a portion of the inputs 3072*c*, 3072*d* of the specification bar 3060 are drop-down menus configured to display only the options available to the user. For example, the fixture selection inputs 3072*d* only display the selection options available within the plumbing ecosystem. Furthermore, the drop down menus may also be updated and modified in real-time to reflect and adapt to previous selections (described above).

In addition to the drop-down menus discussed above, other inputs 3072*a*, 3072*b* may include graphical interfaces. For example, the start and end date inputs 3072*a*, 3072*b* may include a graphical calendar interface allowing the user to navigate and select the desired dates thereon. In the illustrated embodiment, the interface also highlights the dates included within the range to more clearly display the user's selection.

As shown in FIG. 15B, the graphical display 3064 of the usage history page 3000*b* is configured to provide a graphical representation of the historical data of a particular fixture 14 over the selected date range (e.g., via inputs 3072*a* and 3072*b*) and subdivided per the selected time scale (e.g., via time scale input 3072*c*). More specifically, the illustrated graphical display 3064 includes a bar graph with a line graph overlaid thereon. By doing so, the graphical display 3064 is able to illustrate two historical data sets (e.g., water usage volume and actuations) simultaneously. While the illustrated graph includes a combination of bar and line graphs, in alternative embodiments, multiple line graphs, multiple bar graphs, or any combination thereof may also be used. Furthermore, other forms of chart or other graphical data displays may be used either alone or in combination. In still other embodiments, multiple charts may be displayed simultaneously or separately selected via a user menu.

In the illustrated display 3064, the bar graph includes a plurality of entries 3080*a*, each representing the average water usage volume over the pre-selected time scale (e.g., hour, day, month, etc.). Furthermore, the line graph of the illustrated display 3064 includes a plurality of entries 3080*b*, each representing the average water actuations over the same pre-selected time scale. In other embodiments, the specific type of data displayed may be customized for different fixture classifications (e.g., flush actuations and water usage for a flush valve, water pressure for a backflow preventer, actuations and water usage for a faucet, etc.).

The list display 3068 of the usage history display 3000*b* is configured to list a series of entries 3084, each representing the calculated data values for a particular sub-division of the pre-selected time scale. Stated differently, each entry 3084 represents a data point used in the graphical display 3064. The list display 3068 allows the user to quickly and easily review all of the raw data used to prepare the graphical display 3068. Each entry 3084, in turn, includes 1) the specific time period or date 3088 to which the entry pertains, 2) the faucet uses data 3092 for the corresponding time period, 3) the faucet water usage 3096 data for the corresponding time period, 4) the flushes data for the corresponding time period 3100, and 5) the flush valve water usage data 3104 for the corresponding time period. In alternative embodiments, each entry 3084 may include additional information. Furthermore, while the illustrated list 3068 includes values for data sets corresponding to multiple fixture classifications, in alternative embodiments, the layout of the list 3068 may automatically adjust to correspond with the specific fixture classification selected (e.g., flush actuations and water usage for a flush valve, water pressure for a backflow preventer, actuations and water usage for a faucet, etc.).

As shown in FIG. 15B, the entries 3084 of the list display 3068 may be organized by any one of the individual data elements described above. For example, the list 3068 may be organized by time period, faucet uses, water usage data, flush cycles, and the like. The list 3068 is also configured to allow the user to export the resulting data as is described above.

FIG. 24 illustrates water pressure display 3200. The water pressure display is configured to graph out the water pressure of one or more water pressure sensors (described above) over a pre-determined period of time. The water pressure display 3200 includes a series of inputs, similar to those of the usage history page 3000 (described above) and therefore will not be described in detail herein. Such inputs may include, but are not limited to, building, floor, room, and product selections; data selection (e.g., average, high or low), and time frame (e.g., day, week, month, year, etc.). The water pressure display 3200 also includes a second chart display 3204 configured to list all of the individual pressure sensors that fall within the selected grouping, including their high, low, and average water pressure readings over the pre-selected time frame.

Figure 25:
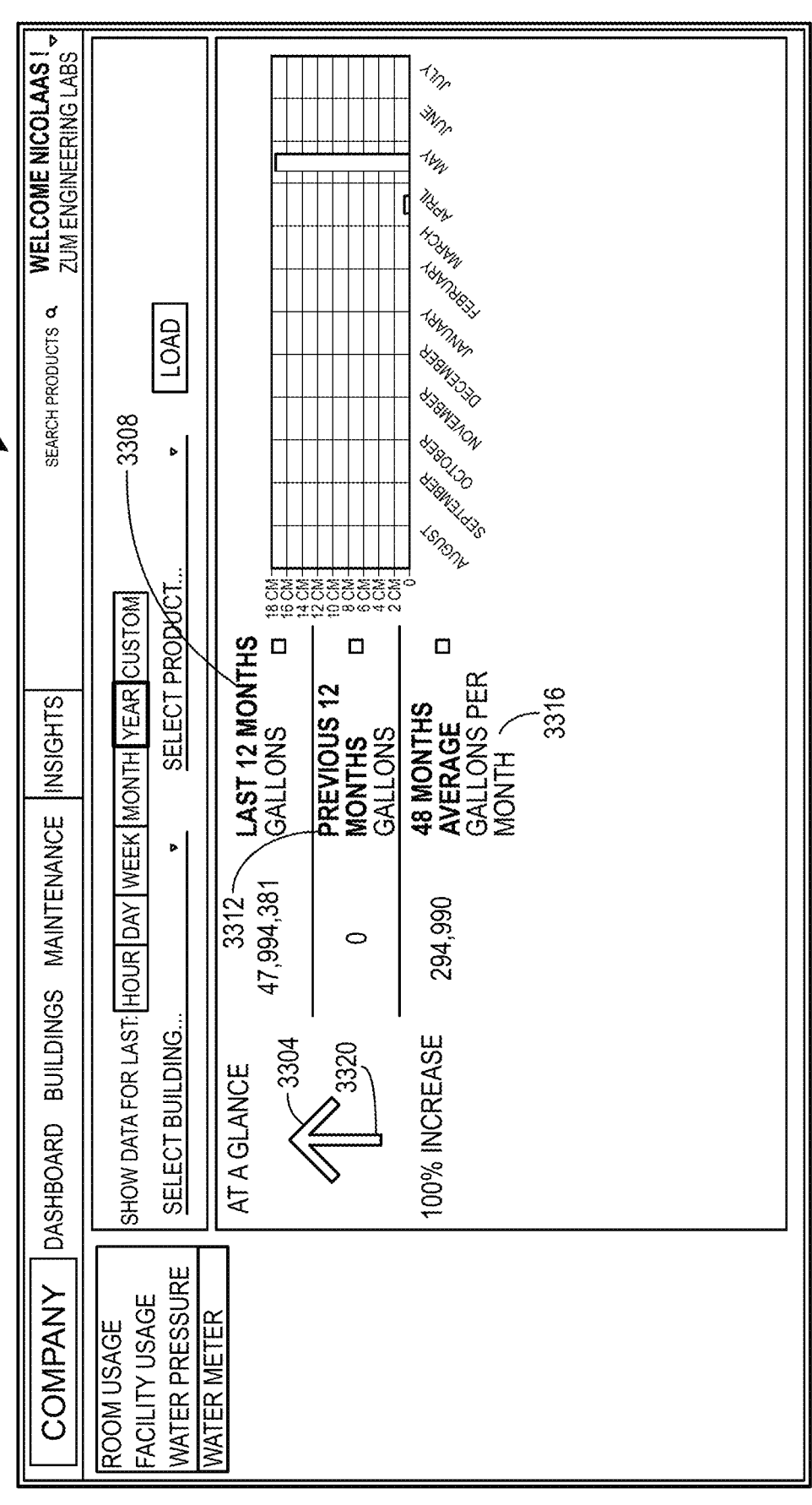
FIG. 25 illustrates a water meter display.

FIG. 25 illustrates the water monitor display 3300. The water monitor display 3300 is configured to display various sets of historical data for a particular fixture 14. As shown in FIG. 26, the display 3300 includes a change indicator 3304, a first history indicator 3308, a second history indicator 3312, and a third history indicator 3316. The water monitor display 3300 also includes a chart mapping out the historical data over a pre-determined range of time.

The change indicator 3304 is configured to allow the user to quickly and easily determine the change of the fixtures operation over the predetermined period of time (e.g., the water flow change over the set period of time). The change indicator 3304 includes indicia 3320, which may include an up arrow (indicating an increase), a down arrow (indicating a decrease), or a double-ended horizontal arrow (indicating no change). The colors of the indicia may also be changed to signal whether the indicated change is "good" (e.g., green) or bad (e.g., red). The change indicator 3304 also includes text below the indicia 3320 providing statistical data regarding the indicia (e.g., the percent increase, percent decrease, and the like).

Figure 27:
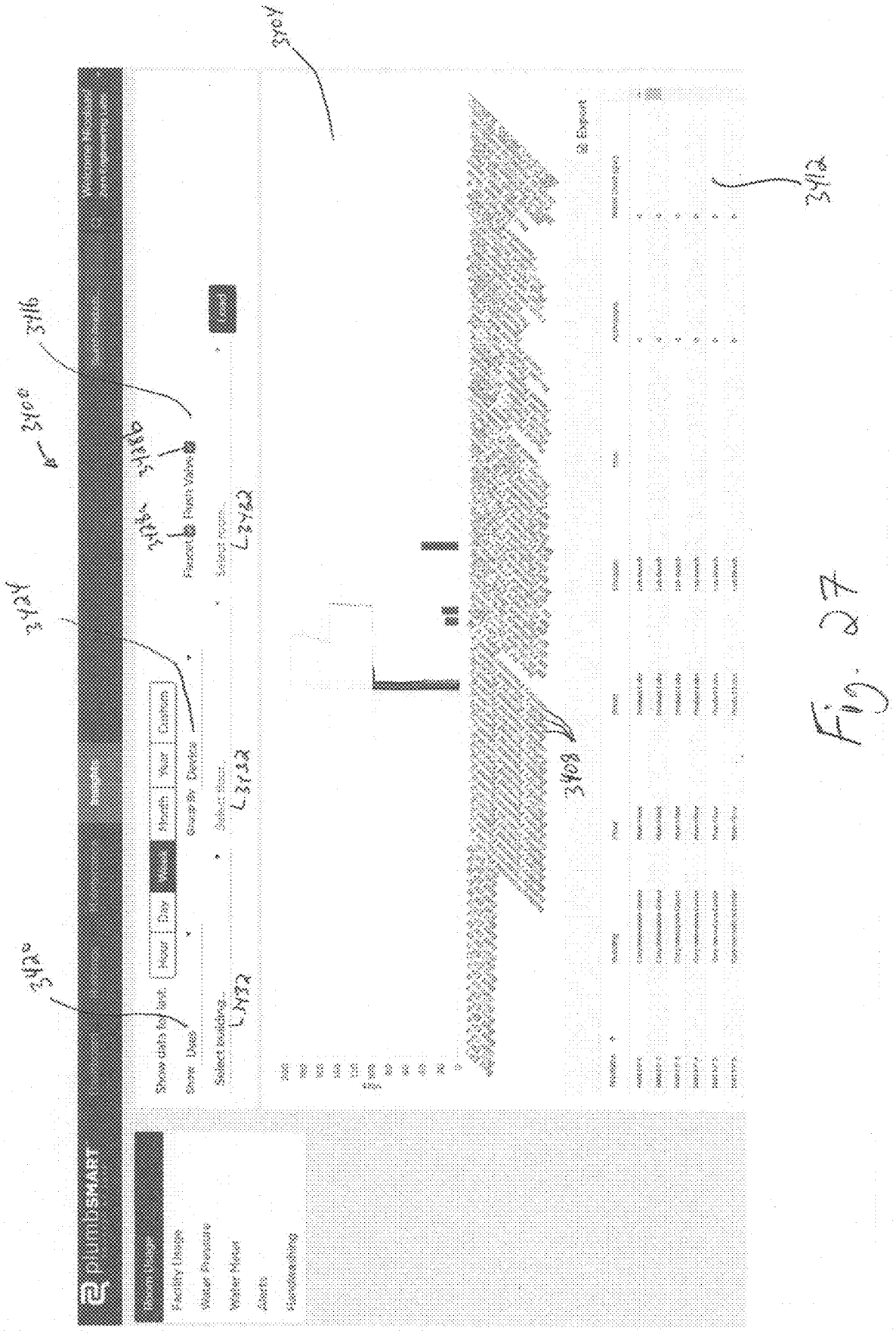
FIG. 27 illustrates a room usage display.
Figure 26:
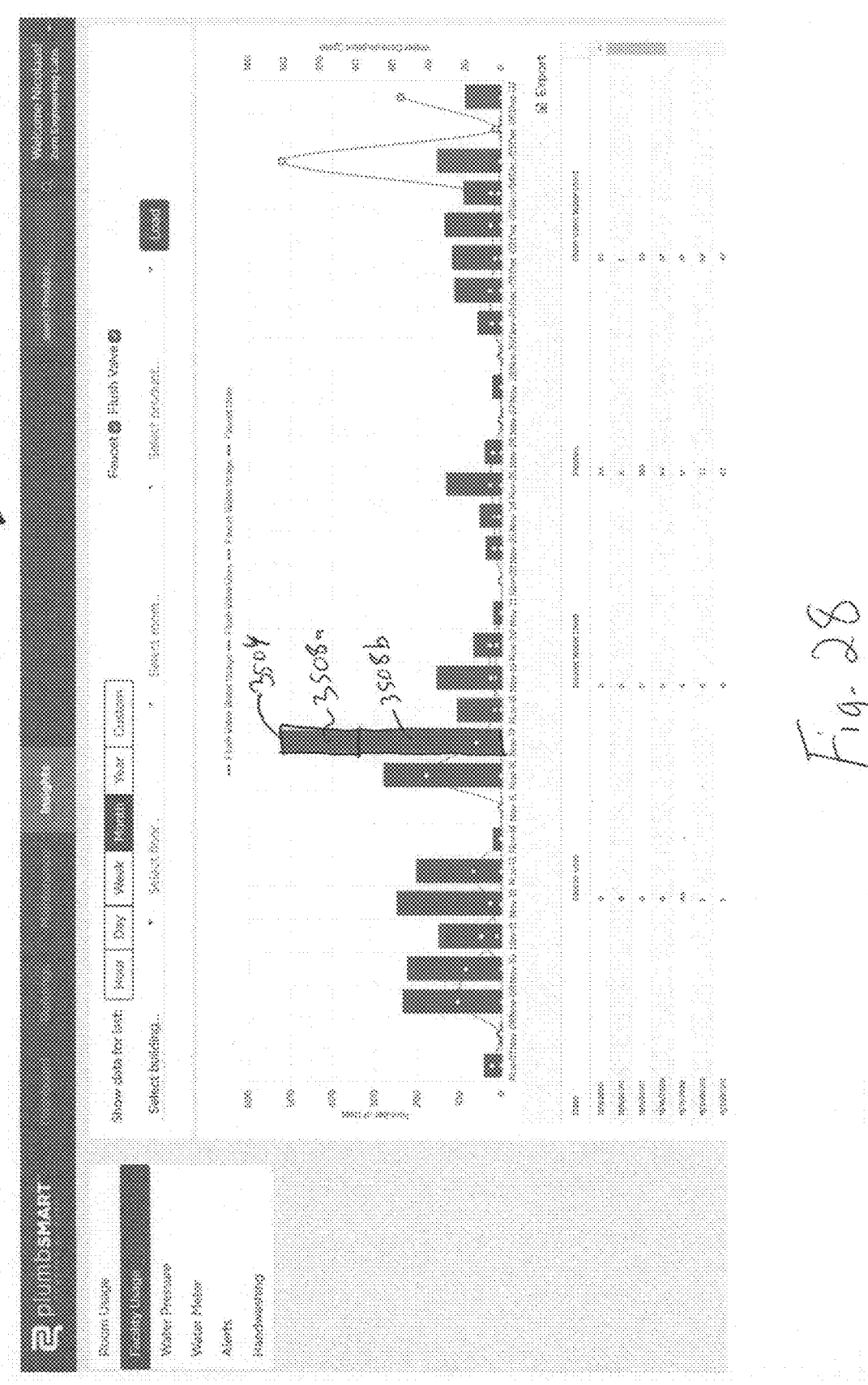

FIG. 27 illustrates the room usage display 3400. The room usage display 3400 is configured to display the number of uses, activations, or gallons used for any fixture 14 falls within a pre-selected sub-set. More specifically, the usage display 3400 includes a chart 3404 having an entry 1408 for each fixture 14 falling with the pre-selected sub-set. The usage display 3400 also includes a spreadsheet display 3412 listing each of the fixture 14 being displayed in the chart 3404.

To select the parameters of the chart 3404 and spreadsheet 3412, the user is provided with a number of options in the tool bar 3416. The tool bar 3416 allows the user to select the data to be displayed 3420 (e.g., uses, activates, water gallons used), how the data is grouped 3424 (e.g., by device, building, room, or floor), and which specific types of fixture 14 are to be included in the displayed data. More specifically, the display 3400 includes a plurality of toggles 3428a, 3428b that each represent a type of fixture. By selecting and de-selecting the toggles 3428a, 3428b the user is able to individually select which fixtures are included in the compilation of data displayed in the chart 3404 and spreadsheet 3412. The tool bar 3416 also includes location selectors 3432 to allow the user to sort the data by location classification (e.g., via building, floor, and room).

In some embodiments, when the data is grouped by room, building, or floor, each entry 3408 of the chart 3404 stacks vertically stacks the information provided by each of the types (see FIG. 27A). Stated differently, each bar of the bar chart includes a first portion 3436a representing the number of uses, activations, or gallons corresponding with faucets and a second portion 3436b representing the number of uses, activations, or gallons corresponding with flush valves. As such, a user is able to decipher not only the total number attributable to each entry, but how much of each entry is associated with the individual types of fixture 14.

FIG. 28 illustrates a facility usage display 3500. The facility usage display 3500 is configured to display the total number of uses attributable to a sub-set of fixtures 14 organized by the date on which the usage occurred. More specifically, the display 3500 includes a number of entries 3504 that correspond with a particular day. Each entry includes a vertical bar 3508 corresponding with the height thereof corresponding to the total number of uses for the selected sub-division. The bar, in turn, includes a sub-portion corresponding to a particular fixture type. For example, the illustrated bar entry 3504 includes a first potion 3408a corresponding to the number of uses for the faucets on the corresponding date and a second portion 3408b corresponding to the number of uses for the flush valves on the same date. The entries 3504 may also include overlays, such as line graphs entries, corresponding to additional data types like usage, uses, gallons flowed, actuations, and the like.

Figure 29A:
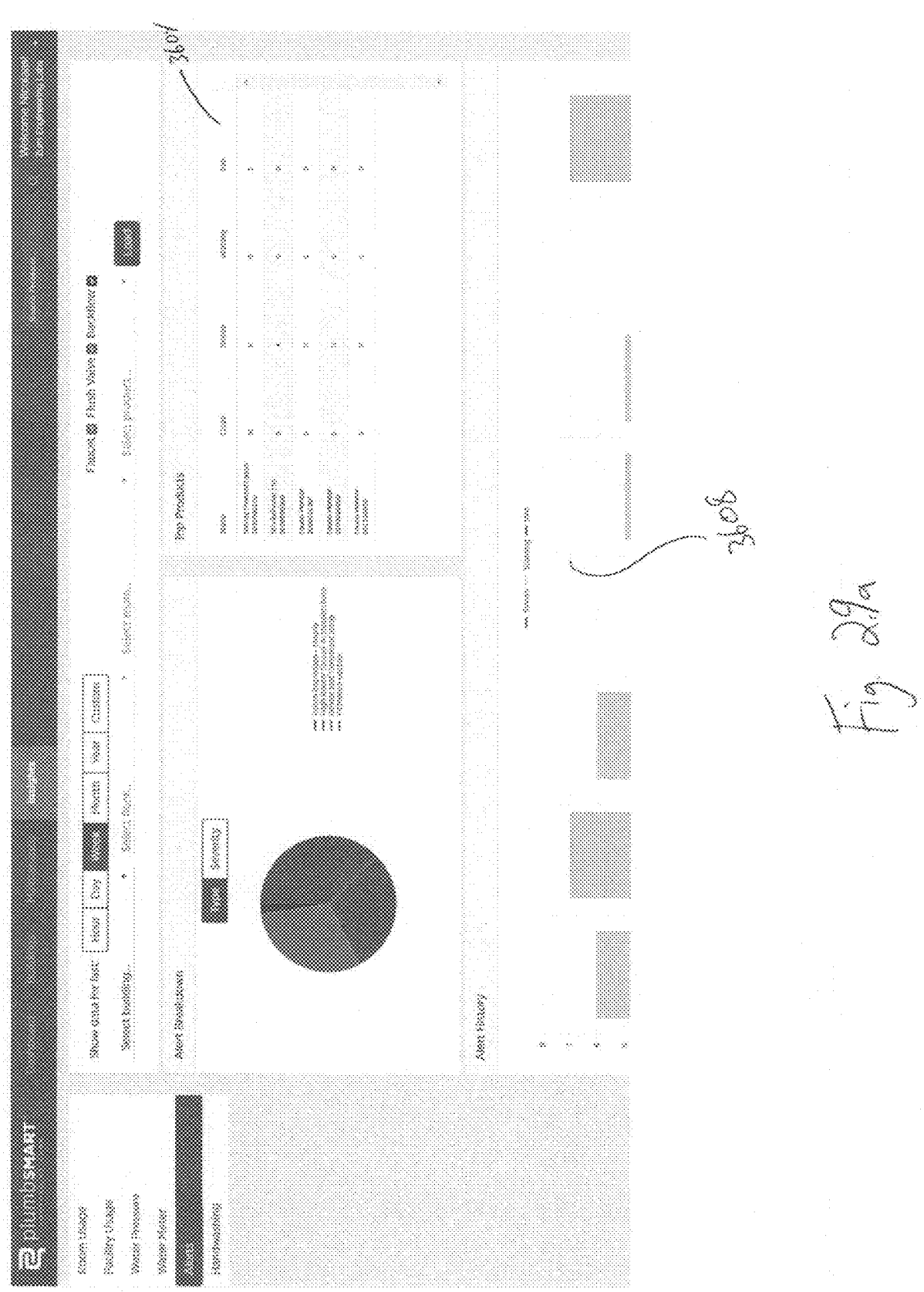
FIGS. 29A-29C illustrate an alert display.
Figure 29B:
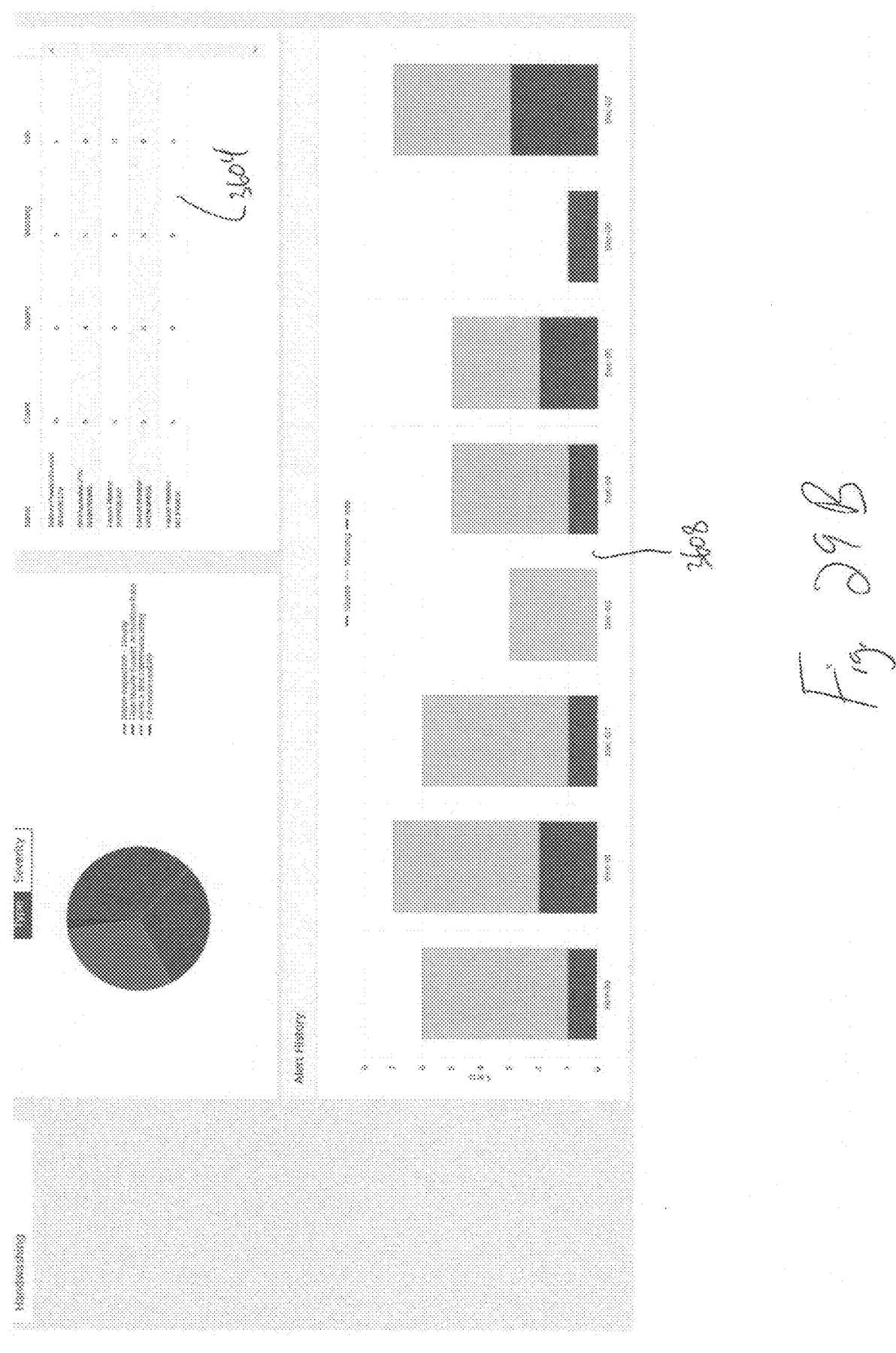

FIGS. 29A and 29B illustrate an alerts display 3600. The alerts display 3600 includes a top products list 3604 configured to list the top fixtures 14 by total number of alerts present, an alert history 3608 configured to display the total number of alerts present on a particular date, and an alert breakdown 3612 configured to display the total number of current alerts.

For the alert history 3608, each entry 3616 (e.g., a vertical bar) is broken down into sub-portions 3612a, b, c, each corresponding to an alert severity (e.g., information, warning, severe).

Figure 29C:
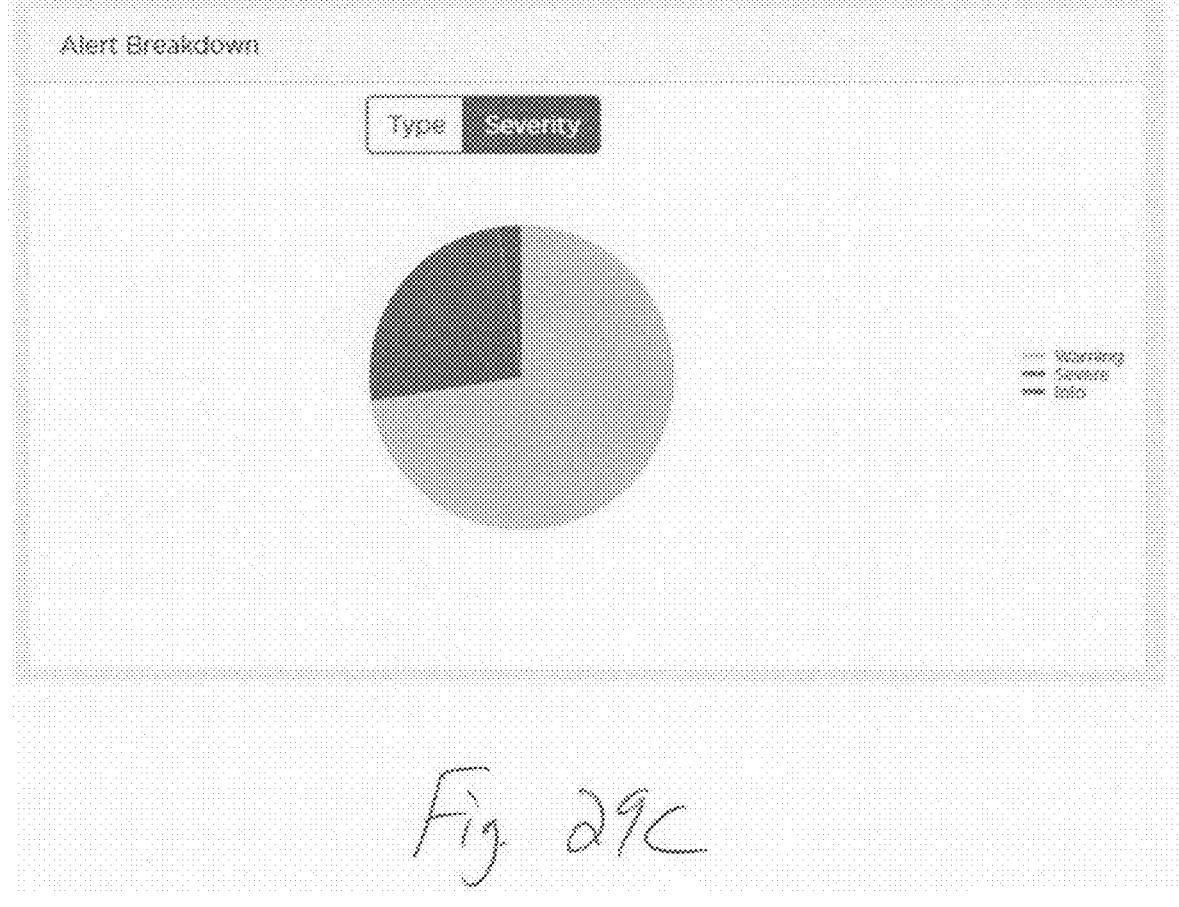

For the breakdown 3612, the display includes a pie chart representing the proportion of alerts falling into various categories. For example, in FIG. 29A the pie chart breaks down the alerts by "type"-such as room inspections, high activation rates, fixture communication errors, firmware updates, and the like. In other examples, such as FIG. 29C, the pie chart is broken down by alert severity.

The water monitor display 3300 is configured to display various sets of historical data for a particular fixture 14. As shown in FIG. 26, the display 3300 includes a change indicator 3304, a first history indicator 3308, a second history indicator 3312, and a third history indicator 3316. The water monitor display 3300 also includes a chart mapping out the historical data over a pre-determined range of time.

The change indicator 3304 is configured to allow the user to quickly and easily determine the change of the fixtures operation over the predetermined period of time (e.g., the water flow change over the set period of time). The change indicator 3304 includes indicia 3320, which may include an up arrow (indicating an increase), a down arrow (indicating a decrease), or a double-ended horizontal arrow (indicating no change). The colors of the indicia may also be changed to signal whether the indicated change is "good" (e.g., green) or bad (e.g., red). The change indicator 3304 also includes text below the indicia 3320 providing statistical data regarding the indicia (e.g., the percent increase, percent decrease, and the like).

FIGS. 14A-14E illustrate the various screens associated with the registration process of the system 10. The registration process is configured to allow the user to enter one or more fixtures 14 into the system 10 so that the system 10 can both send and receive data from the fixtures 14 and analyze the data received. The registration process also includes a bulk entry mode (described below) where multiple fixtures can be entered together such that the system 10 will automatically enter in at least a portion of the required data automatically.

As shown in FIG. 14A. the first step of the registration process includes adding the serial number 480 of the new fixture into the provided location. In instances where multiple related fixtures are entered together, each of the serial numbers may be added together (see FIG. 14B). In some embodiments, the system 10 may also display a photo or diagram illustrating where the serial numbers can be found on various types or styles of fixtures 14.

Once the serial numbers of each fixture are entered (FIGS. 14A and 14B) the user may then enter additional data points as prompted by the second page (see FIG. 14C). More specifically, in instances where bulk entry mode is utilized, the additional data points generally correspond with attributes that are shared among the group. For example, the user may enter multiple fixtures 14, each of which are located in the same room. As such, each item will share a common building classification, floor classification, and room classification. Installation date data and the name of the installer are other examples of shared data that bulk entry mode can help streamline.

In other embodiments, the fixtures 14 to be entered may include a QR code, RFID tag, bar code, Bluetooth connectivity, reference ID, and the like such that entering in or scanning the data will cause the system to automatically fill-in at least a portion of the desired fields. Such field may be specific to the fixture 14 being registered (e.g., installer information, installation location, serial number, etc.) or may be general to the model being installed (e.g., operating parameters, model name, model number, etc.). In some instances, the system may also rely on real-time GPS data to establish geolocation data and installation characteristics of the fixture 14. In still other embodiments, the fixture location may be established by the user entering or selecting a location on a map and the like.

Finally, with the installation information entered, the user is then able to enter specific product details specific to each fixture 14. As shown in FIG. 14D, such data may include, but is not limited to, the fixture name/title, the device location, and the fixture classification.

With all of the necessary data entered into the system 10, the user may then register each of the fixtures 14 whereby the system will subsequently be able to communicate and processes data therewith (see FIG. 14E).

The system 10 may also permit third-party IT integration allowing for real-time outgoing communication, real-time incoming communication, or both. More specifically, the system 10 may include a third-party integration capability whereby data collected and analyzed by the system 10 can then be output for display by a third-party program. For example, real-time maintenance data may be exported to a third-party financial program whereby maintenance costs are automatically integrated into an organization's financial data. Similarly, the IT integration capability may also permit a user to integrate in real-time an organization maintenance schedule for display on the system 10 (e.g., on the maintenance page 88c).

Still further, the system 10 may include an IT wizard with instructions and displays pre-loaded to assist IT personnel in creating the real-time connections between the third-party programs and the system 10 itself. Such wizards may include step-by-step instructions.

Figures 18A, 18B:
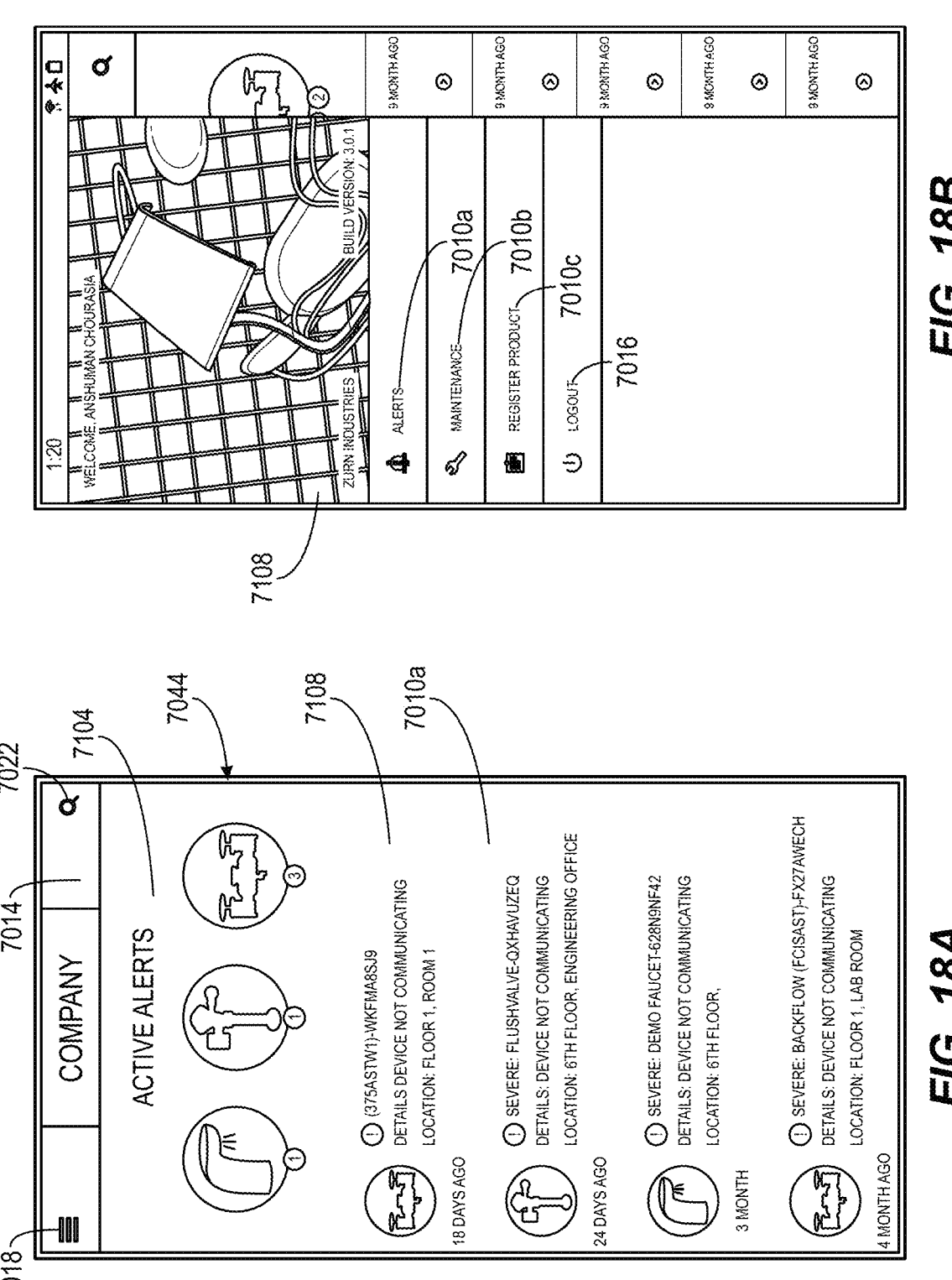
FIGS. 18A-18R illustrate a mobile device interface for use with the system of FIG. 1.
Figure 18H:
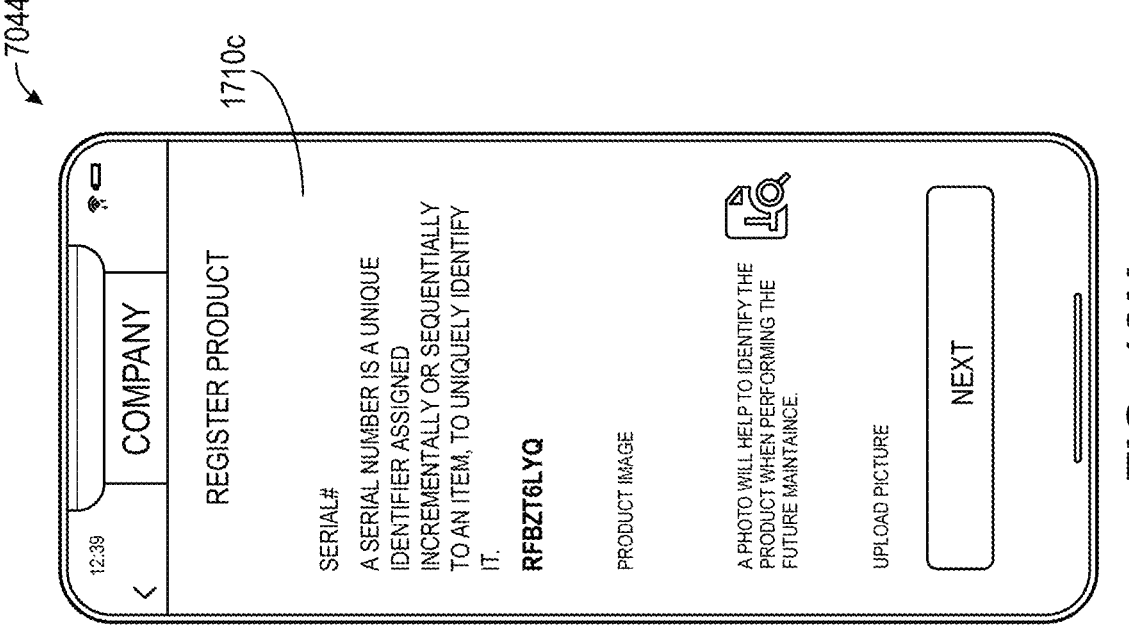
Figure 18G:
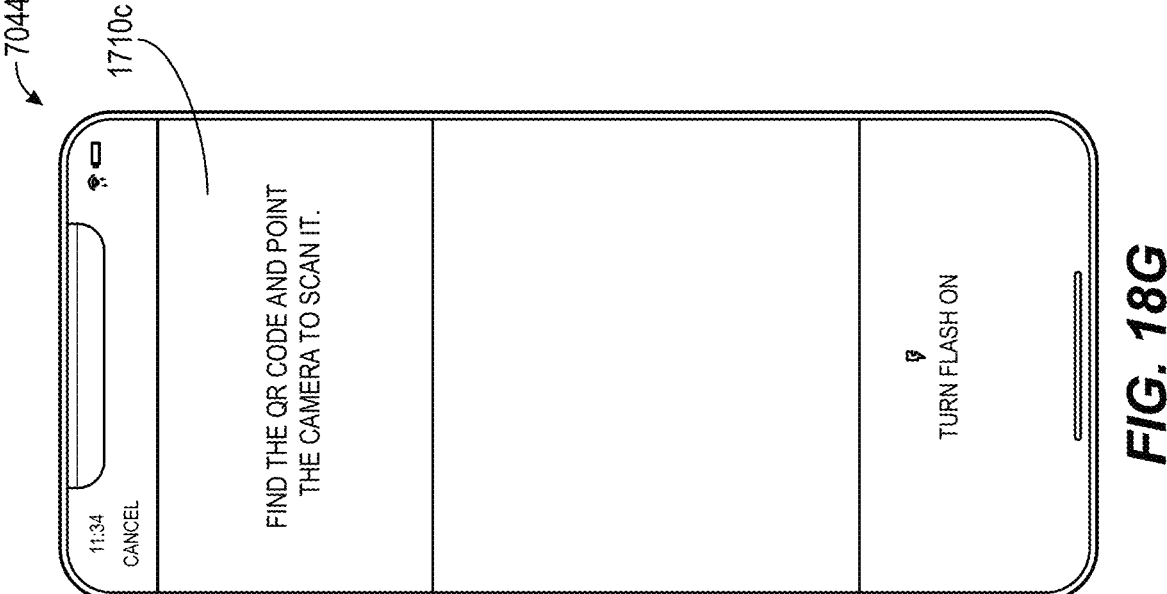
Figure 18J:
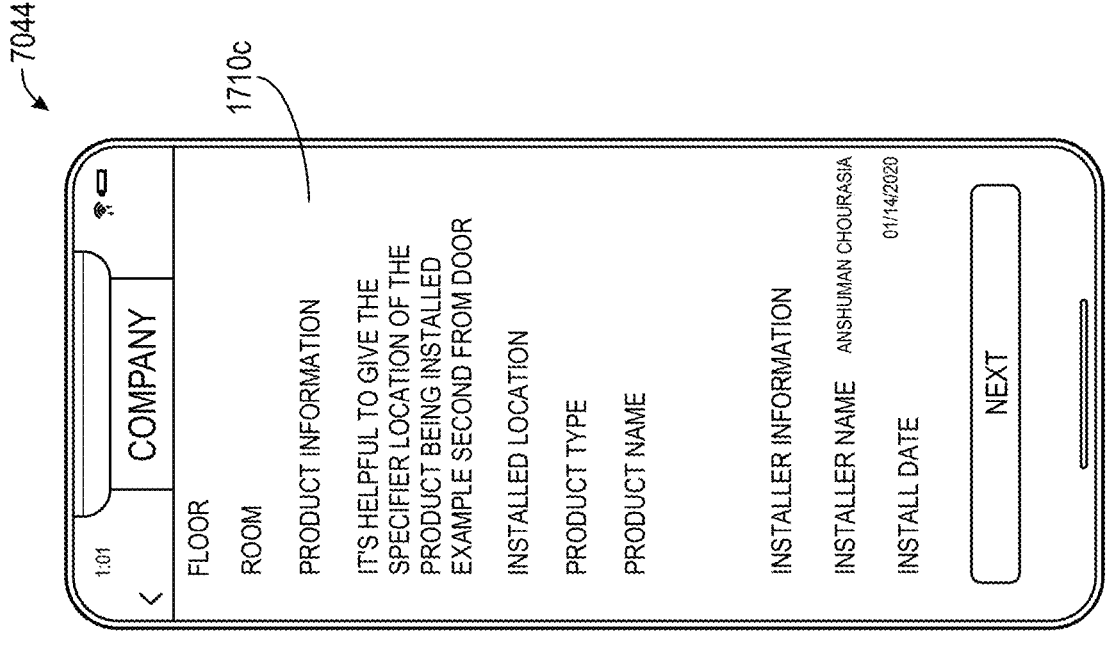
Figure 18I:
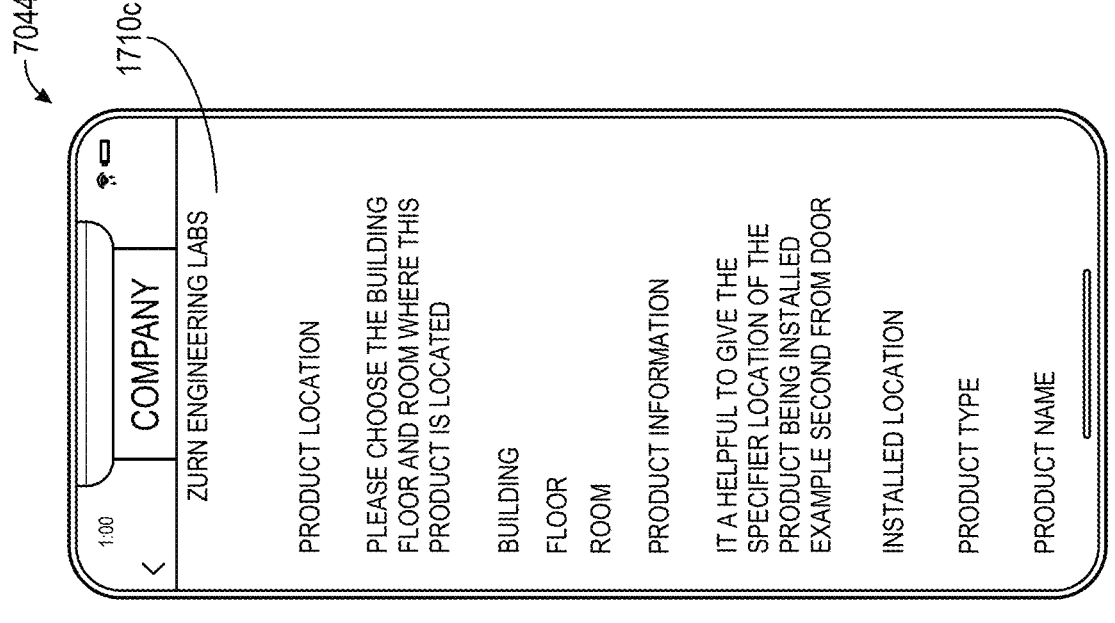
Figure 18N:
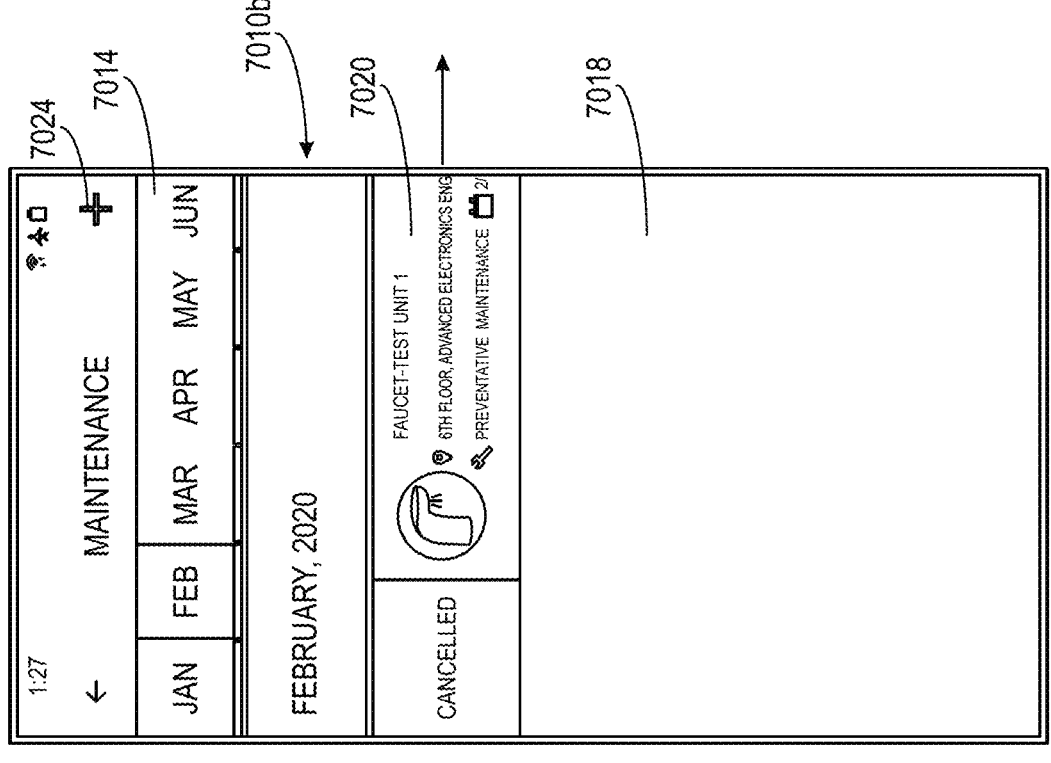
Figure 18M:
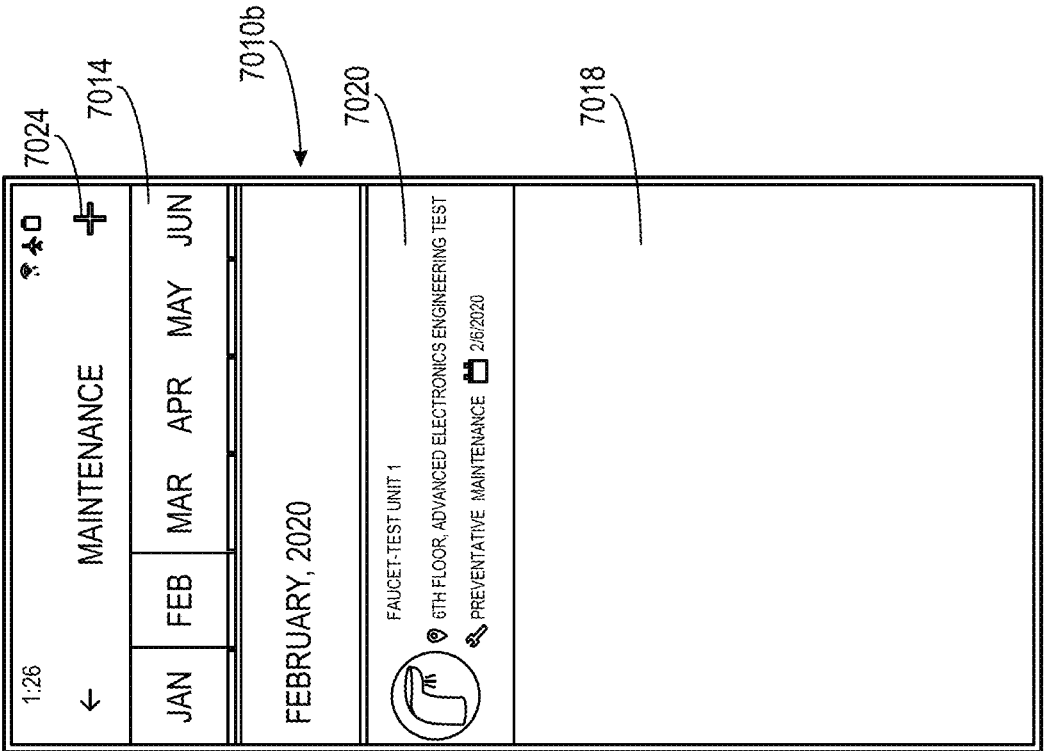
Figure 18P:
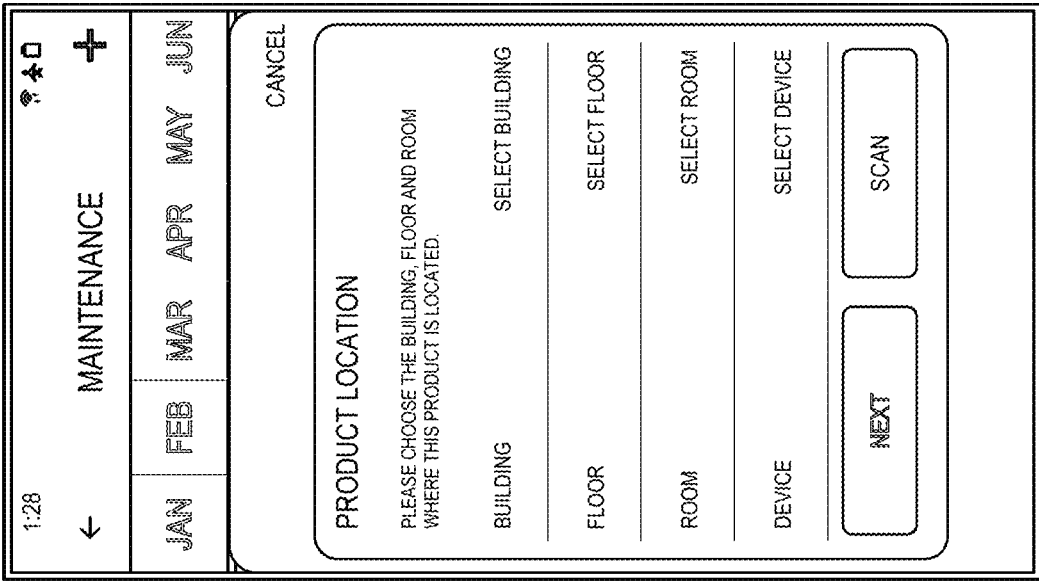
Figure 18O:
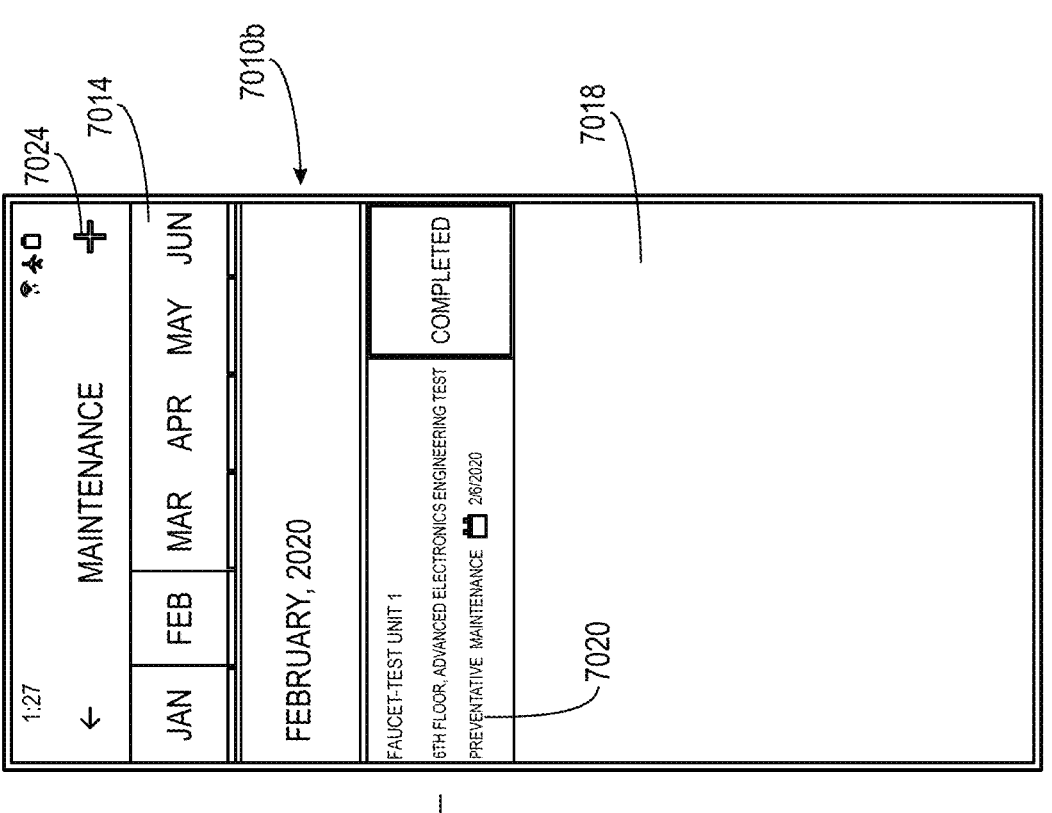
Figures 18Q, 18R:
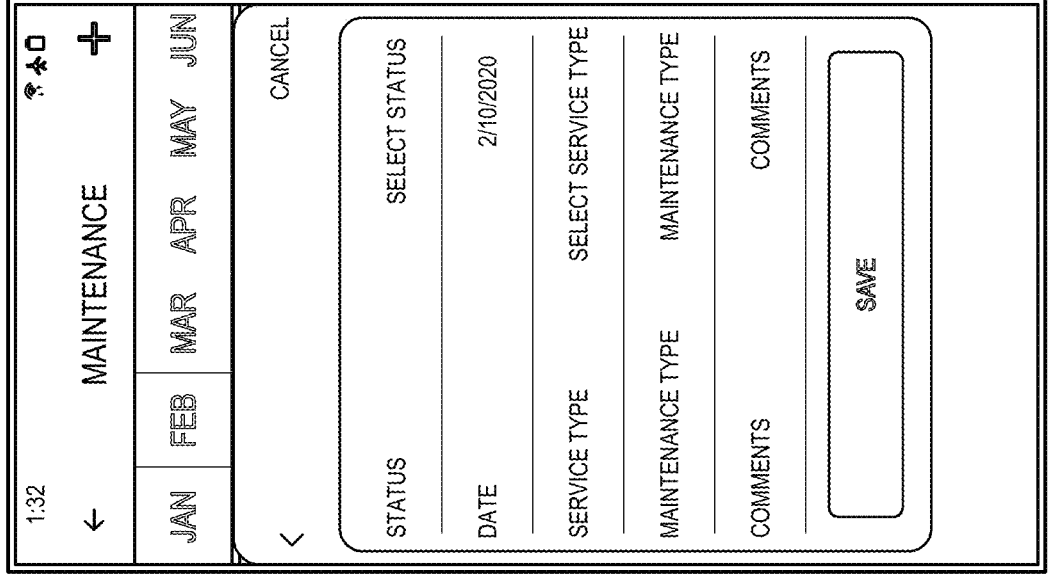

FIGS. 18A-18R illustrate an embodiment of a communication interface 44 operable on a user fixture 18, for example, mobile fixtures such as cell phones, tablets, and the like. The communication interface 44 in this embodiment is a mobile interface 7044 for mobile fixtures that communication with the network 30.

The mobile interface 7044 includes a series of displays 7010a, 7010b, 7010c, each of which are configured to display various subsets of data to the user or allow the user to undergo pre-determined tasks. More specifically, the mobile interface 7044 includes an alerts display 7010a, a maintenance display 7010b, and a product registration display 7010c.

The mobile interface 7044 also includes a header 7014 located proximate the top of the interface 7044 and configured to allow the user to more easily navigate between the displays 7010a, 7010b, 7010c. The header 7014, in turn, includes a sub-menu 7018 including links to each display 7010a, 7010b, 7010c and a logout feature (7016, see FIG. 18B). As shown in FIG. 18A, the header 7014 also includes a search feature 7022 similar to the search feature 94 described above.

The alerts display 7010a of the mobile interface 7044 (see FIG. 18A) is substantially similar to the active alerts widget 100 of the dashboard display 88a, described above (see FIG. 5A). More specifically, the alerts display 7010a includes an active alerts overview section 7104 and an active alerts list section 7108. The active alerts overview section 7104 operates in substantially the same way as the active alerts overview section 104 of the interface 44, described above. Similarly, the active alerts list section 7108 operates in substantially the same way as the active alerts list section 108 as described above. As such, the details of the alerts display 7010a will not be described in detail herein.

The maintenance display 7010b of the mobile interface 7044 (see FIG. 18M, 18N, 18O) is substantially similar to the maintenance display 88c, described above (see FIG. 13). More specifically, the maintenance display 7010b includes a calendar menu 7014 listing a number of months or other date subdivisions that user may select, and a task window 7018 to display any maintenance tasks associated with the date subdivision selected from the calendar menu 7014. More specifically, after a user selects a particular date subdivision from the calendar menu 7014 (e.g., a particular month, day, or year), the task window 7018 will display any maintenance tasks 7020 scheduled to occur during that time period, similar to a cell 464 in the calendar grid 460 in the maintenance display 88c. Unlike the cells 464, the task window 7018 is configured to display all maintenance tasks occurring during the selected time period, regardless of fixture classification. However, in alternative embodiments the task window 7018 may include subdivided regions where the maintenance tasks are organized by fixture classification, location classification, alert type, and the like.

As shown in FIGS. 18N and 18O, each maintenance task 7020 may be "swiped" toward either the right hand or left hand side of the screen to either cancel the task or indicate that the task has been completed. More specifically, swiping the task 7020 toward the right side of the screen (FIG. 18N) causes the system 10 to cancel the maintenance task 7020. Alternatively, swiping the task 7020 toward the left side of the screen (FIG. 18O) causes the system to mark the task 7020 as completed.

As shown in FIG. 18M, the maintenance display 7010b also includes a "maintenance task" icon 7024 in the upper right corner of the screen. The icon 7024 allows the user to add a maintenance task to the system 10 via the mobile interface 7044. In the illustrated embodiment, selecting the icon 7024 causes the system to bring up a QR code scanner, which in turn allows the user to scan the QR code of the corresponding fixture 14. By doing so, the system 10 will automatically associate the added maintenance task with the appropriate fixture 14. In alternative embodiments, the user may manually select the fixture 14 for which the maintenance task is intended.

As shown in FIG. 18C-E, the mobile interface 7044 also includes a mobile fixture profile 7092. The mobile fixture profile 7092 is substantially similar in operation to the fixture profile 92 described above. More specifically, each mobile fixture profile 7092 includes 1) a fixture identifier 7116 (substantially similar to fixture identifier 116, described above), 2) an alert window 7026 to display any alerts associated with the corresponding fixture 14, 3) a product information window 7032 displaying specific product information, 4) a subscription details window 7036 listing any details regarding the subscription with the system 10, and 5) a location classification window 7040 listing and details regarding the location of the fixture 14 within the plumbing ecosystem, As shown in FIG. 18C, the alert window 7026 includes arrows or other icons 7044 to allow the user to scroll through the alerts corresponding with the relevant fixture 14. FIGS. 18P-18R illustrate an alternative embodiment of the mobile interface 7044.

During use, the user may access the mobile device profile 7092 for any particular fixture 14 by a number of processes such as, but no limited to, selecting an active alert on the alert display 7010*a*, searching for the fixture 14 within the search feature 7022, or selecting an active maintenance task in the maintenance display 7010*b*.

As shown in FIGS. 18F-18L, the mobile interface 7044 includes a product registration display 7010*c*. The product registration display 7010*c* allows the user to register a fixture 14 within the system 10 for further analysis and tracking. This feature is similar in operation to the registration system described above (see FIGS. 14A-14E).

FIGS. 18F-18L illustrate the various screens associated with the registration process of the mobile interface 7044. The registration process is configured to allow the user to enter one or more fixtures 14 into the system 10 so that the system 10 can both send and receive data from the fixtures 14 and analyze the data received. Although not shown, the registration process may also include a bulk entry mode as described above.

As shown in FIG. 18F. the first step of the registration process includes selecting the registration display 7010*c* from the sub-menu 7018 of the header 7014. The first page (FIG. 18F) then prompts the user to scan the QR code that is included with the purchased product (e.g., either on the fixture itself or on the packaging). Upon selecting the scan button 7050, the user is presented with a screen (FIG. 18G) whereby the phone or tablet's camera (not shown) can be used to photograph the QR code. While a QR code is used in the illustrated embodiment, it is to be understood that in alternative embodiments different forms of interface may be used. For example, bar codes, radio-frequency identification (RFID), and the like. Still further, in other embodiment the mobile fixture may communicate with the product using Bluetooth, Wifi, and the like.

After the QR code has been read, the system is able to automatically fill out certain fields (e.g., the Serial Number, see FIG. 18H). In some embodiments, the system 10 may also automatically locate the fixture within the user' plumbing ecosystem (using geolocation, GPS, and the like). In instances where a QR code is not present, the user may manually enter any required information.

As shown in FIG. 18H, the user is also prompted to photograph the product to help identify it at a future date. Such photographs may be automatically associated with the product and applied to the product's mobile device profile 7092 (described above). Finally, the user is asked to fill out the installer information (see FIG. 18J).

After the required information has been entered, the system 10 saves the profile and prompts the user (see FIG. 18L).

Although the invention has been described in detail with reference to certain preferred embodiments, variations and modifications exist within the scope and spirit of one or more independent aspects of the invention as described.

The invention claimed is:

1. A water management system comprising:
   an end point device communicatively coupled to a fixture, wherein the end point device includes a first end point electronic processor configured to activate the fixture; and
   a non-transitory computer-readable medium storing instructions executable by at least one electronic processor to perform a set of functions, the set of functions comprising:
   receiving, from a remote device, a command for activating the fixture, wherein the command includes at least one of a duration time, a flow rate, a target volume, and a scheduled activation time;
   storing the received command until an activation time associated with the command is reached;
   receiving data from the fixture relating to a completed activation, the data including flow criteria associated with the completed activation;
   storing the received data in response to an absence of at least one of network connectivity and electricity; and
   transmitting the data to the remote device.

2. The water management system of claim 1, wherein the fixture includes a faucet, a flush valve, a backflow preventer, a grease interceptor, a drain, a soap dispenser, a water service line monitor, an acid neutralization system, a fire distribution system, an irrigation system, a thermostatic mixing valve, a hand dryer, a pressure sensor, a flow sensor, a valve sensor, or a flow meter.

3. The water management system of claim 1, wherein the fixture comprises an electro-mechanical (EM) element and wherein activating the fixture includes controlling the EM element within the fixture.

4. The water management system of claim 1, wherein activation of the fixture includes at least one of a flushing event and a dispensing event.

5. The water management system of claim 1, wherein scheduled activation time includes a day of the week, a week of the month, or a given time of day.

6. The water management system of claim 1, wherein activation of the fixture is pre-set to occur when an operational parameter is met; and wherein the operational parameter includes a pre-determined time interval elapsed since a last use of the fixture.

7. The water management system of claim 1, wherein the fixture is further configured to be in a lockout condition when a safety parameter is met; and wherein, when the fixture is in the lockout condition, the activation of the fixture is delayed.

8. The water management system of claim 7, wherein the safety parameter includes detecting a user in proximity to the fixture.

9. The water management system of claim 7, wherein the safety parameter includes a fault condition detected by the end point device.

10. A water management system comprising:

a first fixture including an electro-mechanical (EM) element;

an end point device including a first end point electronic processor communicatively coupled to the fixture, the end point device being configured to activate the EM element; and a non-transitory computer-readable medium storing instructions executable by at least one electronic processor to perform a set of functions, the set of functions comprising:

associating the first fixture with a location classification and a type classification;

organizing the first fixture into a grouping of fixtures, wherein the grouping of fixtures is based on at least one of the location classification and the type classification;

receiving, from a remote device, a command for activating at least one fixture of the grouping of fixtures, wherein the command includes at least one of a duration time, a flow rate, a target volume, and a scheduled activation time;

determining, based on usage data of the first fixture, whether to execute the received command;

activating the EM element to perform a flush cycle in accordance with the received command, including controlling fluid flow to satisfy at least one of the duration time, flow rate, or target volume specified in the command, when the command is executed;

receiving data from the first fixture relating to a completed activation, the data including flow criteria associated with the completed activation; and transmitting the data to the remote device.

11. The water management system of claim 10, wherein EM element includes a valve configured to selectively open or close to allow or prevent fluid flow, respectively, through the first fixture.

12. The water management system of claim 10, wherein the command may be repeatedly transmitted until a target volume is met.

13. The water management system of claim 10, wherein associating the first fixture with the location classification includes associating the first fixture with a building in which the first fixture is located, associating the first fixture with a floor on which the first fixture is located, associating the first fixture with a room in which the first fixture is located, and associating the first fixture with a region in which the first fixture is located.

14. The water management system of claim 10, wherein associating the first fixture with the type classification includes identifying the first fixture as one of a faucet, a flush valve, a soap dispenser, a water service line monitor, a backflow preventer, a grease interceptor, a roof drain, a floor drain, an acid neutralization system, a fire distribution system, an irrigation system, a thermostatic mixing valve, a hand dryer, a pressure sensor, a flow sensor, or a valve sensor.

15. The water management system of claim 10, wherein the command received from the remote device is a group command configured to selectively activate one or more fixtures associated with the same type classification or location classification.

16. The water management system of claim 15, wherein organizing the first fixture into a grouping of fixtures includes assigning the first fixture into a first sub-group and a second sub-group, and wherein activation of the first fixture is selectively performed based on a selection of at least one of the first sub-group and the second sub-group.

17. The water management system of claim 10, wherein the usage data includes a number of activations of the first fixture.

18. The water management system of claim 17, wherein determining whether to execute the received command includes comparing the usage data against a usage threshold, the usage threshold being a minimum flow frequency.

* * * * *